United States Patent
Park et al.

(10) Patent No.: US 12,100,899 B2
(45) Date of Patent: Sep. 24, 2024

(54) ELECTRONIC DEVICE COMPRISING PLURALITY OF ANTENNAS

(71) Applicant: Samsung Electronics Co., Ltd., Suwon-si (KR)

(72) Inventors: Woojin Park, Suwon-si (KR); Donguk Choi, Suwon-si (KR); Junghoon Seo, Suwon-si (KR); Jongin Lee, Suwon-si (KR); Hwikyung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 17/943,679

(22) Filed: Sep. 13, 2022

(65) Prior Publication Data

US 2023/0006364 A1 Jan. 5, 2023

Related U.S. Application Data

(63) Continuation of application No. PCT/KR2021/002947, filed on Mar. 10, 2021.

(30) Foreign Application Priority Data

Mar. 19, 2020 (KR) .................. 10-2020-0033851

(51) Int. Cl.
*H01Q 1/38* (2006.01)
*H01Q 1/22* (2006.01)
(Continued)

(52) U.S. Cl.
CPC .......... *H01Q 21/205* (2013.01); *H01Q 1/2291* (2013.01); *H01Q 9/065* (2013.01); *H04B 7/0413* (2013.01)

(58) Field of Classification Search
CPC .... H01Q 21/205; H01Q 1/2291; H01Q 9/065; H01Q 5/357; H01Q 21/24; H01Q 21/28; H01Q 1/38; H01Q 1/243; H04B 7/0413
See application file for complete search history.

(56) References Cited

U.S. PATENT DOCUMENTS 7,098,863 B2 * 8/2006 Bancroft .............. H01Q 21/205
343/859
7,280,082 B2 * 10/2007 Theobold ............... H01Q 1/246
343/770
(Continued)

FOREIGN PATENT DOCUMENTS

CN         104638383 A  *  5/2015
JP      2007124346 A  *  5/2007
(Continued)

OTHER PUBLICATIONS

Korean Office Action dated Mar. 20, 2024, issued in Korean Patent Application No. 10-2020-0033851.
(Continued)

*Primary Examiner* — Dimary S Lopez Cruz
*Assistant Examiner* — Bamidele A Immanuel
(74) *Attorney, Agent, or Firm* — Jefferson IP Law, LLP

(57) ABSTRACT

An electronic device including a plurality of antennas is provided. The electronic device includes a housing, a first antenna disposed in the housing, a second antenna disposed in the housing, and spaced apart from the first antenna, a printed circuit board disposed in the housing and a wireless communication circuit disposed on the PCB, and transmitting or receiving a RF signal of a frequency band through the first antenna and the second antenna, the first antenna includes a first dielectric substrate including a first surface and a second surface facing away from the first surface, a first conductive pattern disposed on the first surface, and operating as an antenna radiator for transmitting or receiving an RF signal of a first frequency band and a second conductive pattern disposed on the second surface, and operating as an antenna radiator for transmitting or receiving an RF signal of the first frequency band.

20 Claims, 28 Drawing Sheets

(51) Int. Cl.
*H01Q 9/06* (2006.01)
*H01Q 21/20* (2006.01)
*H04B 7/0413* (2017.01)

(56) References Cited

U.S. PATENT DOCUMENTS

| | | | | |
|---|---|---|---|---|
| 7,518,565 | B1 * | 4/2009 | Horner | H01Q 13/085 |
| | | | | 343/768 |
| 8,674,878 | B2 * | 3/2014 | Wu | H01Q 21/205 |
| | | | | 342/374 |
| 8,988,298 | B1 * | 3/2015 | Akhoondzadehasl | |
| | | | | H01Q 21/28 |
| | | | | 343/700 MS |
| 9,153,873 | B2 * | 10/2015 | Ng | H01Q 21/205 |
| 9,214,739 | B2 | 12/2015 | Sover et al. | |
| 10,224,643 | B2 | 3/2019 | Moon et al. | |
| 10,677,911 | B2 | 6/2020 | Woetzel | |
| 2008/0246663 | A1 * | 10/2008 | Fox | H01Q 3/40 |
| | | | | 455/562.1 |
| 2012/0062432 | A1 * | 3/2012 | Wu | H01Q 21/205 |
| | | | | 343/720 |
| 2012/0200449 | A1 * | 8/2012 | Bielas | H01Q 3/2605 |
| | | | | 342/372 |
| 2015/0171522 | A1 * | 6/2015 | Liu | H01Q 21/20 |
| | | | | 343/817 |
| 2015/0214629 | A1 * | 7/2015 | Hagiwara | H01Q 21/205 |
| | | | | 343/800 |
| 2015/0256213 | A1 * | 9/2015 | Jan | H01Q 21/205 |
| | | | | 370/338 |
| 2015/0365955 | A1 * | 12/2015 | Liu | H01Q 1/246 |
| | | | | 370/329 |
| 2016/0141765 | A1 | 5/2016 | Moon et al. | |
| 2018/0045822 | A1 * | 2/2018 | Wötzel | H01Q 9/28 |
| 2018/0279253 | A1 * | 9/2018 | Knoblauch | H04W 64/00 |
| 2019/0020124 | A1 | 1/2019 | Song et al. | |
| 2019/0261456 | A1 | 8/2019 | Lee et al. | |
| 2020/0044320 | A1 | 2/2020 | Han et al. | |
| 2021/0175639 | A1 | 6/2021 | Wang et al. | |
| 2022/0166491 | A1 | 5/2022 | Lee et al. | |

FOREIGN PATENT DOCUMENTS

| | | | |
|---|---|---|---|
| JP | 4516514 B2 * | 8/2010 | |
| JP | 5153564 B2 * | 2/2013 | |
| JP | 2017-34452 A | 2/2017 | |
| KR | 10-2010-0109761 A | 10/2010 | |
| KR | 10-2011-0062828 A | 6/2011 | |
| KR | 10-2012-0026760 A | 3/2012 | |
| KR | 10-2017-0134371 A | 12/2017 | |
| KR | 10-2018-0043707 A | 4/2018 | |
| KR | 10-1927954 B1 | 12/2018 | |
| KR | 10-2001519 B1 | 7/2019 | |
| KR | 10-2019-0114257 A | 10/2019 | |
| KR | 10-2108684 B1 | 5/2020 | |
| KR | 10-2021-0019888 A | 2/2021 | |
| WO | 2020174205 A1 | 9/2020 | |

OTHER PUBLICATIONS

International Journal of RF and Microwave Computer-Aided Engineering, Wiley Interscience, Hoboken, USA, Apr. 30, 2019.
Extended European Search Report dated Jul. 31, 2023, issued in European Patent Application No. 21771921.0.

* cited by examiner

ELECTRONIC DEVICE COMPRISING PLURALITY OF ANTENNAS

CROSS-REFERENCE TO RELATED APPLICATION(S)

This application is a continuation application, claiming priority under § 365(c), of an International application No. PCT/KR2021/002947, filed on Mar. 10, 2021, which is based on and claims the benefit of a Korean patent application number 10-2020-0033851, filed on Mar. 19, 2020, in the Korean Intellectual Property Office, the disclosure of which is incorporated by reference herein in its entirety.

BACKGROUND

1. Field

The disclosure relates to an electronic device including a plurality of antennas.

2. Description of Related Art

An access point (AP) (or a wireless access device) indicates an electronic device which helps wireless devices connect to a network. Users may connect an electronic device such as a mobile electronic device, a computer, or a portable multimedia device to the network within a specific service area through the AP, and the electronic device connected to the network may transmit or receive data on a radio frequency.

As electronic devices connecting to the network using a wireless communication technology increase, data capacity transmitted or received through the radio frequency has rapidly increased. As the data capacity increases, a multiple input and multiple output (MIMO) technology for increasing the data capacity transmitted or received may be applied to recent APs.

The above information is presented as background information only to assist with an understanding of the disclosure. No determination has been made, and no assertion is made, as to whether any of the above might be applicable as prior art with regard to the disclosure.

SUMMARY

To implement a multiple input/output (MIMO) technology, a plurality of antennas should be disposed within an electronic device (e.g., an access point). For example, four antennas should be disposed in the access point to implement a 4×4 MIMO technology, and eight antennas should be disposed in the electronic device to implement an 8×8 MIMO technology.

The electronic device may support a standard defined by an institute of electrical and electronics engineers (IEEE) for transmitting or receiving data on a radio frequency. According to the IEEE 802.11ax (or "wireless-fidelity (Wi-Fi) 6") standard, the electronic device may support tri bands of 2.4 gigahertz (GHz), 5 GHz low band (LB), and/or 5 GHz high band (HB).

To implement the MIMO technology and to support up to the frequency band supported by the IEEE 802.11ax standard, the number of the antennas to be disposed in the electronic device may exponentially increase. In one example, as the number of the antennas to be disposed in the electronic device increases, a volume of the electronic device may increase. In another example, as the number of the antennas to be disposed in the electronic device increases, a space for mounting the antennas may reduce, the plurality of the antennas may be disposed closely in the electronic device, and thus interference may occur between the antennas to degrade performance (e.g., radiation performance) of the access point.

Aspects of the disclosure are to address at least the above-mentioned problems and/or disadvantages and to provide at least the advantages described below. Accordingly, an aspect of the disclosure is to provide an electronic device (or an access point) for supporting the MIMO technology and the IEEE standard while reducing the number of antennas.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a first antenna disposed in the housing, a second antenna disposed in the housing, and spaced apart from the first antenna, a printed circuit board disposed in the housing and a wireless communication circuit disposed on the printed circuit board, and transmitting or receiving a radio frequency (RF) signal of a designated frequency band through the first antenna and the second antenna, the first antenna may include a first dielectric substrate including a first surface and a second surface facing away from the first surface, a first conductive pattern disposed on the first surface, and operating as an antenna radiator for transmitting or receiving an RF signal of a first frequency band and a second conductive pattern disposed on the second surface, and operating as an antenna radiator for transmitting or receiving an RF signal of the first frequency band, the second antenna includes a second dielectric substrate including a third surface and a fourth surface facing away from the third surface, a third conductive pattern disposed on the third surface, and operating as an antenna radiator for transmitting or receiving an RF signal of the first frequency band and a fourth conductive pattern disposed on the fourth surface, and operating as an antenna radiator for transmitting or receiving an RF signal of the first frequency band, when viewed from the first surface of the first antenna, the first conductive pattern and the second conductive pattern may be perpendicular to each other, when viewed from the fourth surface of the second antenna, the third conductive pattern and the fourth conductive pattern may be perpendicular to each other, and the second surface of the first antenna and the third surface of the second antenna may be disposed to face each other.

In accordance with another aspect of the disclosure, an electronic device is provided. The electronic device includes a housing, a first antenna disposed in the housing, a second antenna disposed in the housing, and spaced apart from the first antenna, a printed circuit board disposed in the housing and a wireless communication circuit disposed on the printed circuit board, and transmitting or receiving an RF signal of a designated frequency band through the first antenna and the second antenna, the first antenna includes a first dielectric substrate, a first conductive pattern disposed on one surface of the first dielectric substrate, and operating as an antenna radiator for transmitting or receiving an RF signal of a first frequency band and a second conductive pattern disposed on the other surface facing away from the one surface of the first dielectric substrate, and operating as an antenna radiator for transmitting or receiving an RF signal of second first frequency band, the second antenna includes a second dielectric substrate, a third conductive pattern disposed on one surface of the second dielectric substrate, and operating as an antenna radiator for transmitting or receiving an RF signal of the first frequency band and a fourth conductive pattern disposed on the other surface facing away from the one surface of the second dielectric substrate, and operating as an antenna radiator for transmitting or receiving an RF signal of the second frequency band, and at least one surface of the first dielectric substrate may be disposed to face at least one surface of the second dielectric substrate.

In accordance with another aspect of the disclosure, an electronic device is provided. The electronic device includes a housing, a first antenna disposed in the housing, a second antenna disposed in the housing, and spaced apart from the first antenna, a third antenna disposed in the housing, and spaced apart from the first antenna and the second antenna, a fourth antenna disposed in the housing, and disposed to face the third antenna, a printed circuit board disposed in the housing and a wireless communication circuit disposed on the printed circuit board, and transmitting or receiving an RF signal of a designated frequency band through the first antenna, the second antenna and the third antenna, the first antenna includes a first dielectric substrate including a first surface and a second surface facing away from the first surface, a first conductive pattern disposed on the first surface, and operating as an antenna radiator for transmitting or receiving an RF signal of a first frequency band and a second conductive pattern disposed on the second surface, and operating as an antenna radiator for transmitting or receiving an RF signal of second first frequency band, the second antenna includes a second dielectric substrate including a third surface and a fourth surface facing away from the third surface, a third conductive pattern disposed on the third surface, and operating as an antenna radiator for transmitting or receiving an RF signal of a second frequency band and a fourth conductive pattern disposed on the fourth surface, and operating as an antenna radiator for transmitting or receiving an RF signal of the second frequency band, the third antenna includes a third dielectric substrate including a fifth surface and a sixth surface facing away from the fifth surface, a fifth conductive pattern disposed on the fifth surface, and operating as an antenna radiator for transmitting or receiving an RF signal of the second frequency band and a sixth conductive pattern disposed on the sixth surface, and operating as an antenna radiator for transmitting or receiving an RF signal of the second frequency band, and the first antenna, the second antenna and the third antenna may be radially disposed based on a virtual center of the housing.

An electronic device according to an embodiment of the disclosure, may reduce the number of antennas while supporting multiple input/output (MIMO) technology and institute of electrical and electronics engineers (IEEE) standard frequencies, and thus reducing a volume of the electronic device.

An electronic device according to an embodiment of the disclosure, may mitigate interference between antennas disposed within the electronic device by obtaining an antenna arrangement space inside the electronic device, and thus improve antenna performance (e.g., radiation performance).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, each of such phrases as "A or B," "at least one of A and B," "at least one of A or B," "A, B, or C," "at least one of A, B, and C," and "at least one of A, B, or C," may include one, or all possible combinations of the items enumerated together in a corresponding one of the phrases. Such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element. Hereinafter, various embodiments of the disclosure shall be described in detail with reference to the accompanying drawings.

Figure 1:
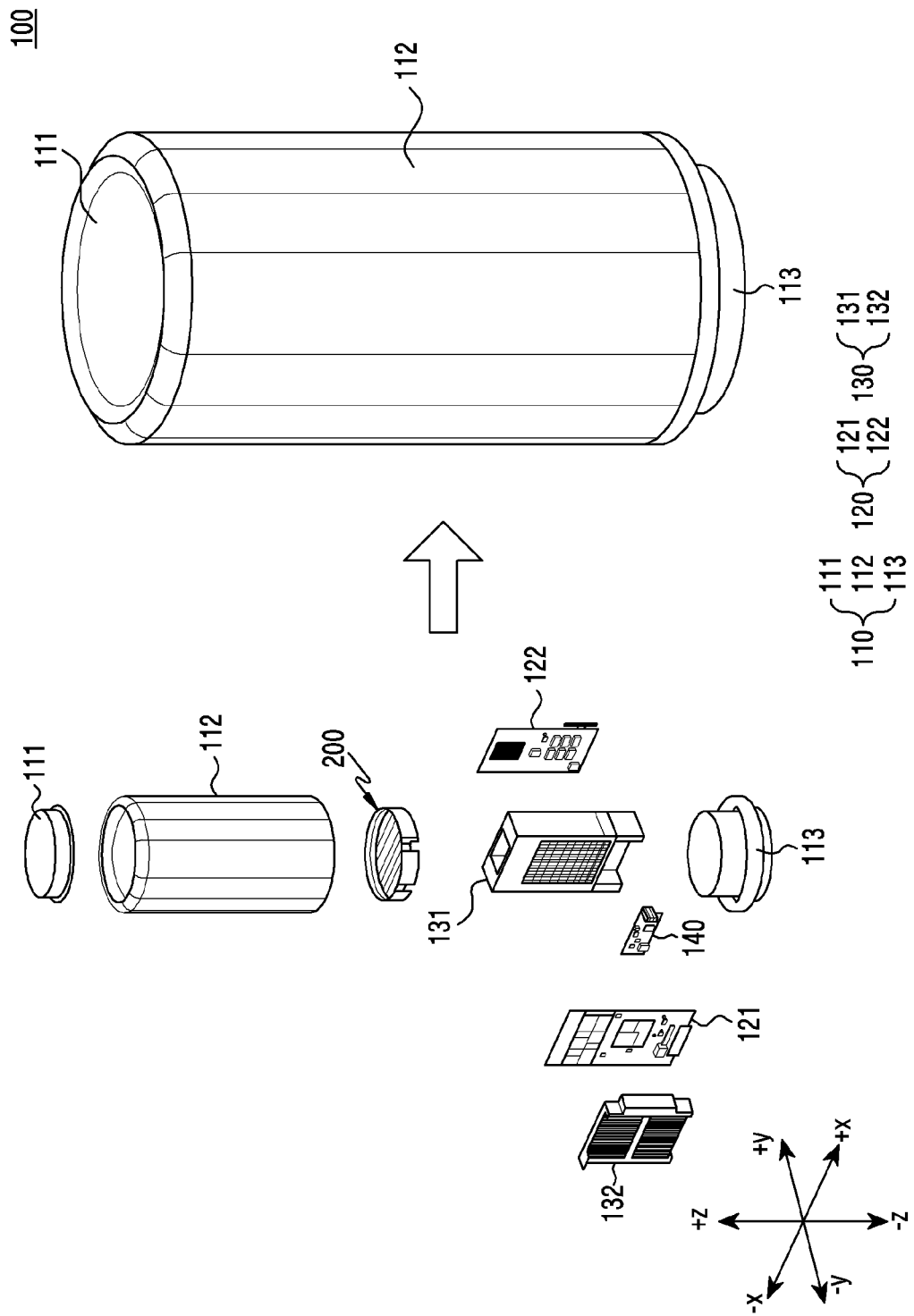
FIG. 1 is an exploded perspective view and an assembled view of an electronic device according to an embodiment of the disclosure.

FIG. 1 is an exploded perspective view and an assembled view of an electronic device according to an embodiment of the disclosure.

Figure 2:
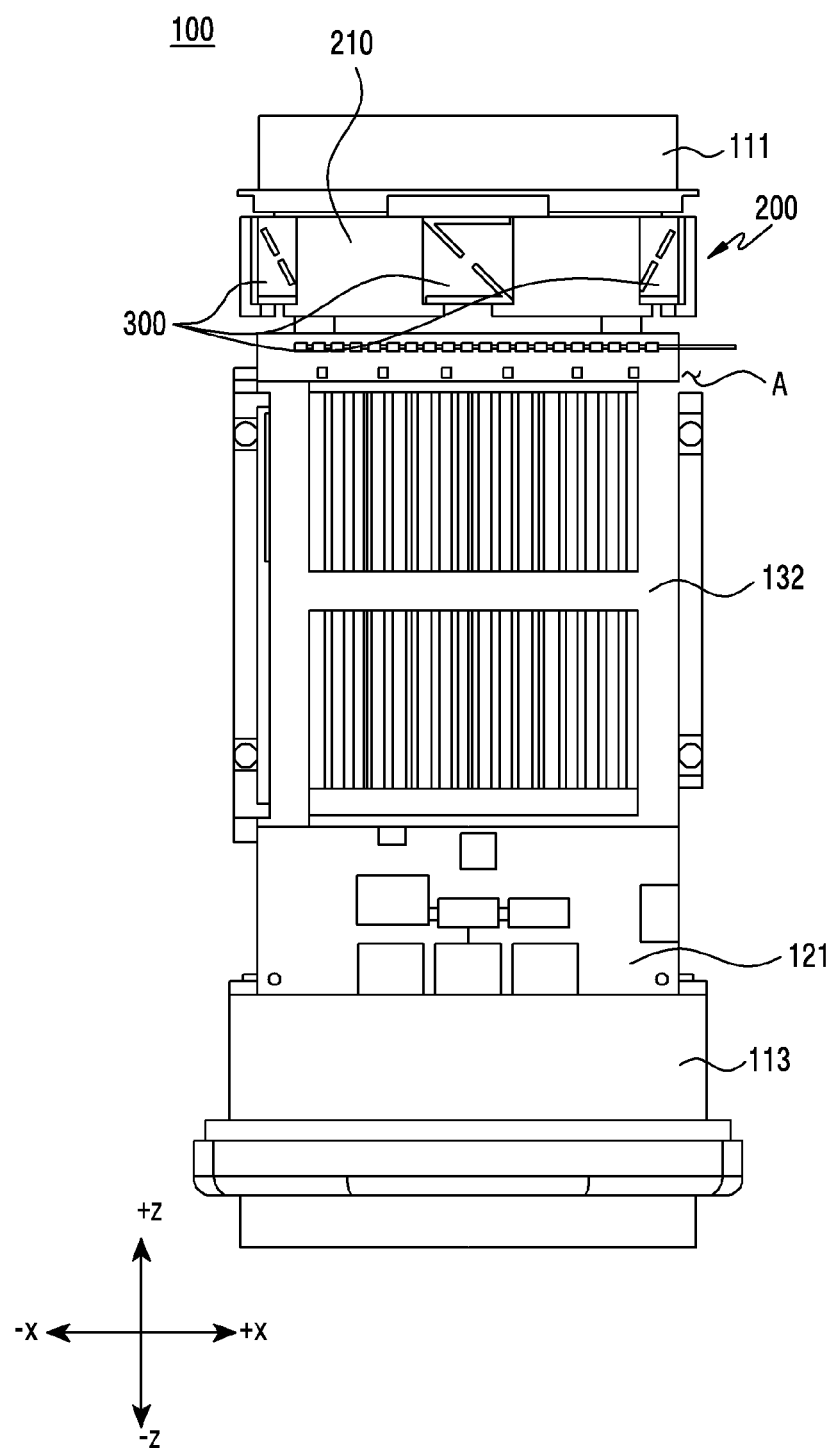
FIG. 2 is a side view with some configuration of an electronic device removed according to an embodiment of the disclosure.

FIG. 2 is a side view with some configuration (e.g., a side cover) of an electronic device removed according to an embodiment of the disclosure. FIG. 2 is the diagram illustrating a side surface of an electronic device 100 when the electronic device 100 of FIG. 1 is viewed from the −y direction.

Referring to FIGS. 1 and 2, the electronic device 100 according to an embodiment may include a housing 110, at least one printed circuit board 120, at least one heat sink 130, a power board 140, and an antenna assembly 200. The electronic device 100 according to an embodiment of the disclosure may be, for example, an access point (AP), but is not limited thereto.

According to another embodiment, the housing 110 may include a top cover 111, a side cover 112, and a fixing member 113, and may form an exterior of the electronic device 100. In one example, the top cover 111 may form a first surface (or a "top surface") facing a first direction (e.g., (e.g., +z direction of FIG. 1) of the electronic device 100, the fixing member 113 may form a second surface (or a "bottom surface") facing an opposite direction (e.g., −z direction of FIG. 1) to the first direction, and the side cover 112 may form a third surface (or a "side surface") perpendicular to the first surface and/or the second surface. In one example, a space (a region A of FIG. 2) (hereinafter, an "internal space") may be formed by the top cover 111, the side cover 112, and the fixing member 113 inside the housing 110, and components (e.g., the at least one printed circuit board 120, the at least one heat sink 130, the power board 140, and/or the antenna assembly 200) of the electronic device 100 may be disposed in the internal space A. In one example, the top cover 111 and/or the side cover 112 may prevent the components of the electronic device 100 disposed in the internal space A formed inside the housing 110 by the top cover 111, the side cover 112 and the fixing member 113 from being damaged by an external impact. In another example, the fixing member 113 may secure the electronic device 100 to a designated position (e.g., the ground). According to yet another embodiment, the housing 110 may be formed in a cylindrical shape, but is not limited thereto, and the housing 110 according to yet another embodiment (not shown) may be formed in a polygonal prism (e.g., a triangular prism, and/or a quadrangular prism) shape having a polygonal bottom surface.

According to yet another embodiment, the at least one printed circuit board 120 may be disposed in the internal space A, and the at least one printed circuit board 120 may include electronic components for performing functions of the electronic device 100. In one example, a wireless communication circuit (e.g., a wireless communication circuit 400 of FIG. 5) for performing wireless communication may be disposed on the at least one printed circuit board 120. The wireless communication circuit may be electrically connected to at least one antenna module 300 of an antenna assembly 200 to transmit or receive a radio frequency (RF) signal, and its description shall be described. In one example, the at least one printed circuit board 120 may be configured in plurality, and may include, for example, a first printed circuit board 121 and a second printed circuit board 122. In another example (not shown), the at least one printed circuit board 120 may be configured as one printed circuit board.

According to yet another embodiment, the at least one heat sink 130 may radiate heat generated in the internal space A of the electronic device 100. In one example, the at least one heat sink 130 may be disposed adjacent to the at least one printed circuit board 120, to dissipate the heat generated during operations of the electronic components disposed on the at least one printed circuit board 120. For example, heat may be generated in transmitting or receiving an RF signal between the wireless communication circuit disposed on the at least one printed circuit board 120 and the at least one antenna module 300 of the antenna assembly 200, and the at least one heat sink 130 may radiate the heat generated by the wireless communication circuit. In one example, the at least one heat sink 130 may include a first heat sink 131 disposed between the first printed circuit board 121 and the second printed circuit board 122 and a second heat sink 132 adjacent to the first printed circuit board 121. However, it is not limited to the above-described embodiment, and the at least one heat sink 130 may include one heat sink, or may include a plurality of heat sinks (e.g., 3, 4, or 4 or more) according to the embodiment.

According to yet another embodiment, the power board 140 may be disposed in the internal space A, and supply power to the components of the electronic device 100. In one example, the power board 140 may be electrically connected to the wireless communication circuit disposed on the at least one printed circuit board 120, and as a result, the power board 140 may supply the power to the wireless communication circuit.

According to yet another embodiment, the antenna assembly 200 may be disposed in the internal space A, and may include a fixing bracket 210 and/or the at least one antenna module 300. In one example, the fixing bracket 210 may be disposed in an upper region (e.g., a region in the +z direction of FIGS. 1 and 2) of the internal space A, to secure the at least one antenna module 300 to the upper region of the internal space A. For example, at least one fixing groove (not shown) may be formed in one region of the fixing bracket 210, and the at least one antenna module 300 may be positioned in the at least one fixing groove of the fixing bracket 210, and thus secured to the upper region of the internal space A. Since the at least one antenna module 300 is disposed above (e.g., the +z direction of FIG. 2) at least one other electronic components (e.g., the at least one printed circuit board 120, the at least one heat sink 130 and/or the power board 140), the electronic device 100 according to yet another embodiment may mitigate radiation performance degradation of the antenna module 300 due to the other electronic components.

Figure 5:
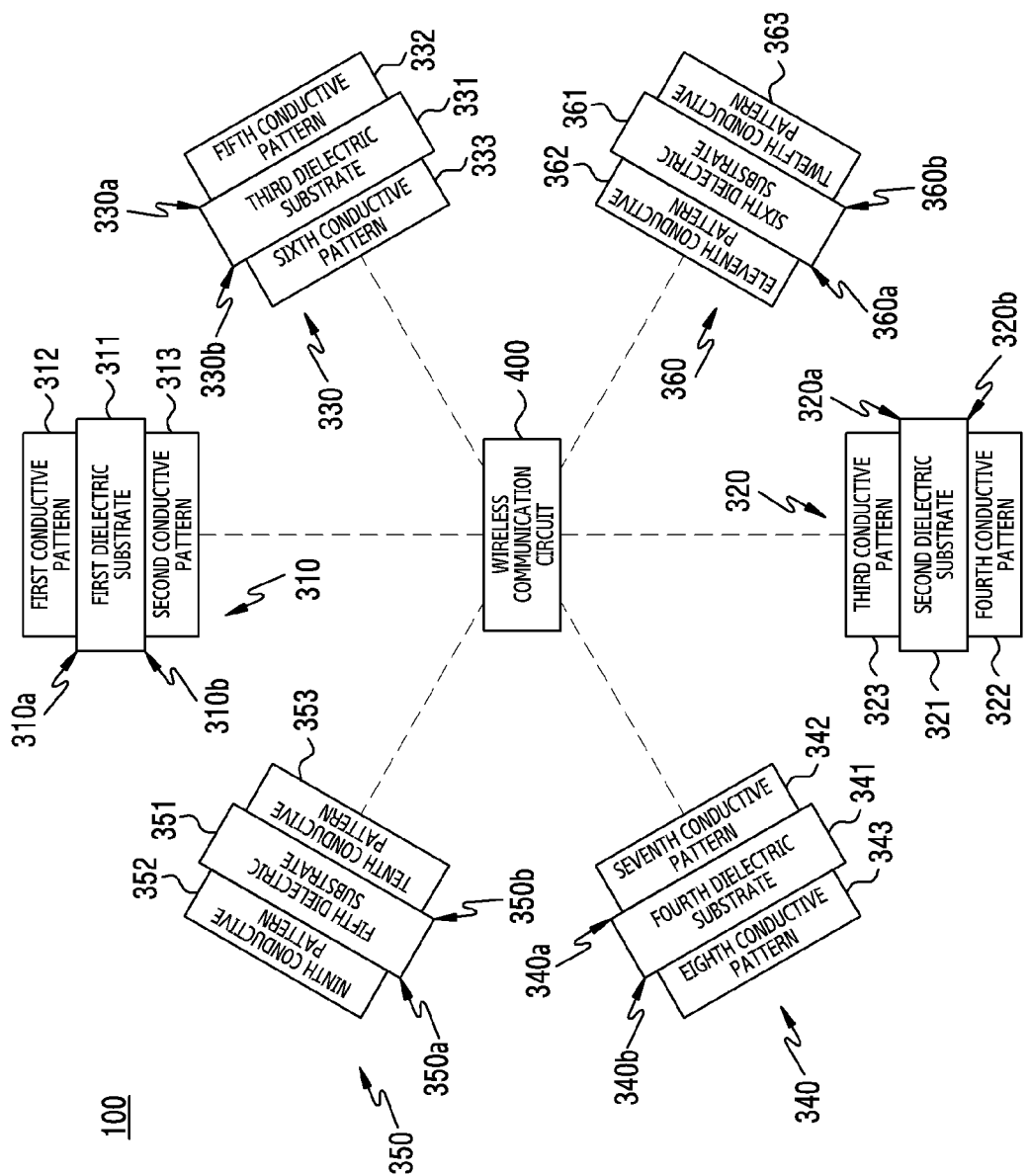
FIG. 5 is a diagram illustrating electrical connections between an antenna and a wireless communication circuit of an electronic device according to an embodiment of the disclosure.

In one example, the at least one antenna module 300 may be electrically connected to the wireless communication circuit (e.g., the wireless communication circuit 400 of FIG. 5). Accordingly, the at least one antenna module 300 may transmit an RF signal of a designated frequency band to at least one external electronic device (not shown), or receive an RF signal of a designated frequency band from at least one external electronic device. However, detailed descriptions on the configuration of the at least one antenna module 300 and the electrical connection with the wireless communication circuit shall be described.

Figure 3A:
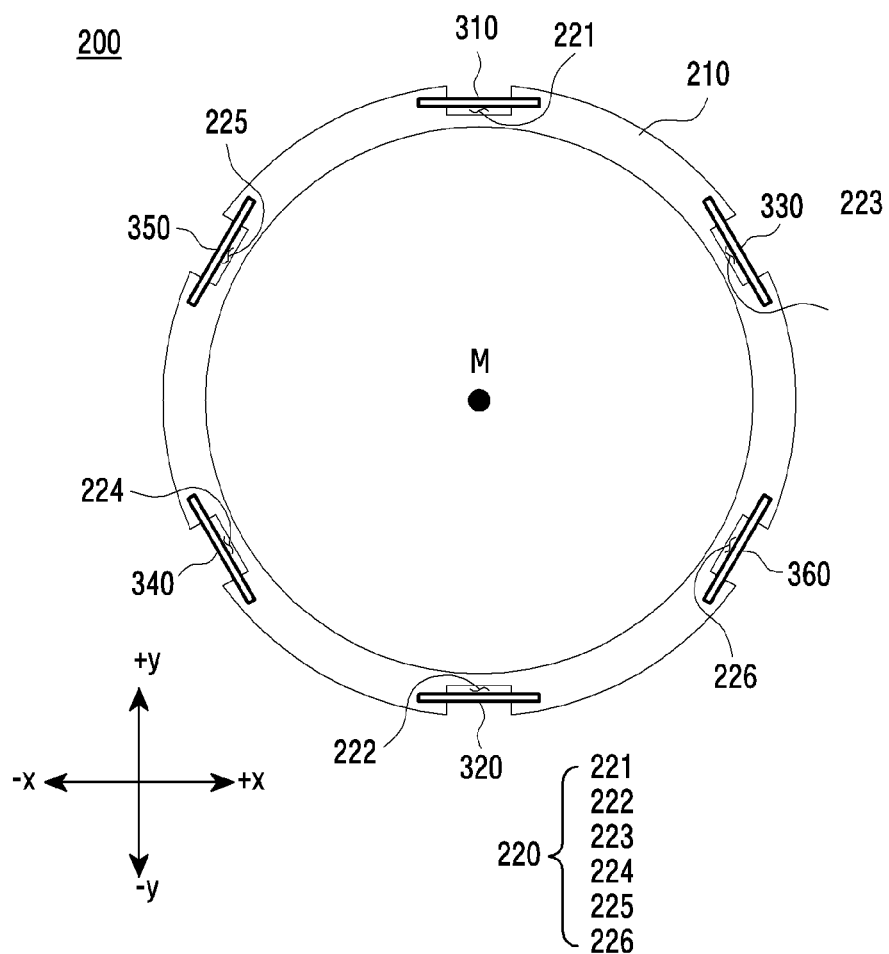
FIG. 3A is a front view of an antenna assembly of an electronic device according to an embodiment of the disclosure.

FIG. 3A is a front view of an antenna assembly of an electronic device according to an embodiment of the disclosure.

Figure 3B:
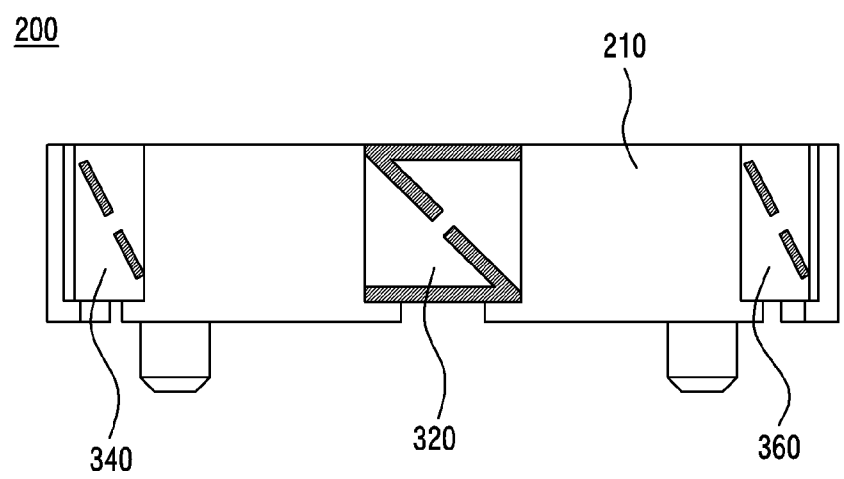
FIG. 3B is a side view of the antenna assembly of FIG. 3A according to an embodiment of the disclosure.
Figure 3B:
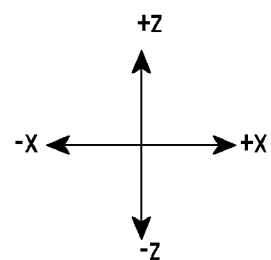

FIG. 3B is a side view of the antenna assembly of FIG. 3A according to an embodiment of the disclosure. FIG. 3A is the view of the antenna assembly 200 of FIGS. 1 and/or 2 viewed from the +z direction of FIGS. 1 and/or 2 and FIG. 3B is the view of the antenna assembly 200 of FIGS. 1 and/or 2 viewed from the −y direction of FIGS. 1 and/or 2.

Referring to FIGS. 3A and 3B, the antenna assembly 200 of the electronic device according to an embodiment may include a fixing bracket 210 (e.g., the fixing bracket 210 of FIG. 2) and at least one antenna module 310, 320, 330, 340, 350, and/or 360 (e.g., the at least one antenna module 300 of FIG. 2).

According to another embodiment, the fixing bracket 210 may include at least one fixing groove 220 for fixing the at least one antenna module 310, 320, 330, 340, 350 and/or 360. In one example, the at least one fixing groove 220 may include a first fixing groove 221, a second fixing groove 222, a third fixing groove 223, a fourth fixing groove 224, a fifth fixing groove 225, and/or a sixth fixing groove 226. The first fixing groove 221, the second fixing groove 222, the third fixing groove 223, the fourth fixing groove 224, the fifth fixing groove 225 and/or the sixth fixing groove 226 may be radially disposed based on a virtual center (M of FIG. 3A) of the fixing bracket 210. For example, based on the virtual center M of the fixing bracket 210, the first fixing groove 221 and the second fixing groove 222 may be disposed to be symmetrical to each other, the third fixing groove 223 and the fourth fixing groove 224 may be disposed to be symmetrical to each other, and the fifth fixing groove 225 and the sixth fixing groove 226 may be disposed to be symmetrical to each other.

According to yet another embodiment, the at least one antenna module 310, 320, 330, 340, 350 and/or 360 may be disposed in the at least one fixing groove 220 of the fixing bracket 210, to operate as an antenna radiator for transmitting or receiving RF signals of various frequency bands. In one example, the at least one antenna module 310, 320, 330, 340, 350 and/or 360 may include a first antenna module 310 disposed in the first fixing groove 221, a second antenna module 320 disposed in the second fixing groove 222, a third antenna module 330 disposed in the third fixing groove 223, a fourth antenna module 340 disposed in the fourth fixing groove 224, a fifth antenna module 350 disposed in the fifth fixing groove 225, and/or a sixth antenna module 360 disposed in the sixth fixing groove 226.

In one example, the first antenna module 310, the second antenna module 320, the third antenna module 330, the fourth antenna module 340, the fifth antenna module 350, and/or the sixth antenna module 360 may be radially disposed based on the virtual center M of the fixing bracket 210 through the arrangement structure of the at least one fixing grooves 220 (e.g., the first fixing groove 221, the second fixing groove 222, the third fixing groove 223, the fourth fixing groove 224, the fifth fixing groove 225, and/or the sixth fixing groove 226). For example, one surface of the first antenna module 310 and one surface of the second antenna module 320 may be disposed to face each other based on the virtual center M of the fixing bracket 210. In another example, one surface of the third antenna module 330 and one surface of the fourth antenna module 340 may be disposed to face each other based on the virtual center M of the fixing bracket 210. In yet another example, one surface of the fifth antenna module 350 and one surface of the sixth antenna module 360 may be disposed to face each other based on the virtual center M of the fixing bracket 210. In one example, the first antenna module 310, the second antenna module 320, the third antenna module 330, the fourth antenna module 340, the fifth antenna module 350 and/or the sixth antenna module 360 may be disposed at equal intervals based on the virtual center M of the fixing bracket 210. For example, the first antenna module 310, the second antenna module 320, the third antenna module 330, the fourth antenna module 340, the fifth antenna module 350 and/or the sixth antenna module 360 may be disposed at intervals of 60° based on the virtual center M of the fixing bracket 210. However, the arrangement positions of the first antenna module 310, the second antenna module 320, the third antenna module 330, the fourth antenna module 340, the fifth antenna module 350 and/or the sixth antenna module 360 are not limited to the above embodiment, and the first antenna module 310, the second antenna module 320, the third antenna module 330, the fourth antenna module 340, the fifth antenna module 350, and/or the sixth antenna module 360 may be disposed at irregular intervals, according to yet another embodiment.

According to yet another embodiment, the at least one antenna module 310, 320, 330, 340, 350 and/or 360 may include a conductive pattern disposed on one surface and a conductive pattern disposed on the other surface facing away from the one surface. For example, the first antenna module 310 may include a first conductive pattern (not shown) disposed on one surface of the first antenna module 310 and/or a second conductive pattern (not shown) disposed on the other surface facing away from the one surface of the first antenna module 310 described above.

In one example, the conductive patterns disposed on one surface and/or the other surface of the at least one antenna module 310, 320, 330, 340, 350 and/or 360 may be electrically connected with a wireless communication circuit (e.g., the wireless communication circuit 400 of FIG. 5), to operate as antenna radiators. For example, the wireless communication circuit may transmit or feed an RF signal of a designated frequency band to the conductive patterns disposed on one surface and/or the other surface of the at least one antenna module 310, 320, 330, 340, 350 and/or 360. As another example, the wireless communication circuit may receive an RF signal of a designated frequency band from the conductive patterns disposed on one surface and/or the other surface of the at least one antenna module 310, 320, 330, 340, 350 and/or 360. For example, the first conductive pattern and/or the second conductive pattern of the first antenna module 310 may be electrically connected to the wireless communication circuit to operate as the antenna radiator for transmitting or receiving the RF signal of the designated frequency band. The configuration of the at least one antenna module 310, 320, 330, 340, 350 and/or 360 and electrical connections of the at least one antenna module 310, 320, 330, 340, 350 and/or 360 and the wireless communication circuit shall be described.

Figure 4:
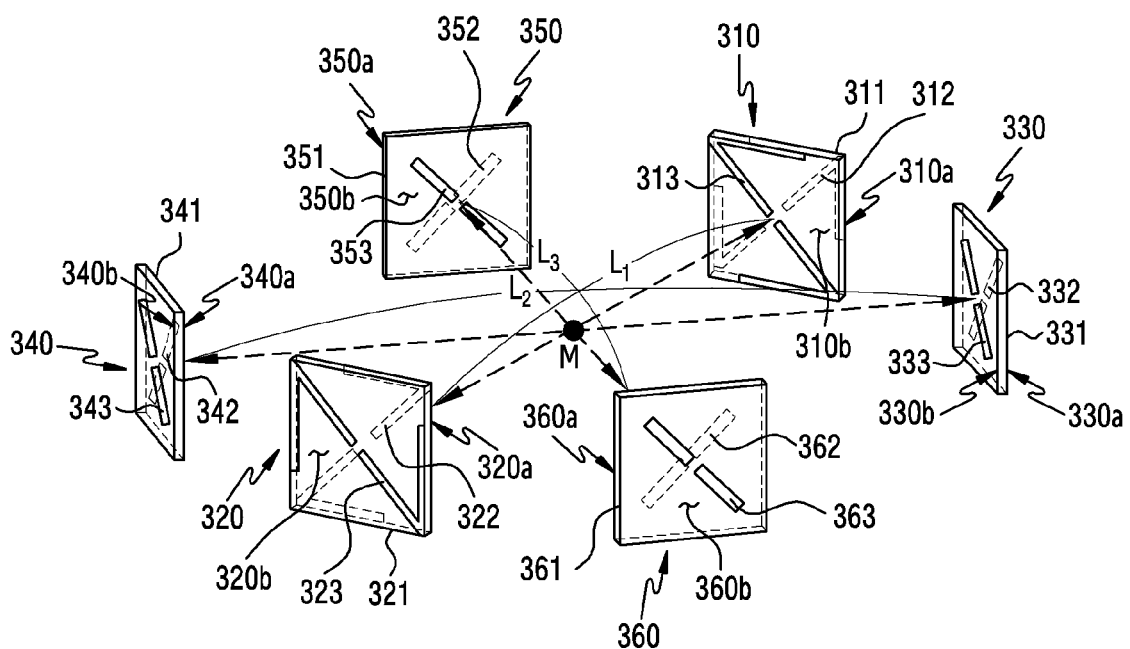
FIG. 4 is a diagram illustrating an antenna arrangement structure inside an electronic device according to an embodiment of the disclosure.

FIG. 4 is a diagram illustrating an antenna (e.g., at least one antenna module) arrangement structure inside an electronic device according to an embodiment of the disclosure.

FIG. 5 is a diagram illustrating electrical connections between an antenna (e.g., at least one antenna module) and a wireless communication circuit of an electronic device according to an embodiment of the disclosure. FIG. 4 is the diagram illustrating the fixing bracket 210 is removed from the antenna assembly 200 of FIG. 3A.

Referring to FIGS. 4 and 5, the electronic device 100 (e.g., the electronic device 100 of FIG. 1) according to an embodiment may include at least one antenna module 310, 320, 330, 340, 350 and/or 360 (e.g., the at least one antenna module 310, 320, 330, 340, 350 and/or 360 of FIGS. 3A and 3B), and a wireless communication circuit 400.

According to another embodiment, the at least one antenna module 310, 320, 330, 340, 350 and/or 360 may include a first antenna module 310 (e.g., the first antenna module 310 of FIG. 3A), a second antenna module 320 (e.g., the second antenna module 320 of FIG. 3A), a third antenna module 330 (e.g., the third antenna module 330 of FIG. 3A), a fourth antenna module 340 (e.g., the fourth antenna module 340 of FIG. 3A), a fifth antenna module 350 (e.g., the fifth antenna module 350 of FIG. 3A), and/or a sixth antenna module 360 (e.g., the sixth antenna module 360 of FIG. 3A). In one example, the first antenna module 310, the second antenna module 320, the third antenna module 330, the fourth antenna module 340, the fifth antenna module 350 and/or the sixth antenna module 360 may be radially disposed based on a virtual center M (e.g., the virtual center M of FIG. 3A). For example, the first antenna module 310 may be disposed to face the second antenna module 320, the third antenna module 330 may be disposed to face the fourth antenna module 340, and the fifth antenna module 350 may be disposed to face the sixth antenna module 360. In one example, the first antenna module 310, the second antenna module 320, the third antenna module 330, the fourth antenna module 340, the fifth antenna module 350 and/or the sixth antenna module 360 may be disposed at the same intervals based on the virtual center M. For example, the first antenna module 310, the second antenna module 320, the third antenna module 330, the fourth antenna module 340, the fifth antenna module 350 and/or the sixth antenna module 360 may be disposed at intervals of 60° based on the virtual center M. However, the arrangement positions of the first antenna module 310, the second antenna module 320, the third antenna module 330, the fourth antenna module 340, the fifth antenna module 350 and/or the sixth antenna module 360 is not limited to the above embodiment, and the first antenna module 310, the second antenna module 320, the third antenna module 330, the fourth antenna module 340, the fifth antenna module 350, and/or the sixth antenna module 360 may be disposed at irregular intervals, according to yet another embodiment.

According to yet another embodiment, the first antenna module 310 may include a first dielectric substrate 311, a first conductive pattern 312 and/or a second conductive pattern 313. In one example, the first dielectric substrate 311 may be a substrate formed of a material having a designated dielectric constant, and the first dielectric substrate 311 may include a first surface 310a and a second surface 310b facing away from the first surface 310a. For example, the first dielectric substrate 311 may be formed of a glass epoxy material (e.g., a flame retardant (FR)4 material and/or a composite epoxy material (CEM)-1 material) and/or a paper phenol (PP) material, but is not limited thereto. In one example, the first conductive pattern 312 may be positioned on the first surface 310a of the first dielectric substrate 311, and operate as an antenna radiator for transmitting or receiving an RF signal of a first frequency band. For example, the first conductive pattern 312 may be electrically connected to the wireless communication circuit 400, and the RF signal of the first frequency band may be transmitted or received between the first conductive pattern 312 and the wireless communication circuit 400. For example, the first frequency band may be a frequency band of about 2.4 GHz through about 2.5 GHz. In one example, the second conductive pattern 313 may be positioned on the second surface 310b of the first dielectric substrate 311, and operate as an antenna radiator for transmitting or receiving an RF signal of the first frequency band in a substantially identical or similar manner to the first conductive pattern 312. For example, the second conductive pattern 313 may be electrically connected to the wireless communication circuit 400, and the RF signal of the first frequency band may be transmitted or received between the second conductive pattern 313 and the wireless communication circuit 400. In one example, the first conductive pattern 312 is disposed on the first surface 310a of the first dielectric substrate 311, the second conductive pattern 313 is disposed on the second surface 310b of the first dielectric substrate 311, and accordingly the first antenna module 310 may implement substantially the same effect as two antennas disposed to transmit and/or receive RF signals of the first frequency band in the electronic device 100. In another example, as the first conductive pattern 312 and the second conductive pattern 313 operate as the antenna radiators for transmitting and/or receiving the RF signals of the same first frequency band, the first conductive pattern 312 may be disposed substantially perpendicularly to the second conductive pattern 313. For example, an angle between the first conductive pattern 312 and the second conductive pattern 313 may be substantially vertical. As the first conductive pattern 312 and the second conductive pattern 313 are disposed substantially vertically, isolation may be attained between the RF signal radiated from the first conductive pattern 312 and the RF signal radiated from the second conductive pattern 313. However, its detailed description shall be provided.

According to yet another embodiment, the second antenna module 320 may include a second dielectric substrate 321, a third conductive pattern 322 and/or a fourth conductive pattern 323. In one example, the second dielectric substrate 321 may be a substrate formed of a material having a designated dielectric constant (e.g., a glass epoxy material (e.g., an FR4 material and/or a CEM-1 material) and/or a PP material), and the second dielectric substrate 321 may include a third surface 320a and a fourth surface 320b facing away from the third surface 320a. In one example, the third surface 320a of the second dielectric substrate 321 may be disposed to face the second surface 310b of the first dielectric substrate 311. For example, the third surface 320a of the second dielectric substrate 321 may be disposed to face the second surface 310b of the first dielectric substrate 311. In one example, the third conductive pattern 322 may be positioned on the third surface 320a of the second dielectric substrate 321, and operate as an antenna radiator for transmitting or receiving an RF signal of the first frequency band. For example, the third conductive pattern 322 may be electrically connected to the wireless communication circuit 400, and the RF signal of the first frequency band may be transmitted or received between the third conductive pattern 322 and the wireless communication circuit 400. For example, the first frequency band may be the frequency band of about 2.4 GHz through about 2.5 GHz. In one example, the fourth conductive pattern 323 may be positioned on the fourth surface 320b of the second dielectric substrate 321, and operate as an antenna radiator for transmitting or receiving the RF signal of the first frequency band in the substantially identical or similar manner to the third conductive pattern 322. For example, the fourth conductive pattern 323 may be electrically connected to the wireless communication circuit 400, and the RF signal of the first frequency band may be transmitted or received between the fourth conductive pattern 323 and the wireless communication circuit 400. In one example, as the third conductive pattern 322 is disposed on the third surface 320a of the second dielectric substrate 321 and the fourth conductive pattern 323 is disposed on the fourth surface 320b of the second dielectric substrate 321, the second antenna module 320 may realize substantially the same effect as two antennas disposed for transmitting or receiving the RF signals of the first frequency band in the electronic device 100. In another example, as the third conductive pattern 322 and the fourth conductive pattern 323 operate as the antenna radiators for transmitting and/or receiving the RF signals of the same first frequency band, the third conductive pattern 322 may be disposed to be substantially perpendicular to the fourth conductive pattern 323. As the third conductive pattern 322 and the fourth conductive pattern 323 are disposed substantially vertically, isolation may be attained between the RF signal radiated from the third conductive pattern 322 and the RF signal radiated from the fourth conductive pattern 323, and a detailed description thereof shall be provided.

According to an embodiment, the second antenna module 320 may be disposed apart from the first antenna module 310 by a designated distance. For example, the third surface 320a of the second antenna module 320 may be disposed away from the second surface 310b of the first antenna module 310 by a first length $L_1$. In one example, the first length $L_1$ may be a length (e.g., about 6.25 cm) over ½ wavelength (or "½λ") of the RF signal of the first frequency band (e.g., about 2.4 GHz through about 2.5 GHz frequency band), but is not limited thereto. In one example, as the first antenna module 310 for transmitting or receiving the RF signal of the first frequency band and the second antenna module 320 for transmitting or receiving the RF signal of the same first frequency band as the first antenna module 310 are spaced apart by the designated distance, isolation may be obtained between the first antenna module 310 and the second antenna module 320. Hence, the electronic device 100 according to yet another embodiment may improve performance (e.g., radiation performance) of the first antenna module 310 and/or the second antenna module 320.

According to yet another embodiment, using the first conductive pattern 312 and the second conductive pattern 313 of the first antenna module 310 and/or the third conductive pattern 322 and the fourth conductive pattern 323 of the second antenna module 320 as the antenna radiators for transmitting or receiving the RF signal of the first frequency band, the electronic device 100 may implement a 4×4 multiple input multiple output (MIMO) (or "multiple input/output") antenna of the first frequency band.

According to yet another embodiment, the third antenna module 330 may include a third dielectric substrate 331, a fifth conductive pattern 332 and/or a sixth conductive pattern 333. In one example, the third dielectric substrate 331 may be a substrate formed of a material having a designated dielectric constant (e.g., a glass epoxy material (e.g., an FR4 material and/or a CEM-1 material) and/or a PP material), and the third dielectric substrate 331 may include a fifth surface 330a and a sixth surface 330b facing away from the fifth surface 330a. In one example, the fifth conductive pattern 332 may be positioned on the fifth surface 330a of the third dielectric substrate 331, and may operate as an antenna radiator for transmitting or receiving an RF signal of a second frequency band. For example, the fifth conductive pattern 332 may be electrically connected to the wireless communication circuit 400, and the RF signal of the second frequency band may be transmitted or received between the fifth conductive pattern 332 and the wireless communication circuit 400. For example, the second frequency band may be a 5 GHz low band (LB) frequency band (e.g., about 5.1 GHz through about 5.2 GHz). In one example, the sixth conductive pattern 333 may be positioned on the sixth surface 330b of the third dielectric substrate 331, and operate as an antenna radiator for transmitting or receiving the RF signal of the second frequency band in a substantially identical or similar manner to the fifth conductive pattern 332. For example, the sixth conductive pattern 333 may be electrically connected to the wireless communication circuit 400, and the RF signal of the second frequency band may be transmitted or received between the sixth conductive pattern 333 and the wireless communication circuit 400. In one example, as the fifth conductive pattern 332 is disposed on the fifth surface 330a of the third dielectric substrate 331 and the sixth conductive pattern 333 is disposed on the sixth surface 330b of the third dielectric substrate 331, the third antenna module 330 may realize substantially the same effect as two antennas disposed for transmitting or receiving the RF signals of the second frequency band in the electronic device 100. In another example, as the fifth conductive pattern 332 and the sixth conductive pattern 333 operate as the antenna radiators for transmitting and/or receiving the RF signals of the same second frequency band, the fifth conductive pattern 332 may be disposed to be substantially perpendicular to the sixth conductive pattern 333. As the fifth conductive pattern 332 and the sixth conductive pattern 333 are disposed substantially vertically, isolation may be obtained between the RF signal radiated from the fifth conductive pattern 332 and the RF signal radiated from the sixth conductive pattern 333, and a detailed description thereof shall be provided.

According to yet another embodiment, the fourth antenna module 340 may include a fourth dielectric substrate 341, a seventh conductive pattern 342 and/or an eighth conductive pattern 343. In one example, the fourth dielectric substrate 341 may be a substrate formed of a material having a designated dielectric constant (e.g., a glass epoxy material (e.g., an FR4 material and/or a CEM-1 material) and/or a PP material), and the fourth dielectric substrate 341 may include a seventh surface 340a and an eighth surface 340b facing away from the seventh surface 340a. In one example, the seventh surface 340a of the fourth dielectric substrate 341 may be disposed to face the sixth surface 330b of the third dielectric substrate 331. For example, the seventh surface 340a of the fourth dielectric substrate 341 may be disposed to face the sixth surface 330b of the third dielectric substrate 331. In one example, the seventh conductive pattern 342 may be positioned on the seventh surface 340a of the fourth dielectric substrate 341, and operate as an antenna radiator for transmitting or receiving an RF signal of the second frequency band. For example, the seventh conductive pattern 342 may be electrically connected to the wireless communication circuit 400, and the RF signal of the second frequency band may be transmitted or received between the seventh conductive pattern 342 and the wireless communication circuit 400. For example, the second frequency band may be a 5 GHz LB frequency band (e.g., about 5.1 GHz through about 5.2 GHz). In one example, the eighth conductive pattern 343 may be positioned on the eighth surface 340b of the fourth dielectric substrate 341, and operate as an antenna radiator for transmitting or receiving an RF signal of the second frequency band in a substantially identical or similar manner to the seventh conductive pattern 342. For example, the eighth conductive pattern 343 may be electrically connected to the wireless communication circuit 400, and the RF signal of the second frequency band may be transmitted or received between the eighth conductive pattern 343 and the wireless communication circuit 400. In one example, as the seventh conductive pattern 342 is disposed on the seventh surface 340a of the fourth dielectric substrate 341 and the eighth conductive pattern 343 is disposed on the eighth surface 340b of the fourth dielectric substrate 341, the fourth antenna module 340 may realize substantially the same effect as if two antennas disposed for transmitting or receiving the RF signals of the second frequency band in the electronic device 100. In another example, as the seventh conductive pattern 342 and the eighth conductive pattern 343 operate as the antenna radiators for transmitting and/or receiving RF signals of the same second frequency band, the seventh conductive pattern 342 may be disposed to be substantially perpendicular to the eighth conductive pattern 343. As the seventh conductive pattern 342 and the eighth conductive pattern 343 are disposed substantially vertically, isolation may be obtained between the RF signal radiated from the seventh conductive pattern 342 and the RF signal radiated from the eighth conductive pattern 343, and a detailed description thereof will be provided.

According to yet another embodiment, the fourth antenna module 340 may be disposed away from the third antenna module 330 by a designated distance. For example, the seventh surface 340a of the fourth antenna module 340 may be disposed apart from the sixth surface 330b of the third antenna module 330 by a second length $L_2$. In one example, the second length $L_2$ may be a length (e.g., about 3 cm) over ½ wavelength (or "½λ") of the RF signal of the second frequency band, but is limited thereto. In one example, as the third antenna module 330 for transmitting or receiving the RF signal of the second frequency band and the fourth antenna module 340 for transmitting or receiving the RF signal of the same second frequency band as the third antenna module 330 are spaced apart by the designated distance, isolation may be obtained between the third antenna module 330 and the fourth antenna module 340. Thus, the electronic device 100 according to yet another embodiment may improve the radiation performance of the third antenna module 330 and/or the fourth antenna module 340.

According to yet another embodiment, by using the fifth conductive pattern 332 and the sixth conductive pattern 333 of the third antenna module 330 and/or the seventh conductive pattern 342 and the eighth conductive pattern 343 of the fourth antenna module 340 as the antenna radiators for transmitting or receiving RF signals of the second frequency band, the electronic device 100 may implemented a 4×4 MIMO antenna of the second frequency band.

According to yet another embodiment, the fifth antenna module 350 may include a fifth dielectric substrate 351, a ninth conductive pattern 352 and/or a tenth conductive pattern 353. In one example, the fifth dielectric substrate 351 may be a substrate formed of a material having a designated dielectric constant (e.g., a glass epoxy material (e.g., an FR4 material and/or a CEM-1 material) and/or a PP material), and the fifth dielectric substrate 351 may include a ninth surface 350a and a tenth surface 350b facing away from the ninth surface 350a. In one example, the ninth conductive pattern 352 may be positioned on the ninth surface 350a of the fifth dielectric substrate 351, and operate as an antenna radiator for transmitting or receiving an RF signal of a third frequency band. For example, the ninth conductive pattern 352 may be electrically connected to the wireless communication circuit 400, and the RF signal of the third frequency band may be transmitted or received between the ninth conductive pattern 352 and the wireless communication circuit 400. For example, the third frequency band may be a 5 GHz high band (LB) frequency band (e.g., about 5.6 GHz through about 5.8 GHz). In one example, the tenth conductive pattern 353 may be positioned on the tenth surface 350b of the fifth dielectric substrate 351, and operate as an antenna radiator for transmitting or receiving the RF signal of the third frequency band in a substantially identical or similar manner to the ninth conductive pattern 352. For example, the tenth conductive pattern 353 may be electrically connected to the wireless communication circuit 400, and the RF signal of the third frequency band may be transmitted or received between the tenth conductive pattern 353 and the wireless communication circuit 400. In one example, as the ninth conductive pattern 352 is disposed on the ninth surface 350*a* of the fifth dielectric substrate 351 and the tenth conductive pattern 353 is disposed on the tenth surface 350*b* of the fifth dielectric substrate 351, the fifth antenna module 350 may realize substantially the same effect as two antennas disposed for transmitting or receiving RF signals of the third frequency band in the electronic device 100. In another example, as the ninth conductive pattern 352 and the tenth conductive pattern 353 operate as the antenna radiators for transmitting and/or receiving the RF signals of the same third frequency band, the ninth conductive pattern 352 may be disposed to be substantially perpendicular to the tenth conductive pattern 353. As the ninth conductive pattern 352 and the tenth conductive pattern 353 are disposed substantially vertically, isolation may be obtained between the RF signal radiated from the ninth conductive pattern 352 and the RF signal radiated from the tenth conductive pattern 353, and a detailed description thereof shall be provided.

According to yet another embodiment, the sixth antenna module 360 may include a sixth dielectric substrate 361, an eleventh conductive pattern 362 and/or a twelfth conductive pattern 363. In one example, the sixth dielectric substrate 361 may be a substrate formed of a material having a designated dielectric constant (e.g., a glass epoxy material (e.g., an FR4 material and/or a CEM-1 material) and/or a PP material), and the sixth dielectric substrate 361 may include an eleventh surface 360*a* and a twelfth surface 360*b* facing away from the eleventh surface 360*a*. In one example, the eleventh surface 360*a* of the sixth dielectric substrate 361 may be disposed to face the tenth surface 350*b* of the fifth dielectric substrate 351. For example, the eleventh surface 360*a* of the sixth dielectric substrate 361 may be disposed to face the tenth surface 350*b* of the fifth dielectric substrate 351. In one example, the eleventh conductive pattern 362 may be positioned on the eleventh surface 360*a* of the sixth dielectric substrate 361, and operate as an antenna radiator for transmitting or receiving an RF signal of the third frequency band. For example, the eleventh conductive pattern 362 may be electrically connected to the wireless communication circuit 400, and the RF signal of the third frequency band may be transmitted or received between the eleventh conductive pattern 362 and the wireless communication circuit 400. For example, the third frequency band may be a 5 GHz high band (LB) frequency band (e.g., about 5.6 GHz through about 5.8 GHz). In one example, the twelfth conductive pattern 363 may be positioned on the twelfth surface 360*b* of the sixth dielectric substrate 361, and operate as an antenna radiator for transmitting or receiving an RF signal of the third frequency band in a substantially identical or similar manner to the eleventh conductive pattern 362. For example, the twelfth conductive pattern 363 may be electrically connected to the wireless communication circuit 400, and the RF signal of the third frequency band may be transmitted or received between the twelfth conductive pattern 363 and the wireless communication circuit 400. In one example, as the eleventh conductive pattern 362 is disposed on the eleventh surface 360*a* of the sixth dielectric substrate 361 and the twelfth conductive pattern 363 is disposed on the twelfth surface 360*b* of the sixth dielectric substrate 361, the sixth antenna module 360 may realize substantially the same effect as two antennas disposed for transmitting or receiving the RF signals of the third frequency band in the electronic device 100. In another example, as the eleventh conductive pattern 362 and the twelfth conductive pattern 363 operate as the antenna radiators for transmitting and/or receiving the RF signals of the same third frequency band, the eleventh conductive pattern 362 may be disposed to be substantially perpendicular to the twelfth conductive pattern 363. As the eleventh conductive pattern 362 and the twelfth conductive pattern 363 are disposed substantially vertically, isolation may be obtained between the RF signal radiated from the eleventh conductive pattern 362 and the RF signal radiated from the twelfth conductive pattern 363, and a detailed description thereof shall be provided. According to yet another embodiment, the sixth antenna module 360 may be disposed apart from the fifth antenna module 350 by a designated distance. For example, the eleventh surface 360*a* of the sixth antenna module 360 may be disposed apart from the tenth surface 350*b* of the fifth antenna module 350 by a third length $L_3$. In one example, the third length $L_3$ may be a length (e.g., about 3 cm) over ½ wavelength (or "½λ") of the RF signal of the third frequency band, but is limited thereto. In another example, the third length $L_3$ between the fifth antenna module 350 and the sixth antenna module 360 may be equal to the second length $L_2$ between the third antenna module 330 and the fourth antenna module 340, but is not limited thereto. In one example, as the fifth antenna module 350 transmitting or receiving the RF signal of the third frequency band and the sixth antenna module 360 transmitting or receiving the RF signal of the same third frequency band as the fifth antenna module 350 are spaced apart by the designated distance, isolation may be obtained between the fifth antenna module 350 and the sixth antenna module 360. Hence, the electronic device 100 according to yet another embodiment may improve radiation performance of the fifth antenna module 350 and/or the sixth antenna module 360.

According to yet another embodiment, by using the ninth conductive pattern 352 and the tenth conductive pattern 353 of the fifth antenna module 350 and/or the eleventh conductive pattern 362 and the twelfth conductive pattern 363 of the sixth antenna module 360 as the antenna radiators for transmitting or receiving the RF signals of the third frequency band, the electronic device 100 may implement a 4×4 MIMO antenna of the third frequency band.

According to yet another embodiment, the wireless communication circuit 400 may be disposed on a printed circuit board (e.g., the at least one printed circuit board 120 of FIG. 1), and may be electrically connected with at least one antenna module 310, 320, 330, 340, 350 and/or 360. In one example, the wireless communication circuit 400 may be electrically connected to the at least one antenna module 310, 320, 330, 340, 350 and/or 360 through an electrical connection member (not shown). The electrical connection member may include, for example, a signal wire, a coaxial cable, a flexible printed circuit board (FPCB), and/or a conductive via, but is not limited thereto. In one example, the wireless communication circuit 400 may transmit an RF signal of a designated frequency band to the at least one antenna module 310, 320, 330, 340, 350 and/or 360, or receive an RF signal of a designated frequency band from the at least one antenna module 310, 320, 330, 340, 350 and/or 360. For example, the wireless communication circuit 400 may transmit an RF signal of the first frequency band (e.g., about 2.4 GHz through about 2.5 GHz frequency band) to the first antenna module 310 and/or the second antenna module 320, or receive an RF signal of the first frequency band from the first antenna module 310 and/or the second antenna module 320. In another example, the wireless communication circuit 400 may transmit an RF signal of the second frequency band (e.g., about 5 GHz LB frequency band) to the third antenna module 330 and/or the fourth antenna module 340, or receive an RF signal of the second frequency band from the third antenna module 330 and/or the fourth antenna module 340. In yet another example, the wireless communication circuit 400 may transmit an RF of the third frequency band (e.g., about 5 GHz HB frequency band) to the fifth antenna module 350 and/or the sixth antenna module 360, or receive an RF signal of the third frequency band from the fifth antenna module 350 and/or the sixth antenna module 360.

According to yet another embodiment, the electronic device 100 may implement the 4×4 MIMO antenna of about 2.4 GHz through about 2.5 GHz frequency band by means of the first antenna module 310 and/or the second antenna module 320, and may implement an 8×8 MIMO antenna of about 5 GHz frequency band through the third antenna module 330, the fourth antenna module 340, the fifth antenna module 350 and/or the sixth antenna module 360.

According to yet another embodiment, a fixing bracket (e.g., the fixing bracket 210 of FIG. 3A) of the electronic device 100 may be formed in a circular shape. In the above case, the first antenna module 310, the second antenna module 320, the third antenna module 330, the fourth antenna module 340, the fifth antenna module 350 and/or the sixth antenna module 360 may be radially disposed based on a virtual center (e.g., M of FIG. 3A) of the fixing bracket. In one example, the first length $L_1$ between the first antenna module 310 and the second antenna module 320, the second length $L_2$ between the third antenna module 330 and the fourth antenna module 340 and/or the third length $L_3$ between the fifth antenna module 350 and the sixth antenna module 360 may be substantially the same. For example, to obtain the isolations between the first antenna module 310, the second antenna module 320, the third antenna module 330, the fourth antenna module 340, the fifth antenna module 350 and/or the sixth antenna module 360, the first length $L_1$, the second length $L_2$, and/or the third length $L_3$ may be the length (e.g., about 6.25 cm) over the wavelength (or "½λ") of the RF signal of the first frequency band, but is not limited thereto.

Figure 6A:
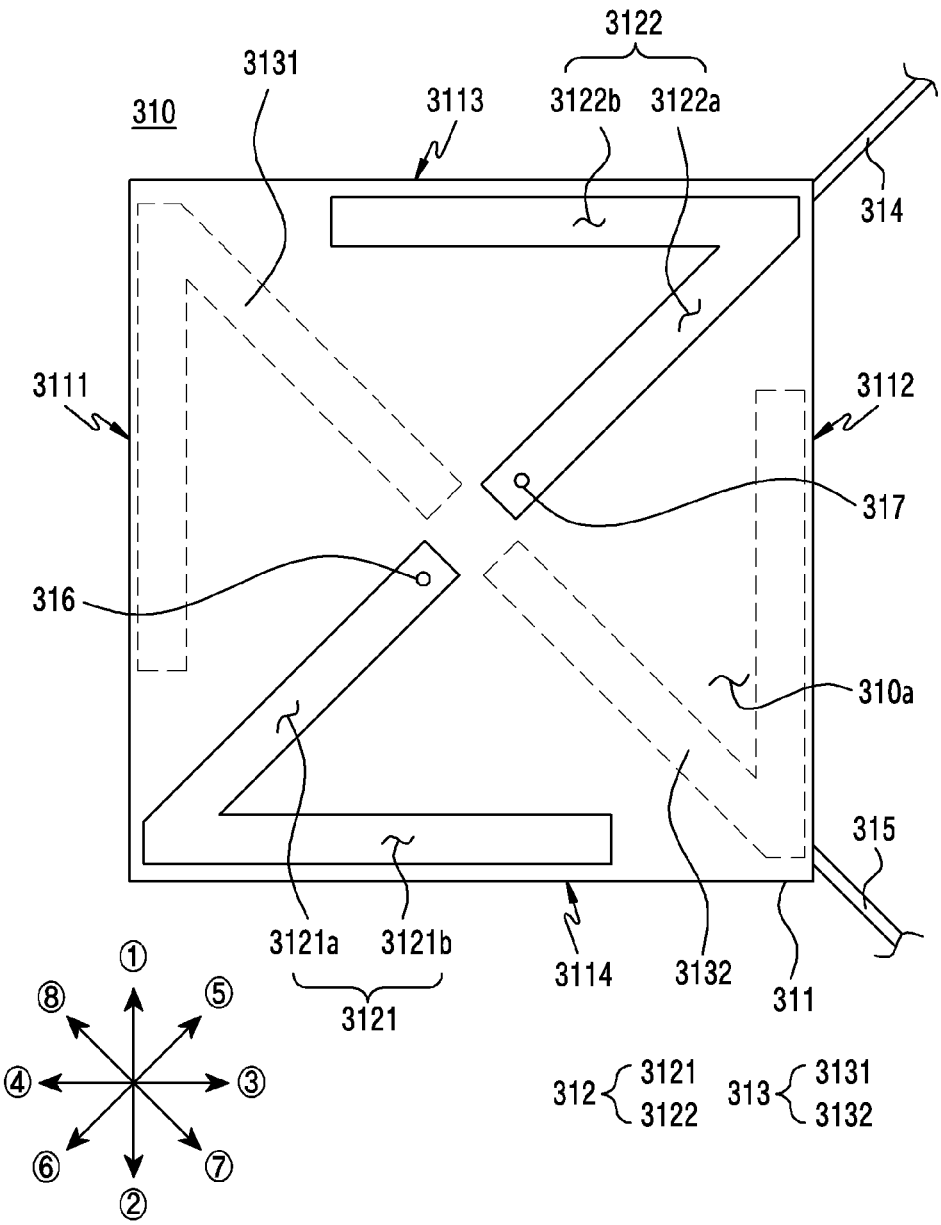
FIG. 6A is a diagram illustrating one surface of a first antenna module of an electronic device according to an embodiment of the disclosure.

FIG. 6A is a diagram illustrating one surface (i.e., first surface 310a) of a first antenna module 310 of an electronic device according to an embodiment of the disclosure.

Figure 6B:
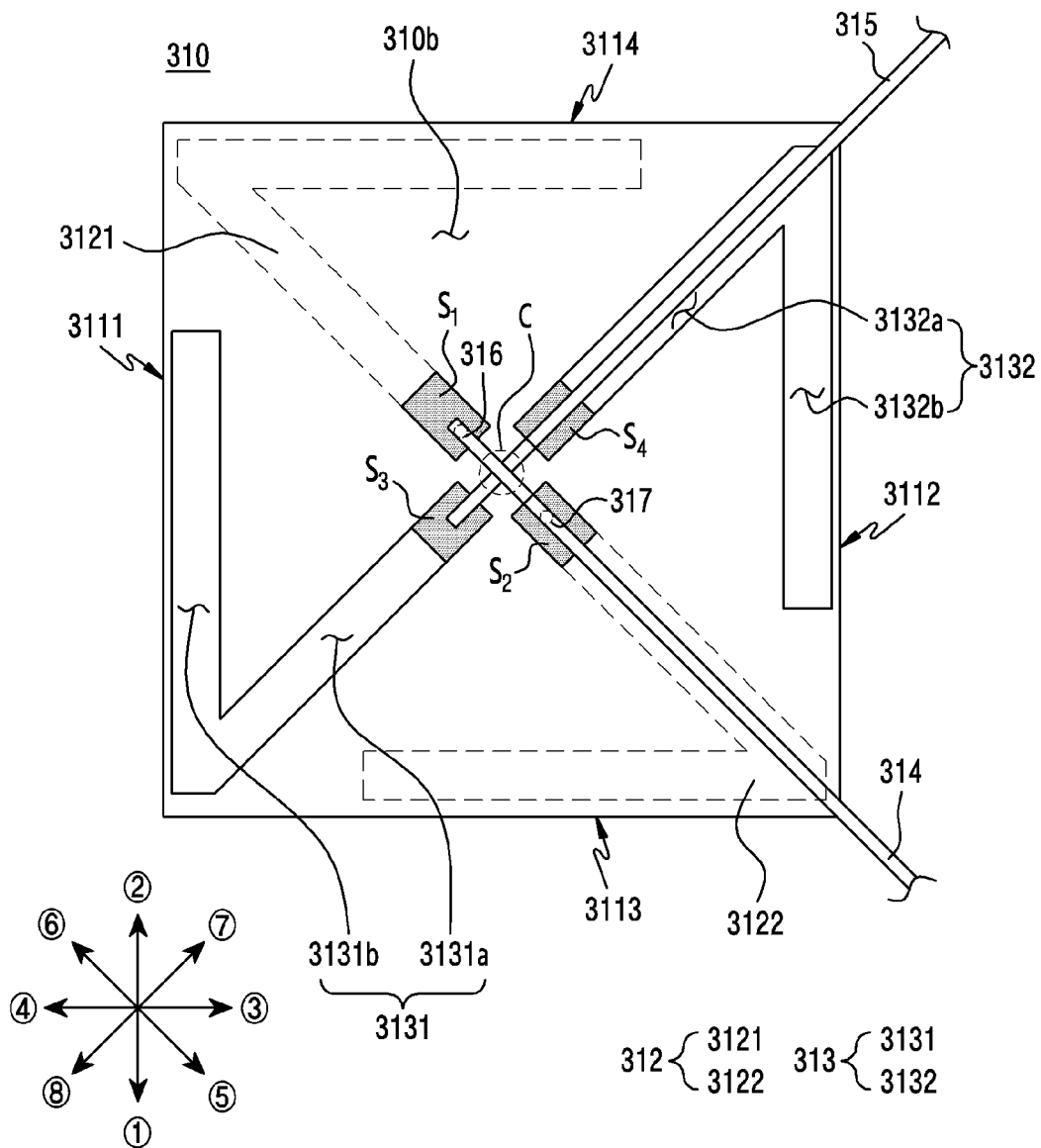
FIG. 6B is a diagram illustrating another surface of the first antenna module of FIG. 6A according to an embodiment of the disclosure.

FIG. 6B is a diagram illustrating another surface (i.e., second surface) of a first antenna module of FIG. 6A according to an embodiment of the disclosure.

Figure 6C:
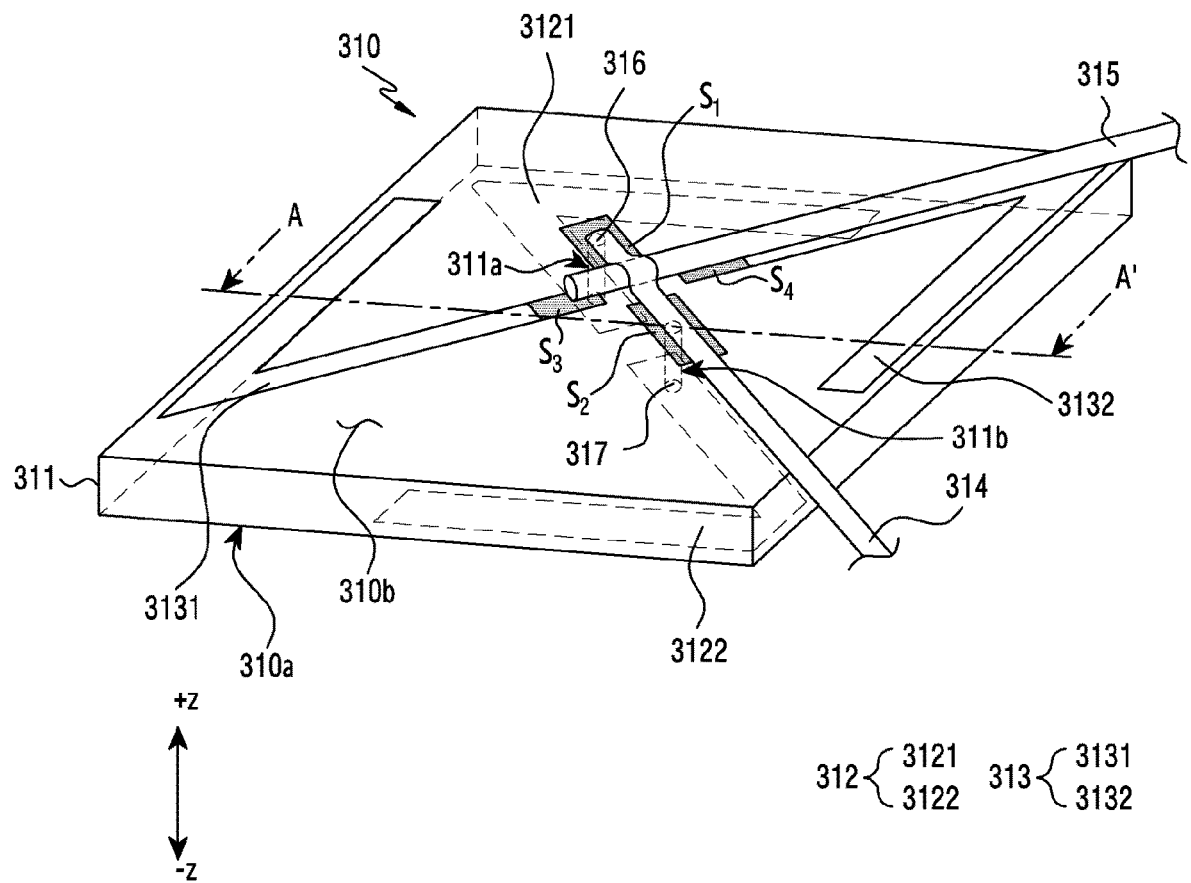
FIG. 6C is a perspective view of the first antenna module of FIG. 6A according to an embodiment of the disclosure.

FIG. 6C is a perspective view of the first antenna module of FIG. 6A according to an embodiment of the disclosure.

Figure 6D:
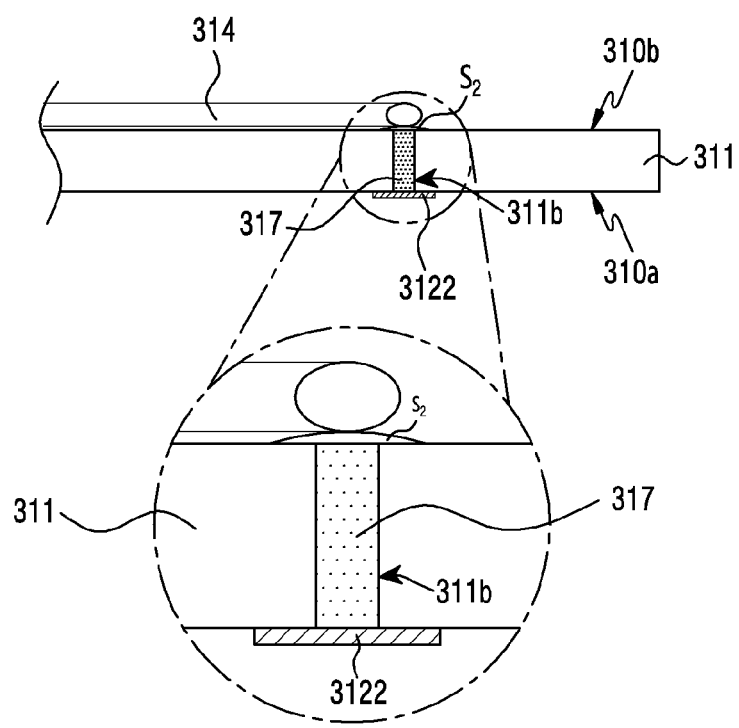
FIG. 6D is a cross-sectional view of the first antenna module of FIG. 6C taken along a A-A' direction according to an embodiment of the disclosure.

FIG. 6D is a cross-sectional view of the first antenna module of FIG. 6C taken along a A-A' direction according to an embodiment of the disclosure. While only the structure of the first antenna module 310 is shown in FIGS. 6A, 6B, 6C, and/or 6D of the disclosure, the same structure as the first antenna module 310 may be applied to a second antenna module (e.g., the second antenna module 320 of FIG. 4).

Referring to FIGS. 6A, 6B, 6C, and 6D, the first antenna module 310 (e.g., the first antenna module 310 of FIGS. 4 and 5) of the electronic device (e.g., the electronic device 100 of FIG. 1) according to an embodiment may include a first dielectric substrate 311 (e.g., the first dielectric substrate 311 of FIGS. 4 and 5), a first conductive pattern 312 (e.g., the first conductive pattern 312 of FIG. 5), and/or a second conductive pattern 313 (e.g., the second conductive pattern 313 of FIG. 5).

According to another embodiment, the first dielectric substrate 311 may include a first surface 310a (e.g., the first surface 310a of FIG. 5) and/or a second surface 310b (e.g., the second surface 310b of FIG. 5). In one example, the first dielectric substrate 311 may include a first side surface 3111 extending along a first direction (e.g., a direction ① of FIG. 6A), a second side surface 3112 parallel to the first side surface 3111 and extending along the first direction, a third side surface 3113 extending along a third direction (e.g., a direction ③ of FIG. 6A) substantially perpendicular to the first direction and connecting one end of the first side surface 3111 (e.g., one end of the direction ① of FIG. 6A) and one end of the second side surface 3112 (e.g., one end of the direction ① of FIG. 6A) and/or a fourth side surface 3114 parallel to the third side surface 3113 and connecting the other end of the first side surface 3111 (e.g., one end of a direction ② of FIG. 6A) and the other end of the second side surface 3112 (e.g., one end of the direction ② of FIG. 6A). While only the embodiment in which the first dielectric substrate 311 is formed in a rectangular shape is illustrated in the drawings, the shape of the first dielectric substrate 311 is not limited to the above-described embodiment. According to yet another embodiment (not shown), the first dielectric substrate 311 may be formed in a polygonal (e.g., triangular and/or pentagonal) shape, or may be formed in a circular and/or elliptical shape.

Referring to FIG. 6A, the first conductive pattern 312 according to yet another embodiment may be positioned on the first surface 310a of the first dielectric substrate 311. In one example, the first conductive pattern 312 may be electrically connected to a wireless communication circuit (e.g., the wireless communication circuit 400 of FIG. 5), and operate as an antenna radiator for transmitting or receiving an RF signal of a first frequency band. In an example, the first conductive pattern 312 may include a 1-1 conductive pattern 3121 and/or a 1-2 conductive pattern 3122. In one example, the 1-1 conductive pattern 3121 may include a first portion 3121a extending along a sixth direction (e.g., a direction ⑥ of FIG. 6A) and/or a second portion 3121b connected to one end of the first portion 3121a and extending along the third direction (e.g., the direction ③ of FIG. 6A). For example, the first portion 3121a may extend along the sixth direction from the center of gravity of the first dielectric substrate 311. In another example, the 1-2 conductive pattern 3122 may include a third portion 3122a extending along a fifth direction (e.g., a direction ⑤ of FIG. 6A) opposite to the first portion 3121a of the 1-1 conductive pattern 3121 and/or a fourth portion 3122b connected to one end of the third portion 3122a and extending along a fourth direction (e.g., a direction ④ of FIG. 6A) opposite to the third direction. For example, the third portion 3122a may extend along the fifth direction from the center of gravity of the first dielectric substrate 311. In one example, some region (e.g., the second portion 3121b) of the 1-1 conductive pattern 3121 has the bent (or "bent") structure, and accordingly the electronic device according to yet another embodiment may obtain the length of the 1-1 conductive pattern 3121 for transmitting or receiving the RF signal of the first frequency band without increasing the size of the first dielectric substrate 311. For example, to operate as the antenna radiator for transmitting and/or receiving the RF signal of the first frequency band, the 1-1 conductive pattern 3121 may formed in a ¼ wavelength (or "¼λ") length (e.g., about 3.125 cm) of the RF signal of the first frequency band. In another example, as some region (e.g., the fourth portion 3122b) of the 1-2 conductive pattern 3122 has the bent (or "bent") structure, the electronic device according to yet another embodiment may obtain the length of the 1-2 conductive pattern 3122 for transmitting or receiving the RF signal of the first frequency band without increasing the size of the first dielectric substrate 311. For example, to operate as the antenna radiator for transmitting and/or receiving the RF signal of the first frequency band, the 1-2 conductive pattern 3122 may be formed in a ¼ wavelength (or "¼λ") length (e.g., about 3.125 cm) of the RF signal of the first frequency band.

In one example, the 1-1 conductive pattern 3121 and/or the 1-2 conductive pattern 3122 each may be fed from the wireless communication circuit, and accordingly the first conductive pattern 312 may operate as a dipole antenna for transmitting or receiving the RF signal of the first frequency band. Since the dipole antenna may have a relatively higher half power beam width (HPBW) than other antennas (e.g., a patch antenna), a beam pattern radiated from the first conductive pattern 312 may be relatively highly isotropic.

Referring to FIG. 6B, the second conductive pattern 313 according to yet another embodiment may be positioned on the second surface 310b of the first dielectric substrate 311. In an example, the second conductive pattern 313 may include a 2-1 conductive pattern 3131 and/or a 2-2 conductive pattern 3132 spaced apart from the 2-1 conductive pattern 3131 by a designated distance. In one example, the 2-1 conductive pattern 3131 may include a fifth portion 3131a extending along an eighth direction (e.g., a direction ⑧ of FIG. 6B) and/or a sixth portion 3131b connected to one end of the fifth portion 3131a and extending along the second direction (e.g., the direction ② of FIG. 6B). For example, the fifth portion 3131a may extend along the eighth direction from the center of gravity of the first dielectric substrate 311. In another example, the 2-2 conductive pattern 3132 may include a seventh portion 3132a extending along a seventh direction (e.g., a direction ⑦ of FIG. 6B) opposite to the fifth portion 3131a of the 2-1 conductive pattern 3131, and/or an eighth portion 3132b connected to one end of the seventh portion 3132a and extending along the first direction (e.g., the direction ② of FIG. 6B) opposite to the second direction. For example, the seventh portion 3132a may extend along the seventh direction from the center of gravity of the first dielectric substrate 311. In one example, as some region (e.g., the sixth portion 3131b) of the 2-1 conductive pattern 3131 has a bent (or "bent") structure, the electronic device according to yet another embodiment may obtain the length of the 2-1 conductive pattern 3131 for transmitting or receiving the RF signal of the first frequency band without increasing the size of the first dielectric substrate 311. In another example, as some region (e.g., the eighth portion 3132b) of the 2-2 conductive pattern 3132 has a bent (or "bent") structure, the electronic device according to yet another embodiment may obtain the length of the 2-2 conductive pattern 3132 for transmitting or receiving the RF signal of the first frequency band without increasing the size of the first dielectric substrate 311.

In one example, the 2-1 conductive pattern 3131 and/or the 2-2 conductive pattern 3132 each may be fed from the wireless communication circuit, and accordingly the second conductive pattern 313 may operate as a dipole antenna which transmits or receives an RF signal of the first frequency band. Since the dipole antenna may have a relatively higher HPBW than other antennas (e.g., a patch antenna), a beam pattern radiated from the second conductive pattern 313 may be relatively highly isotropic.

Referring to FIGS. 6C and 6D, the first antenna module 310 according to an embodiment may further include at least one through hole 311a and 311b, a first electrical connection member 314, a second electrical connection member 315, and/or at least one via 316 and 317.

According to another embodiment, the first electrical connection member 314 may be disposed on the second surface 310b of the first dielectric substrate 311. In one example, the first electrical connection member 314 may be at least one of a signal wire, a coaxial cable or an FPCB, but is not limited thereto. For example, the first electrical connection member 314 may include a conductor and/or a dielectric disposed to surround at least one region of the above-described conductor. In one example, at least one region of the first electrical connection member 314 may be secured to the second surface 310b, by soldering (or "soldering") to at least one region (e.g., a region $S_1$, $S_2$ of FIGS. 6B, and 6C) of the second surface 310b of the first dielectric substrate 311. In one example, at least one region of the first electrical connection member 314 may be soldered in the first region $S_1$ which is a region overlapping the 1-1 conductive pattern 3121 of the first surface 310a, when viewed from a direction perpendicular to the second surface 310b (e.g., the +z direction of FIG. 6C). In another example, when viewed from the direction perpendicular to the second surface 310b (e.g., the +z direction of FIG. 6C), at least one region of the first electrical connection member 314 may be soldered in the second region $S_2$ which is a region overlapping the 1-2 conductive pattern 3122 of the first surface 310a. In one example, since the first electrical connection member 314 is electrically connected to the at least one via 316 and 317, the first electrical connection member 314 and/or the at least one via 316 and 317 may electrically connect the first conductive pattern 312 disposed on the first surface 310a of the first dielectric substrate 311 and the wireless communication circuit.

According to yet another embodiment, the second electrical connection member 315 may be disposed on the second surface 310b of the first dielectric substrate 311 substantially identically or similarly to the first electrical connection member 314. In one example, the second electrical connection member 315 may be at least one of a signal wire, a coaxial cable or an FPCB, but is not limited thereto. For example, the second electrical connection member 315 may include a conductor and/or a dielectric disposed to surround at least one region of the above-described conductor. In one example, at least one region of the second electrical connection member 315 may be fixed to the second surface 310b, by soldering to at least one region (e.g., a region $S_3$, $S_4$ of FIGS. 6B and 6C) of the second surface 310b of the first dielectric substrate 311. In one example, the second electrical connection member 315 may be soldered in the third region $S_3$ at least in part overlapping the 2-1 conductive pattern 3131. For example, the third region $S_3$ may be a region corresponding to one end of the 2-1 conductive pattern 3131 adjacent to the 2-2 conductive pattern 3132. In another example, the second electrical connection member 315 may be soldered in the fourth region $S_4$ at least in part overlapping the 2-2 conductive pattern 3132. For example, the fourth region $S_4$ may be a region corresponding to one end of the 2-2 conductive pattern 3132 adjacent to the 2-1 conductive pattern 3131. In one example, since at least one region of the second electrical connection member 315 is soldered to the third region $S_3$ corresponding to the 2-1 conductive pattern 3131 and/or the fourth region $S_4$ corresponding to the 2-2 conductive pattern 3132, the second electrical connection member 315 may electrically connect the second conductive pattern 313 and the wireless communication circuit. In one example, the first electrical connection member 314 and the second electrical connection member 315 may be disposed to overlap in some region (e.g., a region C of FIG. 6B) of the second surface 310b. In one example, the first electrical connection member 314 is positioned above (e.g., the +z direction of FIG. 6C) the second electrical connection member 315 in some region (the region C) of the second surface 310b, and some region of the first electrical connection member 314 and some region of the second electrical connection member 315 may be disposed to overlap. For example, the first electrical connection member 314 may be formed in a bridge shape in some region C of the second surface 310b, and thus positioned above (e.g., the +z direction of FIG. 6C) the second electrical connection member 315. In another example (not shown), the second electrical connection member 315 is positioned above (e.g., the +z direction of FIG. 6C) the first electrical connection member 314 in some region (region C) of the second surface 310b, and some region of the first electrical connection member 314 and some region of the second electrical connection member 315 may be disposed to overlap. According to yet another embodiment, as the first electrical connection member 314 and the second electrical connection member 315 are soldered onto the same surface (e.g., the second surface 310b of the first dielectric substrate 311), a space (or a "mounting space") occupied by the first antenna module 310 in the electronic device (e.g., the electronic device 100 of FIG. 1) may be reduced compared to soldering the first electrical connection member 314 and the second electrical connection member 315 onto different surfaces. For example, since the soldering region of the first antenna module 310 is positioned on the same surface, the mounting space of the first antenna module 310 may be reduced compared to soldering the first electrical connection member 314 to the first surface 310a of the first dielectric substrate 311, and soldering the second electrical connection member 315 to the second surface 310b of the first dielectric substrate 311. According to yet another embodiment, as the mounting space of the first antenna module 310 is reduced, the size of the electronic device may be reduced.

Referring to FIGS. 6C and 6D, the at least one through hole 311a and 311b according to yet another embodiment may penetrate a region between the first surface 310a and the second surface 310b of the first dielectric substrate 311. For example, the at least one through hole may include a first through hole 311a and/or a second through hole 311b spaced apart from the first through hole 311a by a designated distance. In one example, the first through hole 311a may be disposed at a position overlapping at least one region of the 1-1 conductive pattern 3121, when viewed from a direction perpendicular to the first surface 310a and/or the second surface 310b of the first dielectric substrate 311 (e.g., the +z direction of FIG. 6C). As another example, the second through hole 311b may be disposed at a position overlapping at least one region of the 1-2 conductive pattern 3122, when viewed from a direction perpendicular to the first surface 310a and/or the second surface 310b of the first dielectric substrate 311 (e.g., the +z direction of FIG. 6C).

According to yet another embodiment, the at least one via 316 and 317 may be positioned in the at least one through hole 311a and 311b, and may electrically connect the configuration disposed on the first surface 310a of the first dielectric substrate 311 and the configuration disposed on the second surface 310b of the first dielectric substrate 311. In one example, the at least one via 316 and 317 may be formed of a conductive material. For example, the at least one via may include a first via 316 disposed within the first through hole 311a and/or a second via 317 disposed within the second through hole 311b. In one example, as the first via 316 is positioned in the first through hole 311a disposed at the position overlapping at least one region of the 1-1 conductive pattern 3121, the 1-1 conductive pattern 3121 disposed on the first surface 310a of the first dielectric substrate 311 may be electrically connected with the first electrical connection member 314 disposed in the second surface 310b of the first dielectric substrate 311 through the first via 316. In another example, as the second via 317 is positioned in the second through hole 311b disposed at the position overlapping at least one region of the 1-2 conductive pattern 3122, the 1-2 conductive pattern 3122 disposed in the first surface 310a of the first dielectric substrate 311 may be electrically connected to the first electrical connection member 314 disposed in the second surface 310b of the first dielectric substrate 311 through the second via 317.

According to yet another embodiment, the first conductive pattern 312 may be electrically connected to a wireless communication circuit through at least one via (e.g., the first via 316 and/or the second via 317) and the first electrical connection member 314 electrically connected to the at least one via. According to yet another embodiment, the second conductive pattern 313 may be electrically connected to the wireless communication circuit through the second electrical connection member 315 disposed on the same surface (e.g., the second surface 310b) as the second conductive pattern 313.

According to yet another embodiment, the wireless communication circuit may transmit or feed the RF signal of the first frequency band to the 1-1 conductive pattern 3121 and/or the 1-2 conductive pattern 3122 of the first conductive pattern 312 through the first electrical connection member 314, the first via 316 and/or the second via 317. Hence, the first conductive pattern 312 may operate as an antenna radiator (e.g., a dipole antenna) for transmitting or receiving the RF signal of the first frequency band. In another example, the wireless communication circuit may transmit or feed the RF signal of the first frequency band to the 2-1 conductive pattern 3131 and/or the 2-2 conductive pattern 3132 of the second conductive pattern 313 through the second electrical connection member 315. Thus, the second conductive pattern 313 may operate as an antenna radiator (e.g., a dipole antenna) for transmitting or receiving the RF signal of the first frequency band. For example, the first frequency band may be a frequency band of about 2.4 GHz through about 2.5 GHz, but is not limited thereto.

According to yet another embodiment, as both the first conductive pattern 312 and the second conductive pattern 313 operate as the antenna radiators for transmitting or receiving the RF signal of the first frequency band, the first conductive pattern 312 may be disposed at a position for obtaining isolation (or "isolation") with the second conductive pattern 313. In an example, the first conductive pattern 312 may be disposed substantially perpendicular to the second conductive pattern 313, when viewed from a direction (e.g., the −z direction of FIG. 6C) perpendicular to the first surface 310a of the first dielectric substrate 311. For example, the 1-1 conductive pattern 3121 may be disposed substantially perpendicularly to the 2-1 conductive pattern 3131 and/or the 2-2 conductive pattern 3132. In another example, the 1-2 conductive pattern 3122 may be disposed substantially perpendicularly to the 2-1 conductive pattern 3131 and/or the 2-2 conductive pattern 3132. In an example, as the first conductive pattern 312 and the second conductive pattern 313 are disposed substantially vertically, interference occurring between the RF signal radiated from the first conductive pattern 312 and the RF signal radiated from the second conductive pattern 313 may be reduced. The isolation between the first conductive pattern 312 and the second conductive pattern 313 may be obtained through the above-described arrangement structure, and thus radiation performance of the first conductive pattern 312 and the second conductive pattern 313 may be improved.

TABLE 1

| Frequency | Radiation efficiency | Average antenna gain of the Vertical direction | Average antenna gain of the horizontal direction | Total antenna gain |
| --- | --- | --- | --- | --- |
| 2.40 GHz | 72.7% | −4.4 dBi | −4.4 dBi | −1.4 dBi |
| 2.42 GHz | 71.6% | −4.5 dBi | −4.4 dBi | −1.5 dBi |
| 2.44 GHz | 73.1% | −4.4 dBi | −4.3 dBi | −1.4 dBi |
| 2.46 GHz | 73.4% | −4.4 dBi | −4.4 dBi | −1.3 dBi |
| 2.48 GHz | 75.3% | −4.2 dBi | −4.3 dBi | −1.2 dBi |
| 2.50 GHz | 78.8% | −4.0 dBi | −4.1 dBi | −1.0 dBi |

Table 1 shows the measurement results of the radiation efficiency and the average antenna gain in the first frequency band (e.g., about 2.4 GHz through about 2.5 GHz frequency band) of the first antenna module 310. In Table 1, the antenna gain of the horizontal direction may indicate the antenna gain of the direction ① and/or the direction ② direction of FIG. 6A, and the antenna gain of the vertical direction may indicate the antenna gain of the direction ③ and/or the direction ④ of FIG. 6A.

Referring to Table 1, it may be identified that the first antenna module 310 achieves the radiation efficiency over 70%, and the antenna gain over −1.5 dBi in the frequency band of about 2.4 GHz through about 2.5 GHz. Through the measurement results of Table 1, it may be identified that the first conductive pattern 312 and/or the second conductive pattern 313 of the first antenna module 310 may operate as the antenna radiators for transmitting or receiving the RF signal of the frequency band of about 2.4 GHz through about 2.5 GHz.

According to yet another embodiment (not shown), the second antenna module (e.g., the second antenna module 320 of FIGS. 4 and 5) may have a substantially identical or similar structure to the first antenna module 310. In an example, the second antenna module may include a second dielectric substrate (e.g., the second dielectric substrate 321 of FIGS. 4 and 5) including a third surface (e.g., the third surface 320a of FIGS. 4 and 5) facing the second surface 310b of the first antenna module 310 and a fourth surface (e.g., the fourth surface 320b of FIGS. 4 and 5) facing away from the third surface, a third conductive pattern (e.g., the third conductive pattern 322 of FIGS. 4 and 5) disposed on the third surface, and a fourth conductive pattern (e.g., the fourth conductive pattern 323 of FIGS. 4 and 5) disposed on the fourth surface. In one example, a third electrical connection member and/or a fourth electrical connection member electrically connected to the wireless communication circuit may be disposed on the third surface of the second dielectric substrate. In one example, the third electrical connection member may be electrically connected to the third conductive pattern. In another example, the fourth electrical connection member may be electrically connected with the fourth conductive pattern disposed on the fourth surface through at least one via (e.g., a third via, a fourth via) penetrating the third surface and the fourth surface of the second dielectric substrate. Through the above-described electrical connections, the third conductive pattern and/or the fourth conductive pattern of the second antenna module may be electrically connected, and the third conductive pattern and/or the fourth conductive pattern may be fed from the wireless communication circuit. Hence, the third conductive pattern and/or the fourth conductive pattern of the second antenna module may operate as an antenna radiator for transmitting or receiving an RF signal of the first frequency band. In one example, the third conductive pattern and/or the fourth conductive pattern may operate as a dipole antenna, but is not limited thereto.

Figure 7A:
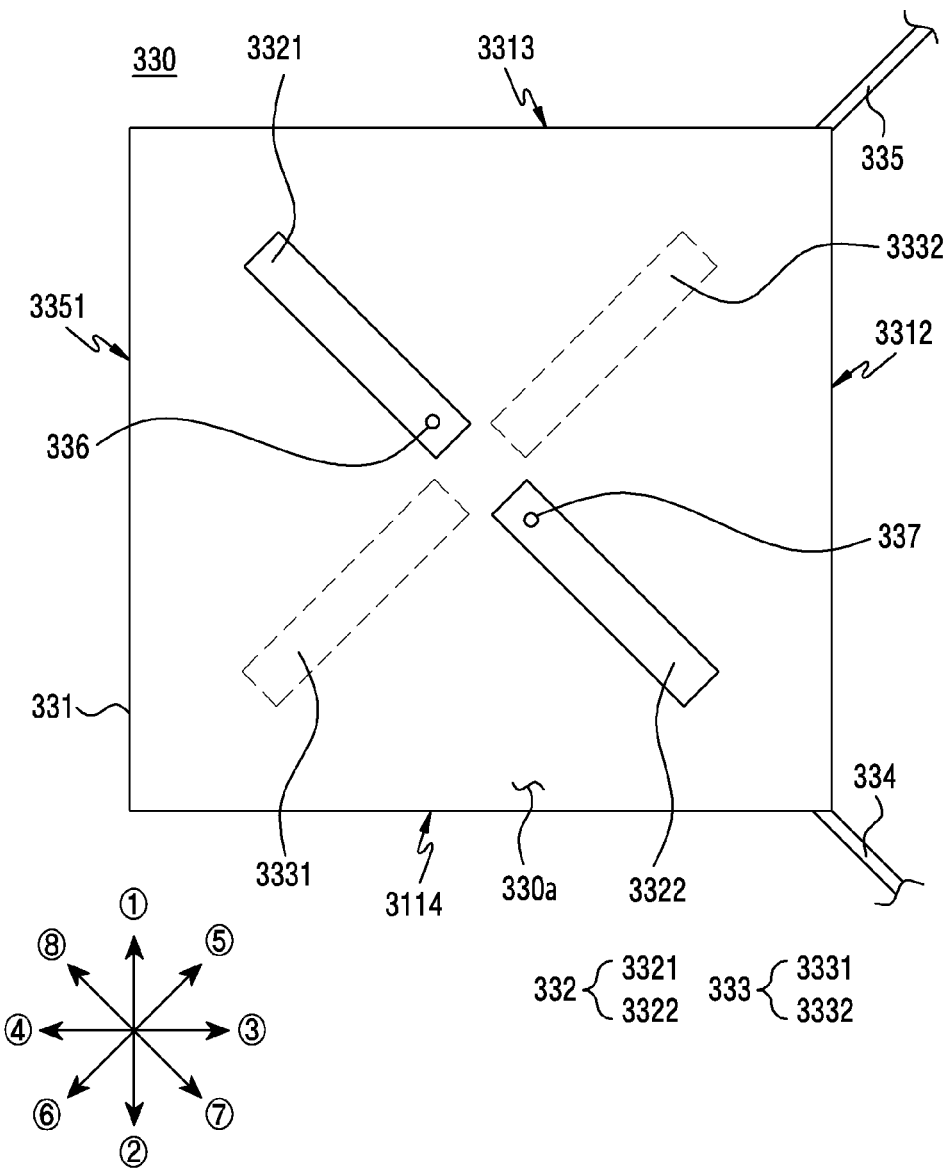
FIG. 7A is a diagram illustrating one surface of a third antenna module of an electronic device according to an embodiment of the disclosure.

FIG. 7A is a diagram illustrating one surface of a third antenna module of an electronic device according to an embodiment of the disclosure.

Figure 7B:
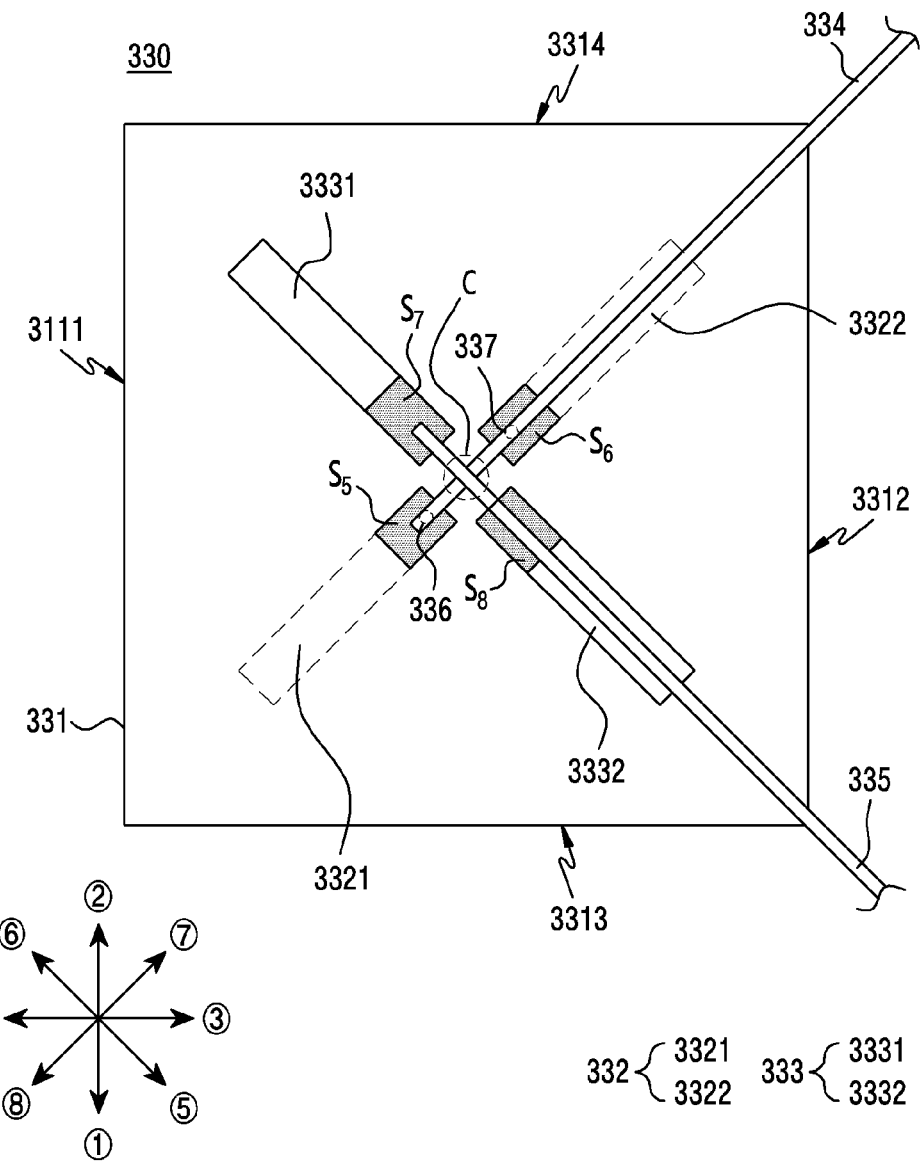
FIG. 7B is a diagram illustrating another surface of the third antenna module of FIG. 7A according to an embodiment of the disclosure.

FIG. 7B is a diagram illustrating another surface (i.e., sixth surface) of the third antenna module of FIG. 7A according to an embodiment of the disclosure.

Figure 7C:
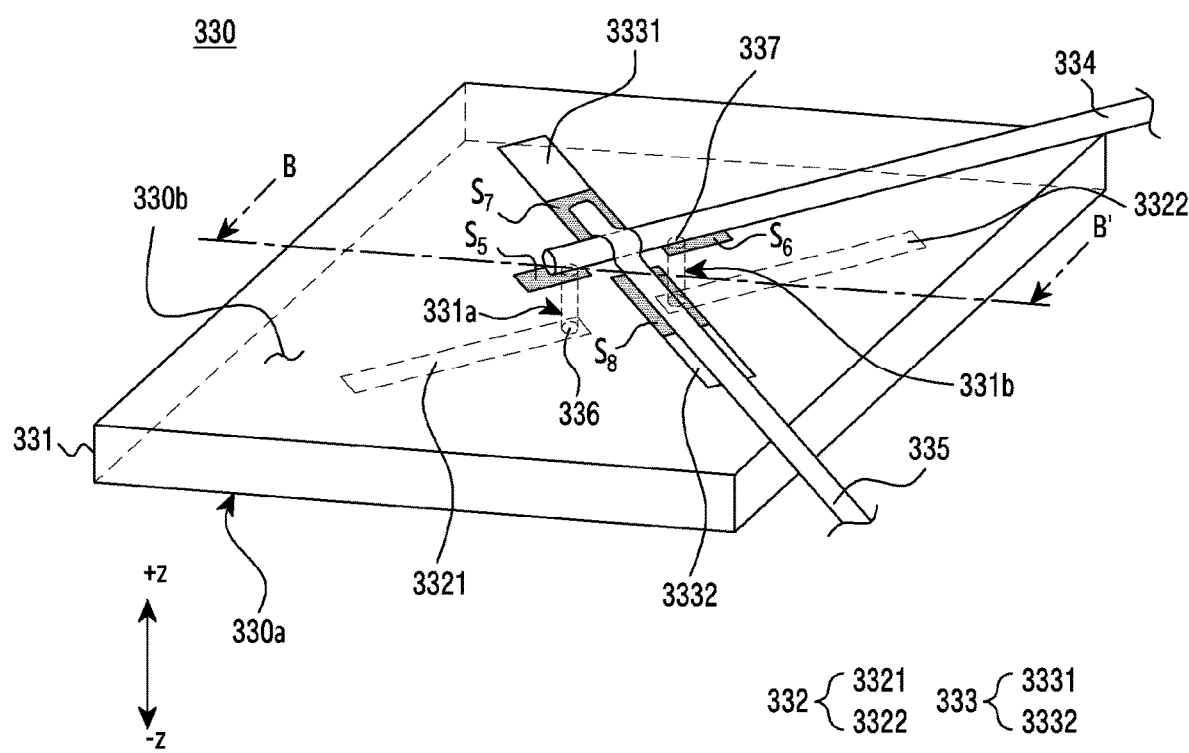
FIG. 7C is a perspective view of the third antenna module of FIG. 7A according to an embodiment of the disclosure.

FIG. 7C is a perspective view of the third antenna module of FIG. 7A according to an embodiment of the disclosure.

Figure 7D:
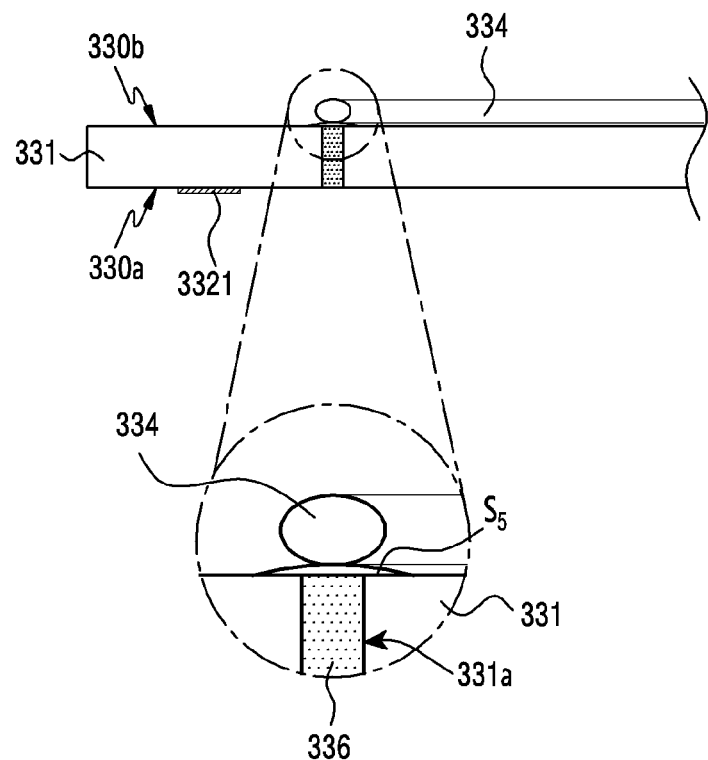
FIG. 7D is a cross-sectional view of the third antenna module of FIG. 7C taken along a B-B' direction according to an embodiment of the disclosure.

FIG. 7D is a cross-sectional view of the third antenna module of FIG. 7C taken along a B-B' direction according to an embodiment of the disclosure.

While FIGS. 7A, 7B, 7C, and/or 7D of the disclosure depict only the structure of the third antenna module 330, the same structure as the third antenna module 330 may be applied to a fourth antenna module (e.g., the fourth antenna module 340 of FIG. 4), a fifth antenna module (e.g., the fifth antenna module 350 of FIG. 4) and/or a sixth antenna module (e.g., the sixth antenna module 360 of FIG. 4).

Referring to FIGS. 7A, 7B, 7C, and 7D, the third antenna module 330 (e.g., the third antenna module 330 of FIGS. 4 and 5) of the electronic device (e.g., the electronic device 100 of FIG. 1) according to an embodiment. FIG. 5) may include a third dielectric substrate 331 (e.g., the third dielectric substrate 331 of FIGS. 4 and 5), a fifth conductive pattern 332 (e.g., the fifth conductive pattern 332 of FIG. 5), and a sixth conductive pattern 333 (e.g., the sixth conductive pattern 333 of FIG. 5).

According to an embodiment, the third dielectric substrate 331 may include a fifth surface 330a (e.g., the fifth surface 330a of FIG. 5) and/or a sixth surface 330b (e.g., the sixth surface 330b of FIG. 5). In one example, the third dielectric substrate 331 may include a fifth side surface 3311 extending along a first direction (e.g., a direction ① of FIG. 7A), a sixth side surface 3312 parallel to the fifth side surface 3311, and extending along the first direction, a seventh side surface 3313 extending along a third direction (e.g., a direction ③ of FIG. 7A) substantially perpendicular to the first direction, and interconnecting one end of the fifth side surface 3311 (e.g., one end of the direction ① of FIG. 7A) and one end of the sixth side surface 3312 (e.g., one end of the direction ① of FIG. 7A) and/or an eighth side surface 3314 parallel to the seventh side surface 3313, and interconnecting the other end of the fifth side surface 3311 (e.g., one end of the direction ② of FIG. 7A) and the other end of the sixth side surface 3312 (e.g., one end of the direction ② direction of FIG. 7A). While only the embodiment in which the third dielectric substrate 331 is formed in a rectangular shape is illustrated in the drawings, the shape of the third dielectric substrate 331 is not limited to the above-described embodiment. According to another embodiment (not shown), the third dielectric substrate 331 may be formed in a polygonal (e.g., triangular, pentagonal) shape, or may be formed in a circular and/or elliptical shape.

Referring to FIG. 7A, the fifth conductive pattern 332 according to yet another embodiment may be positioned on the fifth surface 330a of the third dielectric substrate 331. In one example, the fifth conductive pattern 332 may be electrically connected to a wireless communication circuit (e.g., the wireless communication circuit 400 of FIG. 5), and operate as an antenna radiator for transmitting or receiving an RF signal of a second frequency band. In one example, the fifth conductive pattern 332 may include a 5-1 conductive pattern 3321 and/or a 5-2 conductive pattern 3322. In one example, the 5-1 conductive pattern 3321 may be formed by extending along an eighth direction (e.g., a direction ⑧ of FIG. 7A). For example, the 5-1 conductive pattern 3321 may extend along the eighth direction from the center of gravity of the first dielectric substrate 311. In another example, the 5-2 conductive pattern 3322 may be formed by extending along a seventh direction (e.g., a direction ⑦ of FIG. 7A) opposite to the eighth direction. For example, the 5-2 conductive pattern 3322 may extend along the seventh direction from the center of gravity of the first dielectric substrate 311.

In one example, the 5-1 conductive pattern 3321 and/or the 5-2 conductive pattern 3322 each may be fed from the wireless communication circuit, and thus the fifth conductive pattern 332 may operate as a dipole antenna for transmitting or receiving an RF signal of a second frequency band. Since the dipole antenna may have a relatively high HPBW compared to other antennas (e.g., a patch antenna), a beam pattern radiated from the fifth conductive pattern 332 may be relatively highly isotropic. In one example, the second frequency band may be a 5 GHz LB frequency band (e.g., about 5.1 GHz through about 5.2 GHz). In one example, the 5-1 conductive pattern 3321 and/or the 5-2 conductive pattern 3322 may operate as the antenna radiator for transmitting or receiving an RF signal of a relatively higher frequency band than a 1-1 conductive pattern (e.g., the 1-1 conductive pattern 3121 of FIGS. 5 and 6A) and/or a 1-2 conductive pattern (e.g., the 1-2 conductive pattern 3122 of FIGS. 5 and 6A) of a first antenna module (e.g., the first antenna module 310 of FIGS. 5 and 6A). Hence, the 5-1 conductive pattern 3321 and/or the 5-2 conductive pattern 3322 may be formed in a shape having a relatively shorter length than the 1-1 conductive pattern (e.g., the 1-1 conductive pattern 3121 of FIGS. 5 and 6A) and/or the 1-2 conductive pattern (e.g., the 1-2 conductive pattern 3122 of FIGS. 5 and 6A) of the first antenna module (e.g., the first antenna module 310 of FIGS. 5 and 6A). In one example, since the 5-1 conductive pattern 3321 and/or the 5-2 conductive pattern 3322 are formed in the shorter length than the 1-1 conductive pattern (e.g., the 1-1 conductive pattern 3121 of FIGS. 5 and 6A) and/or the 1-2 conductive pattern (e.g., the 1-2 conductive pattern 3122 of FIGS. 5 and 6A) of the first antenna module (e.g., the first antenna module 310 of FIGS. 5 and 6A), the third antenna module 330 may be formed in a smaller size than the first antenna module. However, it is not limited to the above-described embodiment, and the third antenna module 330 and the first antenna module (e.g., the first antenna module 310 of FIGS. 5 and 6A) may be formed in the same size according to yet another embodiment. Referring to FIG. 7B, the sixth conductive pattern 333 according to yet another embodiment may be positioned on the sixth surface 330b of the third dielectric substrate 331. In one example, the sixth conductive pattern 333 may include a 6-1 conductive pattern 3331 and/or a 6-2 conductive pattern 3332 spaced apart from the 6-1 conductive pattern 3331 by a designated distance. In one example, the 6-1 conductive pattern 3331 may be formed by extending along a sixth direction (e.g., a direction ⑥ of FIG. 7B). For example, the 6-1 conductive pattern 3331 may extend along the sixth direction from the center of gravity of the first dielectric substrate 311. In another example, the 6-2 conductive pattern 3332 may be formed by extending along a fifth direction (e.g., a direction ⑤ of FIG. 7B) opposite to the 6-1 conductive pattern 3331. For example, the 6-2 conductive pattern 3332 may extend along the fifth direction from the center of gravity of the first dielectric substrate 311.

In one example, the 6-1 conductive pattern 3331 and/or the 6-2 conductive pattern 3332 each may be fed from a wireless communication circuit, and thus the sixth conductive pattern 333 may operate as a dipole antenna for transmitting or receiving an RF signal of the second frequency band. Since the dipole antenna may have a relatively higher HPBW than other antennas (e.g., a patch antenna), a beam pattern radiated from the sixth conductive pattern 333 may be relatively highly isotropic. In one example, the second frequency band may be the 5 GHz LB frequency band (e.g., about 5.1 GHz through about 5.2 GHz). In one example, the 6-1 conductive pattern 3331 and/or the 6-2 conductive pattern 3322 may operate as the antenna radiator for transmitting or receiving an RF signal of a relatively higher frequency band than a 2-1 conductive pattern (e.g., the 2-1 conductive pattern 3131 of FIGS. 5 and 6A) and/or a 2-2 conductive pattern (e.g., the 2-2 conductive pattern 3132 of FIGS. 5 and 6A) of the first antenna module (e.g., the first antenna module 310 of FIGS. 5 and 6A). Thus, the 6-1 conductive pattern 3331 and/or the 6-2 conductive pattern 3332 may be formed in a shape having a relatively shorter length than the 2-1 conductive pattern (e.g., the 2-1 conductive pattern 3131 of FIGS. 5 and 6A) and/or the 2-2 conductive pattern (e.g., the 2-2 conductive pattern 3132 of FIGS. 5 and 6A) of the first antenna module (e.g., the first antenna module 310 of FIGS. 5 and 6A). In one example, since the 6-1 conductive pattern 3331 and/or the 6-2 conductive pattern 3332 are formed in the shorter length than the 2-1 conductive pattern (e.g., the 2-1 conductive pattern 3131 of FIGS. 5 and 6A) and/or the 2-2 conductive pattern (e.g., the 2-2 conductive pattern 3132 of FIGS. 5 and 6A) of the first antenna module (e.g., the first antenna module 310 of FIGS. 5 and 6A), the third antenna module 330 may be formed in a smaller size than the first antenna module (e.g., the first antenna module 310 of FIGS. 5 and 6A). However, it is not limited to the above-described embodiment, and the third antenna module 330 and the first antenna module (e.g., the first antenna module 310 of FIGS. 5 and 6A) may be formed in the same size according to yet another embodiment.

Referring to FIGS. 7C and 7D, the third antenna module 330 according to an embodiment may further include at least one through hole 331a and 331b, a fifth electrical connection member 334, a sixth electrical connection member 335, and/or at least one via 336 and 337.

According to another embodiment, the fifth electrical connection member 334 may be disposed on the sixth surface 330b of the third dielectric substrate 331. In one example, the fifth electrical connection member 334 may be at least one of a signal wire, a coaxial cable, or an FPCB, but is not limited thereto. For example, the fifth electrical connection member 334 may include a conductor and/or a dielectric disposed to surround at least one region of the above-described conductor. In one example, at least one region of the fifth electrical connection member 334 may be secured to the sixth surface 330b, by soldering to at least one region (e.g., a region $S_5$, $S_6$ of FIGS. 7B and 7C) of the sixth surface 330b of the third dielectric substrate 331. In one example, the at least one region of the fifth electrical connection member 334 may be soldered in a fifth region $S_5$ which is a region overlapping the 5-1 conductive pattern 3321 of the fifth surface 330a, when viewed from a direction perpendicular to the sixth surface 330b (e.g., the +z direction of FIG. 7C). In another example, when viewed from the direction perpendicular to the sixth surface 330b (e.g., the +z direction of FIG. 7C), the at least one region of the fifth electrical connection member 334 may be soldered in a sixth region $S_6$ which is a region overlapping the 5-2 conductive pattern 3322 of the fifth surface 330a. In one example, as the fifth electrical connection member 334 is electrically connected to the at least one via 336 and 337, the fifth electrical connection member 334 and/or the at least one via 336 and 337 may electrically connect the fifth conductive pattern 332 disposed on the fifth surface 330a of the third dielectric substrate 331 and a wireless communication circuit.

According to yet another embodiment, the sixth electrical connection member 335 may be disposed on the sixth surface 330b of the third dielectric substrate 331 substantially identically or similarly to the fifth electrical connection member 334. In one example, the sixth electrical connection member 335 may be at least one of a signal wire, a coaxial cable or an FPCB, but is not limited thereto. For example, the sixth electrical connection member 335 may include a conductor and/or a dielectric disposed to surround at least one region of the aforementioned conductor. In one example, at least one region of the fifth electrical connection member 334 may be fixed to the sixth surface 330b, by soldering in at least one region (e.g., a region $S_7$, $S_8$ of FIGS. 7B and 7C) of the sixth surface 330b of the third dielectric substrate 331. In one example, the sixth electrical connection member 335 may be soldered in a seventh region $S_7$ at least in part overlapping the 6-1 conductive pattern 3331. For example, the seventh region $S_7$ may be a region corresponding to one end of the 6-1 conductive pattern 3331 adjacent to the 6-2 conductive pattern 3332. In another example, the sixth electrical connection member 335 may be soldered in an eighth region $S_8$ at least in part overlapping the 6-2 conductive pattern 3332. For example, the eighth region $S_8$ may be a region corresponding to one end of the 6-2 conductive pattern 3332 adjacent to the 6-1 conductive pattern 3331. In one example, as the at least one region of the sixth electrical connection member 335 is soldered to the seventh region $S_7$ corresponding to the 6-1 conductive pattern 3331 and/or the eighth region $S_8$ corresponding to the 6-2 conductive pattern 3332, the sixth electrical connection member 335 may electrically connect the sixth conductive pattern 333 and the wireless communication circuit. In one example, the fifth electrical connection member 334 and the sixth electrical connection member 335 may be disposed to overlap in some region (e.g., a region C of FIG. 7B) of the sixth surface 330b. In one example, the sixth electrical connection member 335 is positioned over the fifth electrical connection member 334 (e.g., the +z direction of FIG. 7C) in some region (the region C) of the sixth surface 330b, some region of the fifth electrical connection member 334 and some region of the sixth electrical connection member 335 may be disposed to overlap. For example, the sixth electrical connection member 335 may be formed in a bridge shape in some region C of the sixth surface 330b, and thus positioned over the fifth electrical connection member 334 (e.g., the +z direction of FIG. 7C). In another example (not shown), the fifth electrical connection member 334 may be positioned over the sixth electrical connection member 335 (e.g., the +z direction of FIG. 7C) in some region (the region C) of the sixth surface 330b, and accordingly some region of the fifth electrical connection member 334 and some region of the sixth electrical connection member 335 may be disposed to overlap.

According to yet another embodiment, as the fifth electrical connection member 334 and the sixth electrical connection member 335 are soldered onto the same surface (e.g., the sixth surface 330b of the third dielectric substrate 331), a space (or a "mounting space") occupied by the third antenna module 330 in the electronic device (e.g., the electronic device 100 of FIG. 1) may be reduced comparing to soldering the fifth electrical connection member 334 and the sixth electrical connection member 335 onto different surfaces. For example, since the soldering region of the third antenna module 330 is positioned on the same surface, the mounting space of the third antenna module 330 may be reduced compared to soldering the fifth electrical connection member 334 to the fifth surface 330a of the third dielectric substrate 331, and soldering the sixth electrical connection member 335 to the sixth surface 330b of the third dielectric substrate 331. According to yet another embodiment, as the mounting space of the third antenna module 330 is reduced, the size of the electronic device may be reduced.

Referring to FIGS. 7C and 7D, the at least one through hole 331a and 331b according to an embodiment may penetrate a region between the fifth surface 330a and the sixth surface 330b of the third dielectric substrate 331. For example, the at least one through hole may include a fifth through hole 331a and/or a sixth through hole 331b spaced apart from the fifth through hole 331a by a designated distance. In one example, the fifth through hole 331a may be disposed at a position overlapping at least one region of the 5-1 conductive pattern 3321, when viewed from a direction perpendicular to the fifth surface 330a and/or the sixth surface 330b of the third dielectric substrate 331 (e.g., the +z direction of FIG. 7C). As another example, the sixth through hole 331b may be disposed at a position overlapping at least one region of the 5-2 conductive pattern 3322, when viewed from the direction perpendicular to the fifth surface 330a and/or the sixth surface 330b of the third dielectric substrate 331 (e.g., the +z direction of FIG. 7C).

According to another embodiment, the at least one via 336 and 337 may be positioned in the at least one through hole 331a and 331b and formed of a conductive material to electrically interconnect the configuration disposed on the fifth surface 330a of the third dielectric substrate 331 and the configuration disposed on the sixth surface 330b of the third dielectric substrate 331. For example, the at least one via may include a fifth via 336 disposed in the fifth through hole 331a and/or a sixth via 337 disposed within the sixth through hole 331b. In one example, as the fifth via 336 is positioned in the fifth through hole 331a disposed at a position overlapping at least one region of the 5-1 conductive pattern 3321, the 5-1 conductive pattern 3321 on the fifth surface 330a of the third dielectric substrate 331 may be electrically connected to the fifth electrical connection member 334 disposed on the sixth surface 330b of the third dielectric substrate 331 through the fifth via 336. In another example, as the sixth via 337 is positioned in the sixth through hole 331b disposed at a position overlapping at least one region of the 5-2 conductive pattern 3322, the 5-2 conductive pattern 3322 on the fifth surface 330a of the third dielectric substrate 331 may be electrically connected with the fifth electrical connection member 334 disposed on the sixth surface 330b of the third dielectric substrate 331 through the sixth via 337.

According to yet another embodiment, the fifth conductive pattern 332 may be electrically connected to the wireless communication circuit through at least one via (e.g., the fifth via 336 and/or the sixth via 337) and the fifth electrical connection member 334 electrically connected to the at least one via. According to yet another embodiment, the sixth conductive pattern 333 may be electrically connected to the wireless communication circuit through the sixth electrical connection member 335 disposed on the same surface (e.g., the sixth surface 330b) as the sixth conductive pattern 333.

According to yet another embodiment, the wireless communication circuit may transmit or feed an RF signal of the second frequency band to the 5-1 conductive pattern 3321 and/or the 5-2 conductive pattern 3322 through the fifth electrical connection member 334, the fifth via 336 and/or the sixth via 337. Hence, the fifth conductive pattern 332 may operate as an antenna radiator (e.g., a dipole antenna) for transmitting or receiving an RF signal of the second frequency band. In another example, the wireless communication circuit may transmit or feed an RF signal of the second frequency band to the 6-1 conductive pattern 3331 and/or the 6-2 conductive pattern 3332 of the sixth conductive pattern 333 through the sixth electrical connection member 335. Thus, the sixth conductive pattern 333 may operate as an antenna radiator (e.g., a dipole antenna) for transmitting or receiving an RF signal of the second frequency band. For example, the second frequency band may be the 5 GHz LB frequency band (e.g., about 5.1 GHz through about 5.2 GHz), but is not limited thereto.

According to yet another embodiment, as both the fifth conductive pattern 332 and the sixth conductive pattern 333 operate as the antenna radiators for transmitting or receiving the RF signal of the second frequency band, the fifth conductive pattern 332 may be disposed at a position for obtaining isolation (or "isolation") from the sixth conductive pattern 333. In one example, the fifth conductive pattern 332 may be disposed substantially perpendicularly to the sixth conductive pattern 333, when viewed from the direction perpendicular to the fifth surface 330a of the third dielectric substrate 331 (e.g., the +z direction of FIG. 7C). For example, the 5-1 conductive pattern 3321 may be disposed substantially perpendicularly to the 6-1 conductive pattern 3331 and/or the 6-2 conductive pattern 3332. In another example, the 5-2 conductive pattern 3322 may be disposed substantially perpendicularly to the 6-1 conductive pattern 3331 and/or the 6-2 conductive pattern 3332. In one example, as the fifth conductive pattern 332 and the sixth conductive pattern 333 are disposed substantially vertically, interference occurring between an RF signal radiated from the fifth conductive pattern 332 and an RF signal radiated from the sixth conductive pattern 333 may be reduced. The isolation between the fifth conductive pattern 332 and the sixth conductive pattern 333 may be attained through the above-described arrangement structure, and thus radiation performance of the fifth conductive pattern 332 and the sixth conductive pattern 333 may be improved.

TABLE 2

| Frequency | Radiation efficiency | Average antenna gain of the Vertical direction | Average antenna gain of the horizontal direction | Average antenna gain in all direction |
|---|---|---|---|---|
| 5.15 GHz | 75.7% | −3.4 dBi | −5.3 dBi | −1.2 dBi |
| 5.29 GHz | 75.1% | −3.1 dBi | −5.8 dBi | −1.2 dBi |
| 5.43 GHz | 73.7% | −3.3 dBi | −5.7 dBi | −1.3 dBi |
| 5.57 GHz | 56.2% | −4.6 dBi | −6.7 dBi | −2.5 dBi |
| 5.71 GHz | 67.4% | −3.7 dBi | −6.2 dBi | −1.7 dBi |
| 5.85 GHz | 64.8% | −3.5 dBi | −6.9 dBi | −1.9 dBi |

Table 2 shows the measurement results of the radiation efficiency, and the average antenna gain of the second frequency band (e.g., 5 GHz LB frequency band) and the third frequency band (e.g., about 5 GHz HB frequency band) of the third antenna module 330. In Table 2, the antenna gain of the horizontal direction may indicate the antenna gain of the direction ① and/or the direction ② of FIG. 7A, and the antenna gain of the vertical direction may indicate the antenna gain of the direction ③ and/or the direction ④ of FIG. 7A.

Referring to Table 2, it may be identified that the third antenna module 330 achieves the average radiation efficiency over average 65% in the frequency band of about 5.15 GHz through about 5.85 GHz, and the antenna gain over −2.5 dBi. Based on the measurement results of Table 2, it may be identified that the first conductive pattern 312 and/or the second conductive pattern 313 of the third antenna module 330 may operate as the antenna radiator for transmitting or receiving the RF signal of the second frequency band.

According to yet another embodiment (not shown), a fourth antenna module (e.g., the fourth antenna module 340 of FIGS. 4 and 5) may have a structure substantially identical or similar to the third antenna module 330. In one example, the fourth antenna module may include a fourth dielectric substrate (e.g., the fourth dielectric substrate 341 of FIGS. 4 and 5) including a seventh surface (e.g., the seventh surface 340a of FIGS. 4 and 5) facing the sixth surface 330b of the third antenna module 330 and an eighth surface (e.g., the eighth surface 340b of FIGS. 4 and 5) facing away from the seventh surface, a seventh conductive pattern (e.g., the seventh conductive pattern 342 of FIGS. 4 and 5) disposed on the seventh surface, and an eighth conductive pattern (e.g., the fourth conductive pattern 323 of FIGS. 4 and 5) disposed on the eighth surface. In one example, a seventh electrical connection member and/or an eighth electrical connection member electrically connected with the wireless communication circuit may be disposed on the seventh surface of the fourth dielectric substrate. In one example, the seventh electrical connection member may be electrically connected to the seventh conductive pattern. In another example, the eighth electrical connection member may be electrically connected with the eighth conductive pattern disposed on the eighth surface through at least one via (e.g., a seventh via, an eighth via) penetrating the seventh surface and the eighth surface of the fourth dielectric substrate. Through the above-described electrical connections, the seventh conductive pattern and/or the eighth conductive pattern of the fourth antenna module may be electrically connected, and the seventh conductive pattern and/or the eighth conductive pattern may be fed from the wireless communication circuit. Hence, the seventh conductive pattern and/or the eighth conductive pattern of the fourth antenna module may operate as an antenna radiator for transmitting or receiving an RF signal of the second frequency band. In one example, the seventh conductive pattern and/or the eighth conductive pattern may operate as a dipole antenna, which is not limited thereto.

A fifth antenna module (e.g., the fifth antenna module 350 of FIGS. 4 and 5) according to yet another embodiment (not shown) may have a substantially identical or similar structure to the third antenna module 330. According to yet another embodiment (not shown), a sixth antenna module (e.g., the sixth antenna module 360 of FIGS. 4 and 5) may have a substantially identical or similar structure to the fourth antenna module mentioned above.

Figure 8A:
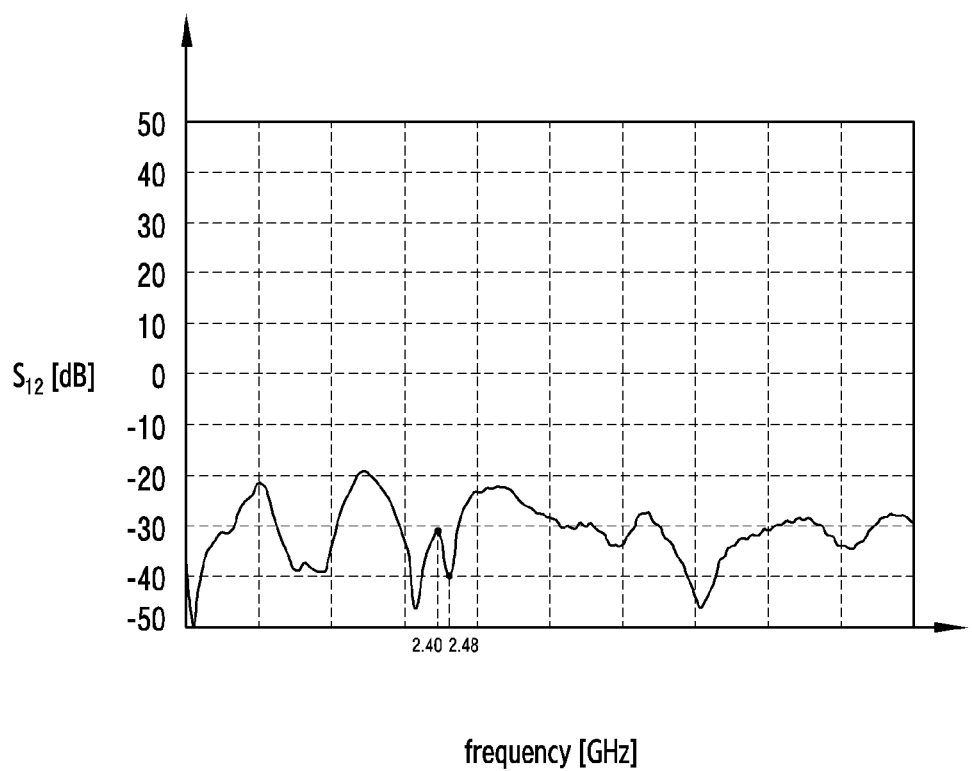
FIG. 8A is a graph illustrating an S parameter in a first frequency band of an electronic device according to an embodiment of the disclosure.

FIG. 8A is a graph showing an S parameter in a first frequency band (e.g., a frequency band of about 2.4 GHz through about 2.5 GHz) of an electronic device (e.g., the electronic device of FIG. 1) according to an embodiment of the disclosure.

Figure 8B:
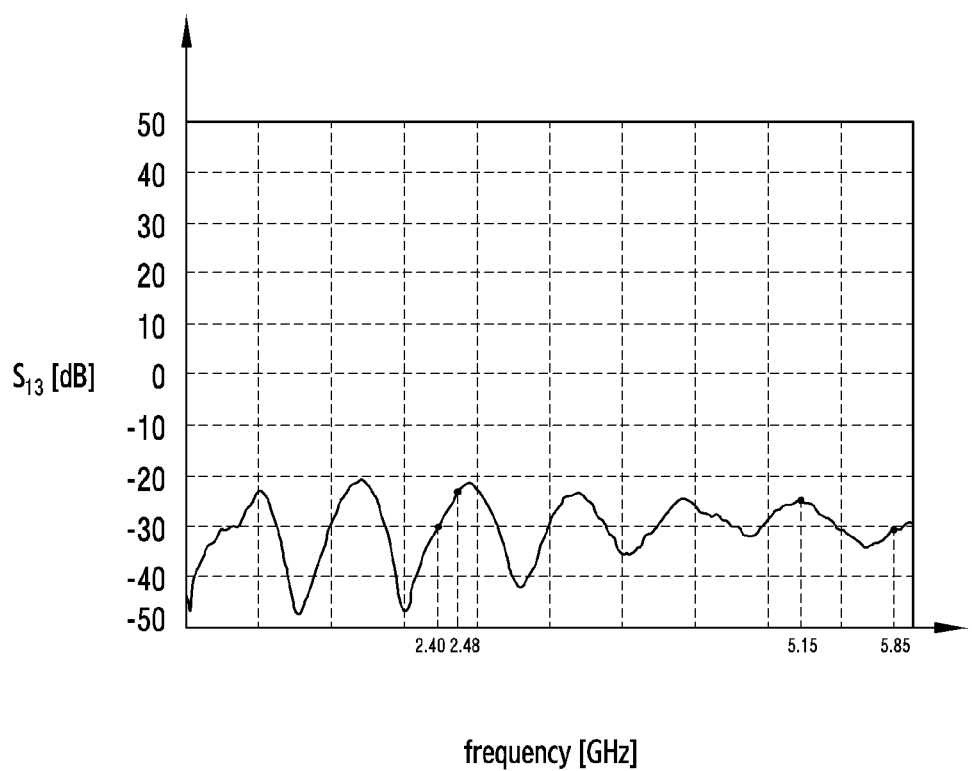
FIG. 8B is a graph illustrating an S parameter in a second frequency band and a third frequency band of an electronic device according to an embodiment of the disclosure.

FIG. 8B is a graph showing the S parameter in a second frequency band and a third frequency band (e.g., about 5 GHz frequency band) of the electronic device (e.g., the electronic device of FIG. 1) according to an embodiment of the disclosure.

FIG. 8A is the graph showing measurement results of an isolation gain $S_{12}$ between a first antenna module (e.g., the first antenna module 310 of FIGS. 4 and 5) and a second antenna module (e.g., the second antenna modules 320 of FIGS. 4 and 5) operating as an antenna radiator of the frequency band of about 2.4 GHz through about 2.5 GHz. FIG. 8B is the graph showing measurement results of an isolation gain $S_{13}$ between the first antenna module 310 operating as the antenna radiator of the frequency band of about 2.4 GHz through about 2.5 GHz and a third antenna module (e.g., the third antenna modules 330 or the fifth antenna module 350 of FIGS. 4 and 5) operating as an antenna radiator of about 5 GHz frequency band. As the isolation gain value decreases in FIGS. 8A and 8B, the isolation between the antenna modules may be improved.

Referring to FIG. 8A, the isolation gain between the first antenna module and the second antenna module transmitting or receiving RF signals of the same frequency band in the frequency band of about 2.4 GHz through about 2.5 GHz (e.g., 2.4 GHz, 2.48 GHz) may be identified to be less than −30 dB. Through the measurement result of FIG. 8A, it may be identified that the first antenna module and the second antenna module are isolated, and as a result, the electronic device according to an embodiment may prevent or mitigate radiation performance degradation of the first antenna module by the second antenna module.

Referring to FIG. 8B, it may be identified that the isolation gain between the first antenna module and the third antenna module transmitting or receiving RF signals of different frequency bands is less than −25 dB in the frequency band of about 2.4 GHz through about 2.5 GHz, and is less than −24 dB in about 5 GHz frequency band. Through the measurement results of FIG. 8B, it may be identified that the first antenna module and the third antenna module are isolated in the frequency band of about 2.4 GHz through about 2.5 GHz and the frequency band of about 5 GHz. As a result, the electronic device according to another embodiment may prevent or mitigate radiation performance degradation of the first antenna module by the third antenna module.

Figure 9A:
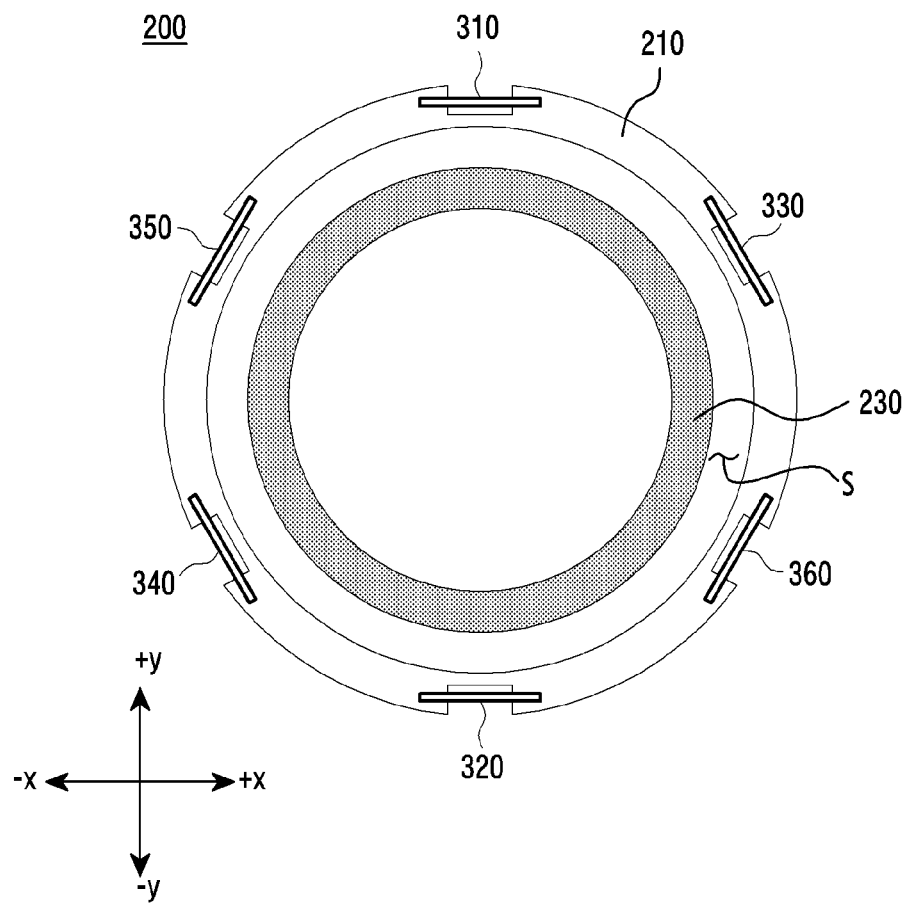
FIG. 9A is a diagram illustrating a dielectric disposed inside an electronic device according to an embodiment of the disclosure.

FIG. 9A is a diagram illustrating a dielectric disposed inside an electronic device 100 according to an embodiment of the disclosure.

Figure 9B:
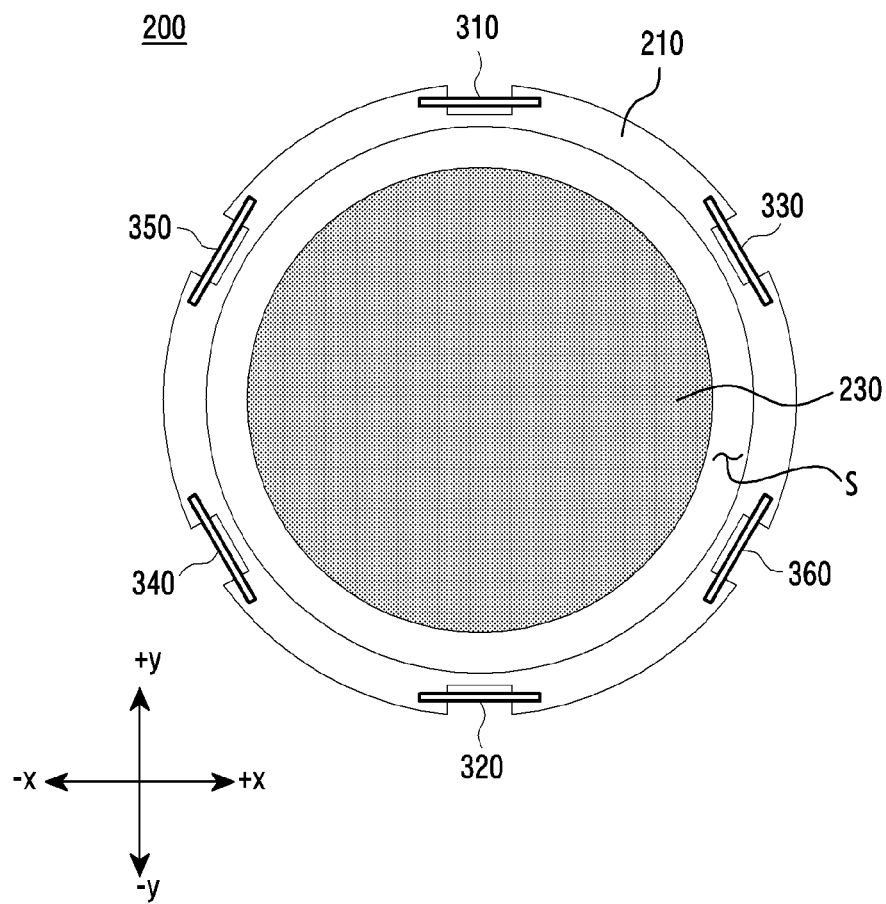
FIG. 9B is a diagram illustrating a dielectric disposed inside an electronic device according to an embodiment of the disclosure.

FIG. 9B is a diagram illustrating a dielectric disposed inside an electronic device according to an embodiment of the disclosure.

Figure 9C:
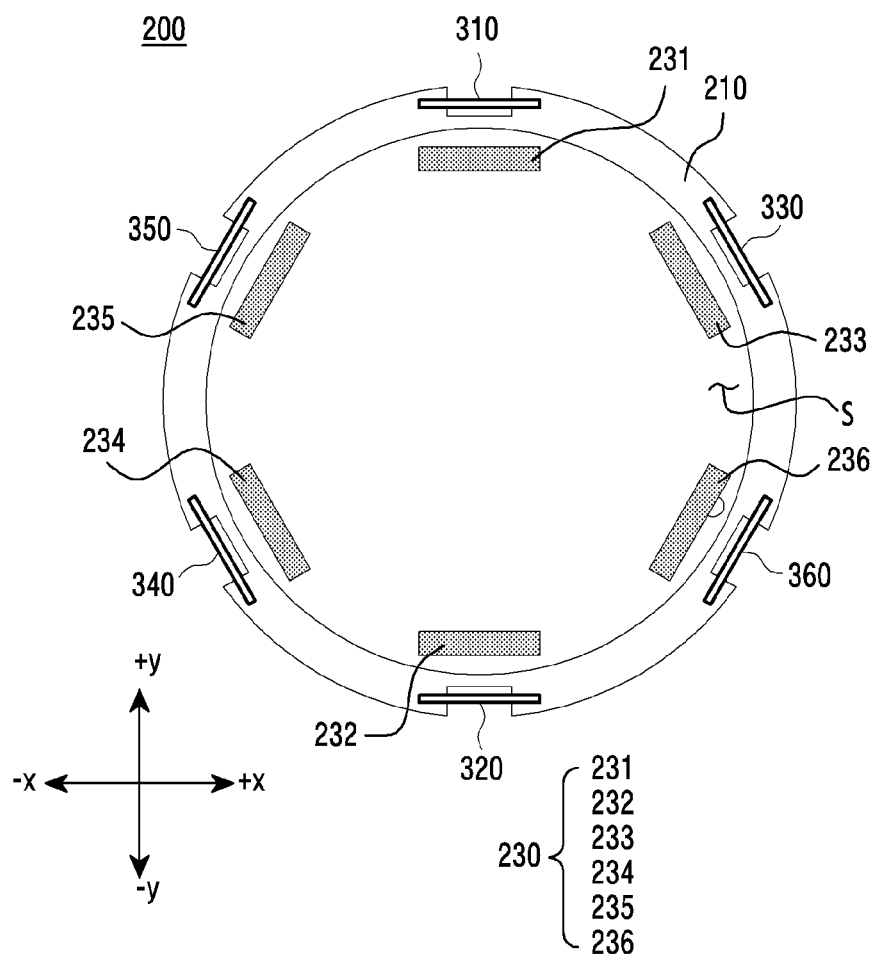
FIG. 9C is a diagram illustrating a dielectric disposed inside an electronic device according to an embodiment of the disclosure.

FIG. 9C is a diagram illustrating a dielectric disposed inside an electronic device according to an embodiment of the disclosure.

Referring to FIGS. 9A, 9B, and 9C, an antenna assembly 200 (e.g., the antenna assembly 200 of FIGS. 1, 3A, and 3B) of the electronic device (e.g., the electronic device 100 of FIG. 1) according to an embodiment may include a fixing bracket 210 (e.g., the fixing bracket 210 of FIGS. 2, 3A, and 3B), the dielectric 230, a first antenna module 310 (e.g., the first antenna module 310 of FIGS. 4 and 5), a second antenna module 320 (e.g., the second antenna module 320 of FIGS. 4 and 5), a third antenna module 330 (e.g., the third antenna module 330 of FIGS. 4 and 5), a fourth antenna module 340 (e.g., the fourth antenna module 340 of FIGS. 4 and 5), a fifth antenna module 350 (e.g., the fifth antenna module 350 of FIGS. 4 and 5), and/or a sixth antenna module 360 (e.g., the sixth antenna module 360 of FIGS. 4 and 5). At least one of the components of the antenna assembly 200 according to another embodiment may be identical or similar to at least one of the components of the antenna assembly 200 of FIGS. 3A and 3B, and redundant descriptions thereof shall be omitted hereafter.

According to yet another embodiment, the dielectric 230 may be formed of a material having a designated dielectric constant, and may be positioned in an internal space (e.g., a region S of FIGS. 9A, 9B, and/or 9C) of the fixing bracket 210. The dielectric 230 may be formed of, for example, at least one of a polycarbonate (PC) material, a Teflon material or an epoxy material, but is not limited thereto. In an example, the dielectric 230 may be positioned in a space between the first antenna module 310, the second antenna module 320, the third antenna module 330, the fourth antenna module 340, the fifth antenna module 350 and/or the sixth antenna module 360 disposed radially. In one example, the dielectric 230 may be positioned in a space between the first antenna module 310 and the second antenna module 320. In another example, the dielectric 230 may be positioned in a space between the third antenna module 330 and the fourth antenna module 340. In yet another example, the dielectric 230 may be positioned in a space between the fifth antenna module 350 and the sixth antenna module 360.

According to yet another embodiment, the dielectric 230 may realize an effect of electrically reducing a length of a wavelength between the first antenna module 310 and the second antenna module 320, a wavelength between the third antenna module 330 and the fourth antenna module 340, and/or a wavelength between the fifth antenna module 350 and the sixth antenna module 360. In one example, the dielectric 230 may electrically reduce the length of the wavelength between the first antenna module 310 and the second antenna module 320, and thus implement the same effect as generating a far field between the first antenna module 310 and the second antenna module 320 transmitting or receiving RF signals of the same first frequency band. In another example, the dielectric 230 may electrically reduce the length of the wavelength between the third antenna module 330 and the fourth antenna module 340, and thus implement the same effect as generating a far field between the third antenna module 330 and the fourth antenna module 340 transmitting or receiving RF signals of the same second frequency band. In yet another example, the dielectric 230 may electrically reduce the length of the wavelength between the fifth antenna module 350 and the sixth antenna module 360, and thus implement the same effect as generating a far field between the fifth antenna module 350 and the sixth antenna module 360 transmitting or receiving RF signals of the same third frequency band.

In an example, the electronic device (e.g., the electronic device 100 of FIG. 1) may implement the same effect as the first antenna module 310 disposed farther from the second antenna module 320 than an actual distance (e.g., $L_1$ of FIG. 4) between the first antenna module 310 and the second antenna module 320 through the dielectric 230 described above. In another example, the electronic device may implement the same effect as the third antenna module 330 disposed farther from the fourth antenna module 340 than an actual distance (e.g., $L_2$ of FIG. 4) between the third antenna module 330 and the fourth antenna module 340 through the dielectric 230 described above. In yet another example, the electronic device may implement the same effect as the fifth antenna module 350 disposed farther from the sixth antenna module 360 than an actual distance (e.g., $L_3$ of FIG. 4) between the fifth antenna module 350 and the sixth antenna module 360 through the dielectric 230 described above. Hence, interference occurring between the first antenna module 310 and the second antenna module 320, between the third antenna module 330 and the fourth antenna module 340 and/or between the fifth antenna module 350 and the sixth antenna module 360 transmitting or receiving RF signals of the same frequency band may be reduced. The electronic device according to yet another embodiment may attain the distance between the first antenna module 310 and the second antenna module 320, the distance between the third antenna module 330 and the fourth antenna module 340, and/or isolation (or "isolation") between the fifth antenna module 350 and the sixth antenna module 360 through the dielectric 230 described above, without increasing a volume of the electronic device. According to yet another embodiment, as the aforementioned dielectric 230 is positioned inside the fixing bracket 210 thus implementing the same effect as being spaced farther than the distance between the first antenna module 310 and the second antenna module 320, the distance between the third antenna module 330 and the fourth antenna module 340 and/or the actual distance between the fifth antenna module 350 and the sixth antenna module 360, an internal size (e.g., $L_1$, $L_2$ and/or $L_3$ of FIG. 4) of the fixing bracket 210 may be reduced compared to the dielectric 230 not disposed inside the fixing bracket 210. That is, the electronic device according to yet another embodiment may obtain the isolation between the first antenna module 310 and the second antenna module 320, the third antenna module 330 and the fourth antenna module 340, and/or the fifth antenna module 350 and the sixth antenna module 360 and reduce the size of the fixing bracket 210, and as a result the electronic device may be slimmed.

According to yet another embodiment (e.g., see FIG. 9A), the dielectric 230 may be formed in a band shape. For example, the dielectric 230 may be formed in a circular band shape, but in another embodiment (not shown), the dielectric 230 may be formed in a polygonal band (e.g., rectangular band, hexagonal band) shape. According to yet another embodiment (e.g., see FIG. 9B), the dielectric 230 may be formed in a circular and/or oval shape, when viewed from above the fixing bracket 210 (e.g., the +z direction of FIG. 3B). For example, the dielectric 230 may be formed in a circular shape, but is not limited thereto. According to yet another embodiment (not shown), the dielectric 230 may be formed in an elliptical shape, because the distance between the first antenna module 310 and the second antenna module 320, the distance between the third antenna module 330 and the fourth antenna module 340 and/or the distance between the fifth antenna module 350 and the sixth antenna module 360 are different. According to yet another embodiment (e.g., see FIG. 9C), the dielectric 230 may include at least one pad. For example, the at least one pad may include various sizes and/or shapes for isolation between at least one antenna module. In one example, the dielectric 230 may include a first dielectric 231 disposed at a position corresponding to the first antenna module 310, a second dielectric 232 disposed at a position corresponding to the second antenna module 320, a third dielectric 233 disposed at a position corresponding to the third antenna module 330, a fourth dielectric 234 disposed at a position corresponding to the fourth antenna module 340, a fifth dielectric 235 disposed at a position corresponding to the fifth antenna module 350, and/or a sixth dielectric 236 disposed at a position corresponding to the sixth antenna module 360. The meaning of the expression "correspond" in the disclosure may indicate physically contacting or being disposed in a direction facing at least one region without physical contact, and may be used hereafter as the same meaning.

Figure 10:
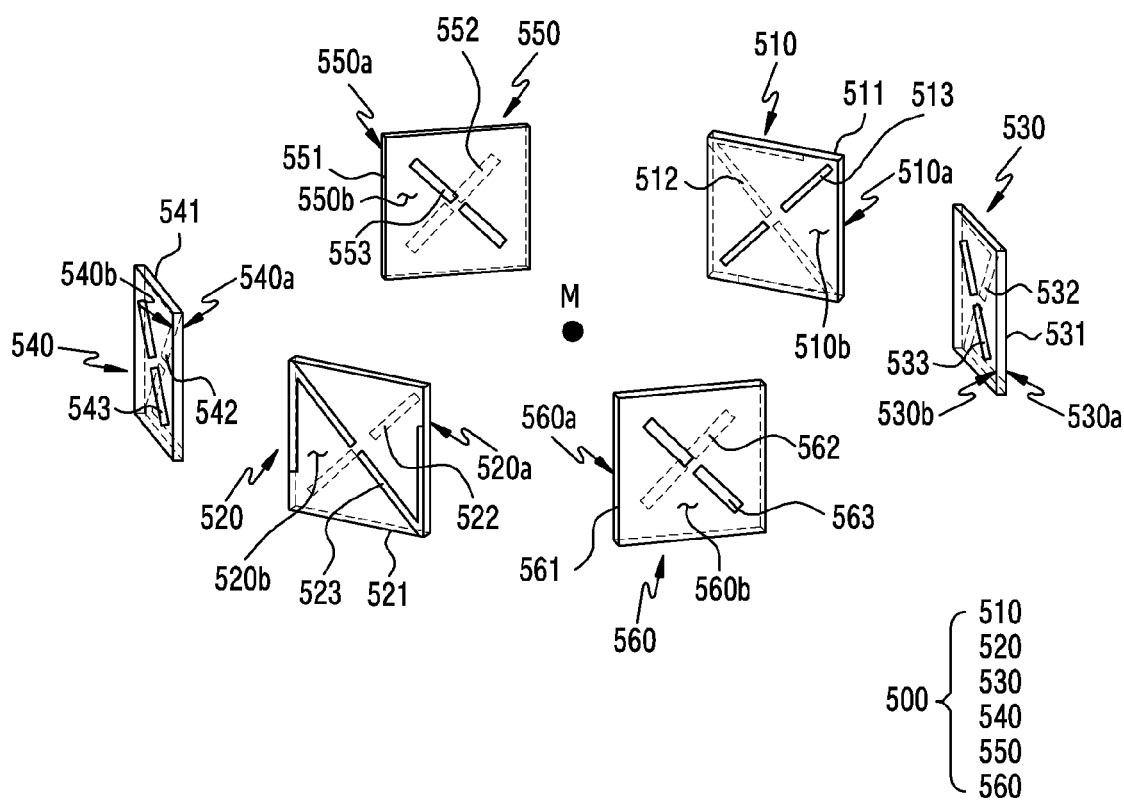
FIG. 10 is a diagram illustrating an antenna arrangement structure inside an electronic device according to an embodiment of the disclosure.

FIG. 10 is a diagram illustrating an arrangement structure of an antenna (e.g., at least one antenna module) inside an electronic device according to an embodiment of the disclosure.

Figure 11:
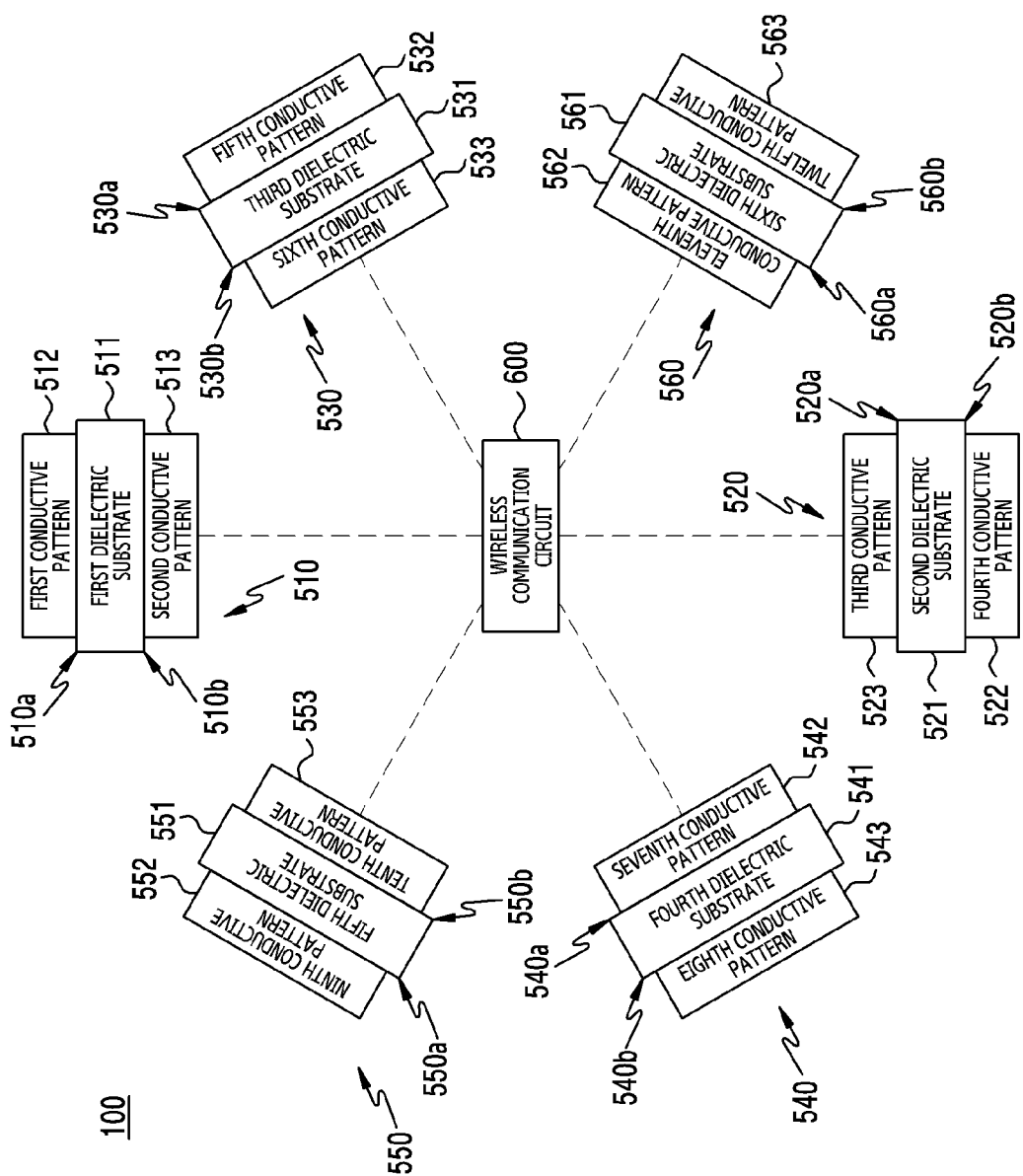
FIG. 11 is a diagram illustrating electrical connections between an antenna and a wireless communication circuit of an electronic device according to an embodiment of the disclosure.

FIG. 11 is a diagram illustrating electrical connections between an antenna (e.g., at least one antenna module) and a wireless communication circuit of an electronic device according to an embodiment of the disclosure.

Referring to FIGS. 10 and 11, the electronic device 100 (e.g., the electronic device 100 of FIG. 1) according to an embodiment includes at least one antenna module 510, 520, 530, 540, 550 and/or 560 (e.g., the at least one antenna module 310, 320, 330, 340, 350 and/or 360 of FIGS. 3A and 3B), and the wireless communication circuit 600 (e.g., the wireless communication circuit 400 of FIG. 5).

According to another embodiment, the at least one antenna module 510, 520, 530, 540, 550 and/or 560 may include a first antenna module 510 (e.g., the first antenna module 310 of FIG. 3A), a second antenna module 520 (e.g., the second antenna module 320 of FIG. 3A), a third antenna module 530 (e.g., the third antenna module 330 of FIG. 3A), a fourth antenna module 540) (e.g., the fourth antenna module 340 of FIG. 3A), a fifth antenna module 550 (e.g., the fifth antenna module 350 of FIG. 3A), and/or a sixth antenna module 560 (e.g., the sixth antenna module 360 of FIG. 3A). In one example, the first antenna module 510, the second antenna module 520, the third antenna module 530, the fourth antenna module 540, the fifth antenna module 550 and/or the sixth antenna module 560 may be radially disposed based on a virtual center M (e.g., the virtual center M of FIG. 3A). For example, the first antenna module 510 may be disposed to face the second antenna module 520, the third antenna module 530 may be disposed to face the fourth antenna module 540, and the fifth antenna module 550 may be disposed to face the sixth antenna module 560. In one example, the first antenna module 510, the second antenna module 520, the third antenna module 530, the fourth antenna module 540, the fifth antenna module 550 and/or the sixth antenna module 560 may be disposed at equal intervals based on the virtual center M. For example, the first antenna module 510, the second antenna module 520, the third antenna module 530, the fourth antenna module 540, the fifth antenna module 550 and/or the sixth antenna module 560 may be disposed at intervals of 60° based on the virtual center M. However, the arrangement positions of the first antenna module 510, the second antenna module 520, the third antenna module 530, the fourth antenna module 540, the fifth antenna module 550 and/or the sixth antenna module 560 are not limited to the above embodiment, and according to yet another embodiment, the first antenna module 510, the second antenna module 520, the third antenna module 530, the fourth antenna module 540, the fifth antenna module 550, and/or the sixth antenna module 560 may be disposed at irregular intervals.

According to yet another embodiment, the first antenna module 510 may include a first dielectric substrate 511 (e.g., the first dielectric substrate 311 of FIG. 5A), a first conductive pattern 512 (e.g., the first conductive pattern 312 of FIG. 5A) and/or a second conductive pattern 513 (e.g., the sixth conductive pattern 333 of FIG. 6B).

In one example, the first dielectric substrate 511 may be a substrate formed of a material having a designated dielectric constant (e.g., a glass epoxy material (e.g., an FR4 material and/or a CEM-1 material) and/or a PP material), and the first dielectric substrate 511 may include a first surface 510a and a second surface 510b facing away from the first surface 510a.

In one example, the first conductive pattern 512 may be positioned on the first surface 510a of the first dielectric substrate 511, and operate as an antenna radiator for transmitting or receiving an RF signal of a first frequency band. For example, the first conductive pattern 512 may be electrically connected to the wireless communication circuit 600, and an RF signal of the first frequency band may be transmitted or received between the first conductive pattern 512 and the wireless communication circuit 600. The first frequency band may be, for example, the frequency band of about 2.4 GHz through about 2.5 GHz, but is not limited thereto. In one example, the first conductive pattern 512 may be electrically connected with the wireless communication circuit 600 through an electrical connection member (not shown) (e.g., the first electrical connection member 314 of FIG. 6A) disposed on the second surface 510b of the first dielectric substrate 511 and/or at least one via (e.g., the first via 316, the second via 317 of FIG. 6C) penetrating the first surface 510a and the second surface 510b of the first dielectric substrate 511.

In one example, the second conductive pattern 513 may be positioned on the second surface 510b of the first dielectric substrate 511, and operate as an antenna radiator for transmitting or receiving an RF signal of a second frequency band which is higher than the first frequency band. The second frequency band may be, for example, the 5 GHz LB frequency band (e.g., about 5.1 GHz through about 5.2 GHz). In another example, the second conductive pattern 513 may operate as an antenna radiator for transmitting or receiving an RF signal of a third frequency band which is higher than the first frequency band. The third frequency band may be, for example, a 5 GHz high band (LB) frequency band (e.g., about 5.6 GHz through about 5.8 GHz). In one example, the second conductive pattern 513 may be electrically connected to the wireless communication circuit 600, and the RF signal of the second frequency band and/or the RF signal of the third frequency band may be transmitted or received between the second conductive pattern 513 and the wireless communication circuit 600. For example, the second conductive pattern 513 may be electrically connected to the wireless communication circuit 600 through an electrical connection member (not shown) (e.g., the second electrical connection member 315 of FIG. 6B) disposed on the second surface 510b of the first dielectric substrate 511.

According to yet another embodiment, as the first conductive pattern 512 operating as the antenna radiator of the first frequency band is disposed on the first surface 510a of the first dielectric substrate 511, and the second conductive pattern 513 operating as the antenna radiator of the second frequency band and/or the third frequency band is disposed on the second surface 510b of the first dielectric substrate 511, the first antenna module 510 may transmit or receive RF signals of two different frequency bands.

According to yet another embodiment, the second antenna module 520 may include a second dielectric substrate 521, a third conductive pattern 522 and/or a fourth conductive pattern 523.

In one example, the second dielectric substrate 521 may be a substrate formed of a material having a designated dielectric constant (e.g., a glass epoxy material (e.g., an FR4 material and/or a CEM-1 material) and/or a PP material). The second dielectric substrate 521 may include a third surface 520a and a fourth surface 520b facing away from the third surface 520a. In one example, the third surface 520a of the second dielectric substrate 521 may be disposed to face the second surface 510b of the first dielectric substrate 511. For example, the third surface 520a of the second dielectric substrate 521 may be disposed to face the second surface 510b of the first dielectric substrate 511.

In one example, the third conductive pattern 522 may be positioned on the third surface 520a of the second dielectric substrate 521, and operate as an antenna radiator for transmitting or receiving an RF signal of the first frequency band. In one example, the third conductive pattern 522 may be electrically connected to the wireless communication circuit 600, and an RF signal of the first frequency band may be transmitted or received between the third conductive pattern 522 and the wireless communication circuit 600. For example, the third conductive pattern 522 may be electrically connected to the wireless communication circuit 600 through an electrical connection member (not shown) disposed on the third surface 520a of the second dielectric substrate 521.

In one example, the fourth conductive pattern 523 may be positioned on the fourth surface 520b of the second dielectric substrate 521, and operate as an antenna radiator for transmitting or receiving an RF signal of a second frequency band which is higher than the first frequency band. In another example, the fourth conductive pattern 523 may operate as an antenna radiator for transmitting or receiving an RF signal of a third frequency band which is higher than the first frequency band.

In one example, the fourth conductive pattern 523 may be electrically connected to the wireless communication circuit 600, and the RF signal of the second frequency and/or the third frequency band may be transmitted or received between the fourth conductive pattern 523 and the wireless communication circuit 600. For example, the fourth conductive pattern 523 may be electrically connected to the wireless communication circuit 600 through an electrical connection member (not shown) disposed on the third surface 520a of the second dielectric substrate 521 and/or at least one via (not shown) penetrating the third surface 520a and the fourth surface 520b of the second dielectric substrate 521.

According to yet another embodiment, as the third conductive pattern 522 operating as the antenna radiator of the first frequency band is disposed on the third surface 520a of the second dielectric substrate 521, and the fourth conductive pattern 523 operating as the antenna radiator of the second frequency band and/or the third frequency band is disposed on the fourth surface 520b of the second dielectric substrate 521, the second antenna module 520 may transmit or receive RF signals of two different frequency bands.

According to yet another embodiment, the third antenna module 530 may include a third dielectric substrate 531, a fifth conductive pattern 532 and/or a sixth conductive pattern 533. In one example, the third dielectric substrate 531 may be a substrate formed of a material having a designated dielectric constant (e.g., a glass epoxy material (e.g., an FR4 material and/or a CEM-1 material) and/or a PP material), and the third dielectric substrate 531 may include a fifth surface 530a and a sixth surface 530b facing away from the fifth surface 530a. In one example, the fifth conductive pattern 532 may be positioned on the fifth surface 530a of the third dielectric substrate 531, and operate as an antenna radiator for transmitting or receiving an RF signal of the first frequency band. For example, the fifth conductive pattern 532 may be electrically connected to the wireless communication circuit 600, and an RF signal of the first frequency band may be transmitted or received between the fifth conductive pattern 532 and the wireless communication circuit 600. In one example, the fifth conductive pattern 532 and the wireless communication circuit 600 may be electrically connected to the wireless communication circuit 600 through an electrical connection member (not shown) (e.g., the first electrical connection member 314 of FIG. 6A) disposed on the sixth surface 530b of the third dielectric substrate 531 and/or at least one via (e.g., the first via 316, the second via 317 of FIG. 6C) penetrating the fifth surface 530a and the sixth surface 530b of the third dielectric substrate 531.

In one example, the sixth conductive pattern 533 may be positioned on the sixth surface 530b of the third dielectric substrate 531, and operate an antenna radiator for transmitting or receiving an RF signal of the second frequency band which is higher than the first frequency band. In another example, the sixth conductive pattern 533 may operate as an antenna radiator for transmitting or receiving an RF signal of the third frequency band which is higher than the first frequency band. For example, the sixth conductive pattern 533 may be electrically connected to the wireless communication circuit 600, and an RF signal of the second frequency band and/or the third frequency band may be transmitted or received between the sixth conductive pattern 533 and the wireless communication circuit 600. For example, the sixth conductive pattern 533 may be electrically connected to the wireless communication circuit 600 through an electrical connection member (not shown) (e.g., the second electrical connection member 515 of FIG. 6A) disposed on the sixth surface 530b of the third dielectric substrate 531.

According to yet another embodiment, as the fifth conductive pattern 532 operating as the antenna radiator of the first frequency band is disposed on the fifth surface 530a of the third dielectric substrate 531, and the sixth conductive pattern 533 operating as the antenna radiator of the second frequency band and/or the third frequency band is disposed on the sixth surface 530b of the third dielectric substrate 531, the third antenna module 530 may transmit or receive RF signals of two different frequency bands.

According to yet another embodiment, the fourth antenna module 540 may include a fourth dielectric substrate 541, a seventh conductive pattern 542 and/or an eighth conductive pattern 543.

In one example, the fourth dielectric substrate 541 may be a substrate formed of a material having a designated dielectric constant (e.g., a glass epoxy material (e.g., an FR4 material and/or a CEM-1 material) and/or a PP material), and the fourth dielectric substrate 541 may include a seventh surface 540a and an eighth surface 540b facing away from the seventh surface 540a. In one example, the seventh surface 540a of the fourth dielectric substrate 541 may be disposed to face the sixth surface 530b of the third dielectric substrate 531. For example, the seventh surface 540a of the fourth dielectric substrate 541 may be disposed to face the sixth surface 530b of the third dielectric substrate 531.

In one example, the seventh conductive pattern 542 may be positioned on the seventh surface 540a of the fourth dielectric substrate 541, and operate as an antenna radiator for transmitting or receiving an RF signal of the second frequency band. For example, the seventh conductive pattern 542 may be electrically connected to the wireless communication circuit 600, and an RF signal of the first frequency band may be transmitted or received between the seventh conductive pattern 542 and the wireless communication circuit 600. For example, the seventh conductive pattern 542 may be electrically connected to the wireless communication circuit 600 through an electrical connection member (not shown) disposed on the seventh surface 540a of the fourth dielectric substrate 541.

In one example, the eighth conductive pattern 543 may be positioned on the eighth surface 540b of the fourth dielectric substrate 541, and operate as an antenna radiator for transmitting or receiving an RF signal of the second frequency band which is higher than the first frequency band. In another example, the eighth conductive pattern 543 may operate as an antenna radiator for transmitting or receiving an RF signal of the third frequency band which is higher than the first frequency band. In one example, the eighth conductive pattern 543 may be electrically connected to the wireless communication circuit 600, and an RF signal of the second frequency band and/or the third frequency band may be transmitted or received between the eighth conductive pattern 543 and the wireless communication circuit 600. For example, the eighth conductive pattern 543 may be electrically connected to the wireless communication circuit through an electrical connection member (not shown) disposed on the seventh surface 540a of the fourth dielectric substrate 541 and/or at least one via (not shown) penetrating the seventh surface 540a and the eighth surface 540b of the fourth dielectric substrate 541.

According to yet another embodiment, as the seventh conductive pattern 542 operating as the antenna radiator of the first frequency band is disposed on the seventh surface 540a of the fourth dielectric substrate 541, and the eighth conductive pattern 543 operating as the antenna radiator of the second frequency band and/or the third frequency band is disposed on the eighth surface 540b of the fourth dielectric substrate 541, the fourth antenna module 540 may transmit or receive RF signals of two different frequency bands.

According to yet another embodiment, the fifth antenna module 550 may include a fifth dielectric substrate 551, a ninth conductive pattern 552 and/or a tenth conductive pattern 553.

In one example, the fifth dielectric substrate 551 may be a substrate formed of a material having a designated dielectric constant (e.g., a glass epoxy material (e.g., an FR4 material and/or a CEM-1 material) and/or a PP material), and the fifth dielectric substrate 551 may include a ninth surface 550a and a tenth surface 550b facing away from the ninth surface 550a.

In one example, the ninth conductive pattern 552 may be positioned on the ninth surface 550a of the fifth dielectric substrate 551, and operate as an antenna radiator for transmitting or receiving RF signals of the second frequency band and/or the third frequency band. In one example, the ninth conductive pattern 552 may be electrically connected to the wireless communication circuit 600, and RF signals of the second frequency band and/or the third frequency band may be transmitted or received between the ninth conductive pattern 552 and the wireless communication circuit 600. For example, the ninth conductive pattern 552 may be electrically connected to the wireless communication circuit 600 through an electrical connection member (not shown) (e.g., the fifth electrical connection member 534 of FIG. 7B) disposed on the tenth surface 550b of the fifth dielectric substrate 551 and/or at least one via penetrating the ninth surface 550a and the tenth surface 550b of the fifth dielectric substrate 551.

In one example, the tenth conductive pattern 553 may be positioned on the tenth surface 550b of the fifth dielectric substrate 551, and operate as an antenna radiator for transmitting or receiving RF signals of the second frequency band and/or the third frequency band substantially identically or similarly to the ninth conductive pattern 552. For example, the tenth conductive pattern 553 may be electrically connected to the wireless communication circuit 600, and RF signals of the second frequency band and/or the third frequency band may be transmitted or received between the tenth conductive pattern 553 and the wireless communication circuit 600.

In one example, as the ninth conductive pattern 552 is disposed on the ninth surface 550a of the fifth dielectric substrate 551, and the tenth conductive pattern 553 is disposed on the tenth surface 550b of the fifth dielectric substrate 551, the fifth antenna module 550 may implement substantially the same effect as two antennas disposed for transmitting or receiving the RF signals of the second frequency band and/or the third frequency band in the electronic device 100.

According to yet another embodiment, the sixth antenna module 560 may include a sixth dielectric substrate 561, an eleventh conductive pattern 562 and/or a twelfth conductive pattern 563.

In one example, the sixth dielectric substrate 561 may be a substrate formed of a material having a designated dielectric constant (e.g., a glass epoxy material (e.g., an FR4 material and/or a CEM-1 material) and/or a PP material), and the sixth dielectric substrate 561 may include an eleventh surface 560a and a twelfth surface 560b facing away from the eleventh surface 560a. In one example, the eleventh surface 560a of the sixth dielectric substrate 561 may be disposed to face the tenth surface 550b of the fifth dielectric substrate 551. For example, the eleventh surface 560a of the sixth dielectric substrate 561 may be disposed to face the tenth surface 550b of the fifth dielectric substrate 551.

In one example, the eleventh conductive pattern 562 may be positioned on the eleventh surface 560a of the sixth dielectric substrate 561, and operate as an antenna radiator for transmitting or receiving RF signals of the second frequency band and/or the third frequency band. In one example, the eleventh conductive pattern 562 may be electrically connected to the wireless communication circuit 600, and RF signals of the second frequency band and/or the third frequency band may be transmitted or received between the eleventh conductive pattern 562 and the wireless communication circuit 600. For example, the eleventh conductive pattern 562 may be electrically connected to the wireless communication circuit through an electrical connection member (not shown) disposed on the eleventh surface 560a of the sixth dielectric substrate 561.

In one example, the twelfth conductive pattern 563 may be positioned on the twelfth surface 560b of the sixth dielectric substrate 561, and operate as an antenna radiator for transmitting or receiving RF signals of the second frequency band and/or the third frequency band substantially identically or similarly to the eleventh conductive pattern 562. In one example, the twelfth conductive pattern 563 may be electrically connected to the wireless communication circuit 600, and RF signals of the second frequency band and/or the third frequency band may be transmitted or received between the twelfth conductive pattern 563 and the wireless communication circuit 600. For example, the twelfth conductive pattern 563 may be electrically connected to the wireless communication circuit 600 through an electrical connection member (not shown) disposed on the eleventh surface 560a of the sixth dielectric substrate 561 and/or at least one via (not shown) penetrating the eleventh surface 560a and the twelfth surface 560b of the sixth dielectric substrate 561.

In one example, as the eleventh conductive pattern 562 is disposed on the eleventh surface 560a of the sixth dielectric substrate 561, and the twelfth conductive pattern 563 is disposed on the twelfth surface 560b of the sixth dielectric substrate 561, the sixth antenna module 560 may implement substantially the same effect as two antennas disposed for transmitting or receiving RF signals of the second frequency band and/or the third frequency band in the electronic device 100.

According to yet another embodiment, the wireless communication circuit 600 may be disposed on a printed circuit board (e.g., the at least one printed circuit board 120 of FIG. 1), and may be electrically connected to at least one antenna module 500. In one example, the wireless communication circuit 600 may be electrically connected to the at least one antenna module 500 through an electrical connection member (not shown). The electrical connection member may include, for example, a signal wire, a coaxial cable, an FPCB and/or a conductive via, but is not limited thereto. In one example, the wireless communication circuit 600 may transmit an RF signal of a designated frequency band to the at least one antenna module 500, or receive an RF signal of a designated frequency band from the at least one antenna module 500.

According to yet another embodiment, the electronic device 100 may implement a 4×4 multiple input multiple output antenna of the frequency band of about 2.4 GHz through about 2.5 GHz, and an 8×8 multiple input multiple output of the frequency band of about 5 GHz through the first antenna module 510, the second antenna module 520, the third antenna module 530, the fourth antenna module 540, the fifth antenna module 550 and/or the sixth antenna module 560 described above.

Figure 12A:
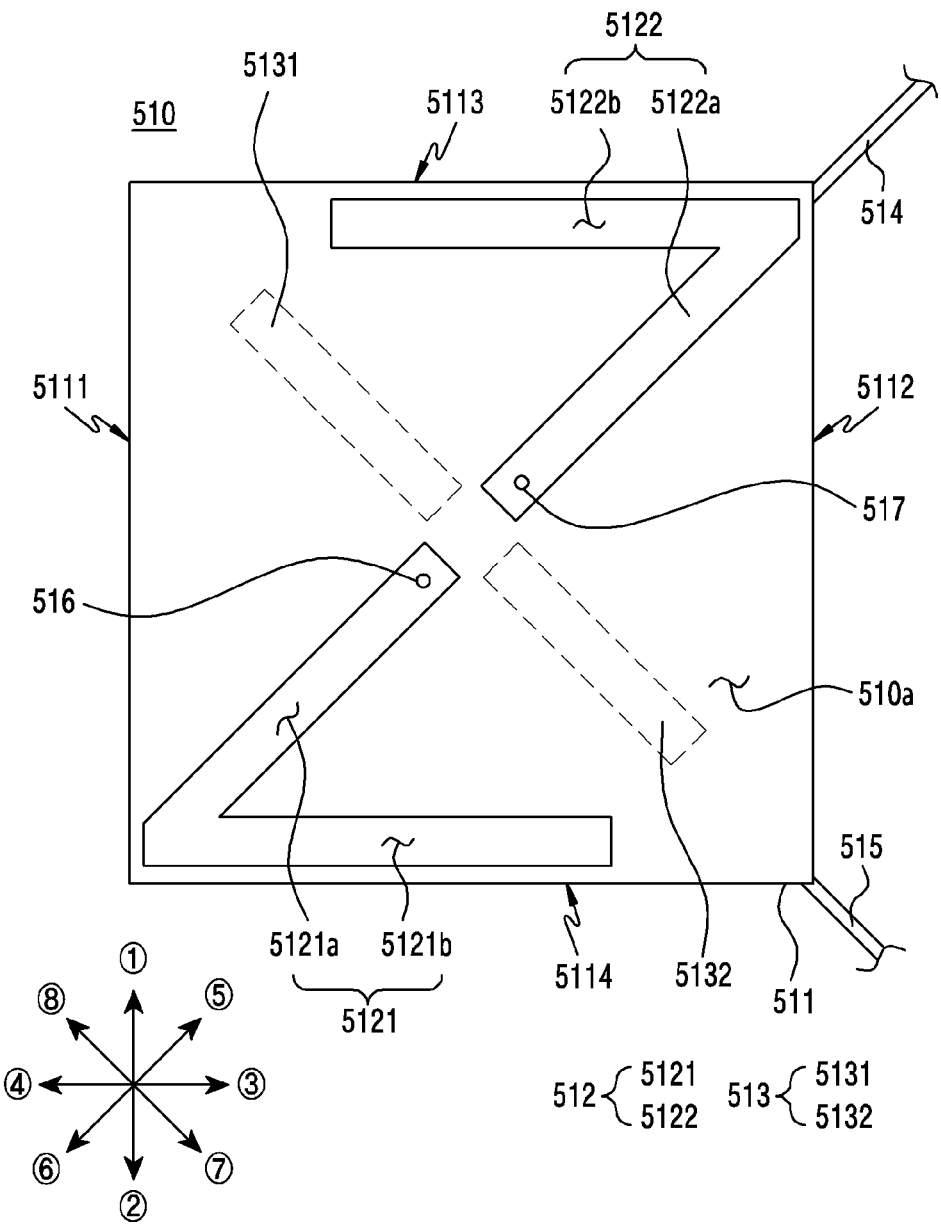
FIG. 12A is a diagram illustrating one surface of a first antenna module of an electronic device according to an embodiment of the disclosure.

FIG. 12A is a diagram illustrating one surface of a first antenna module of an electronic device according to an embodiment of the disclosure.

Figure 12B:
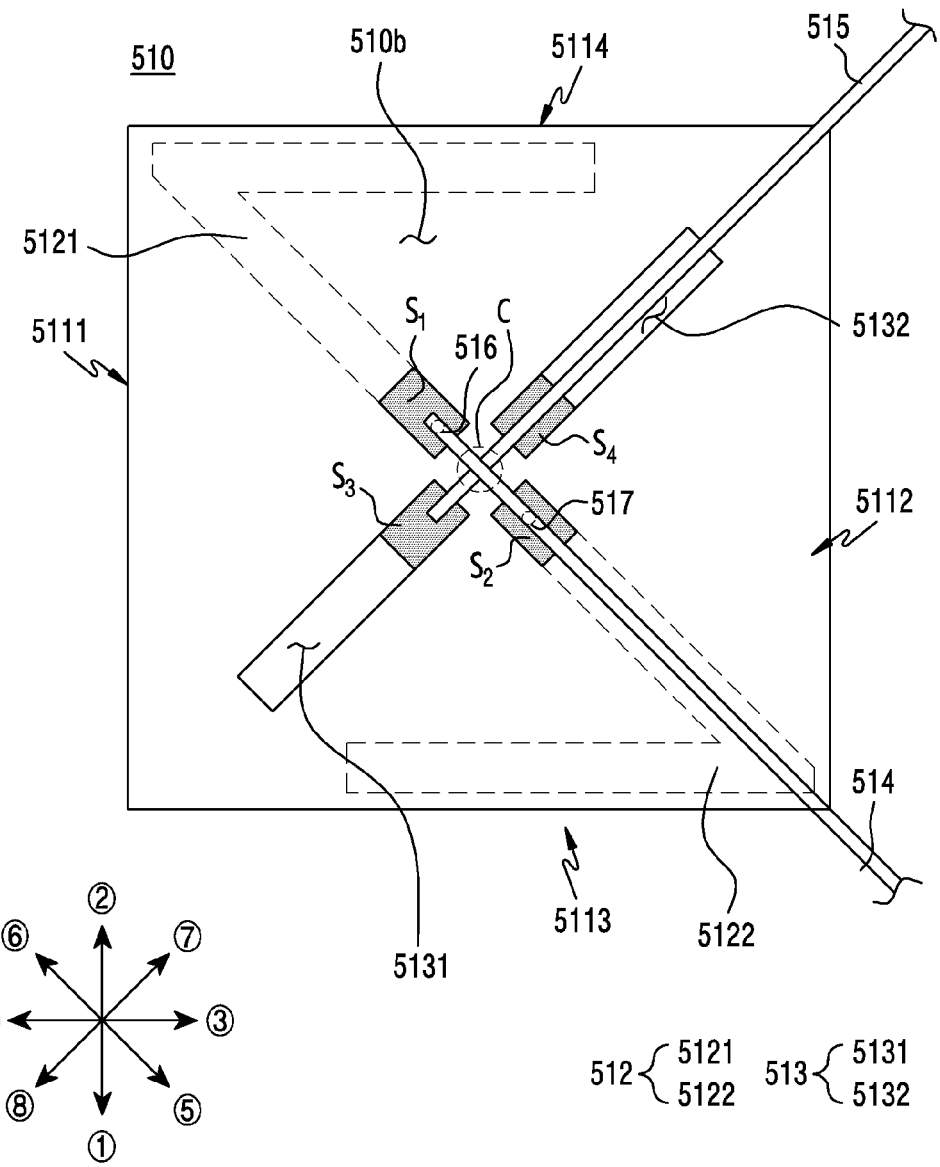
FIG. 12B is a diagram illustrating another surface of the first antenna module of FIG. 12A according to an embodiment of the disclosure.

FIG. 12B is a diagram illustrating another surface of the first antenna module of FIG. 12A according to an embodiment of the disclosure.

Figure 12C:
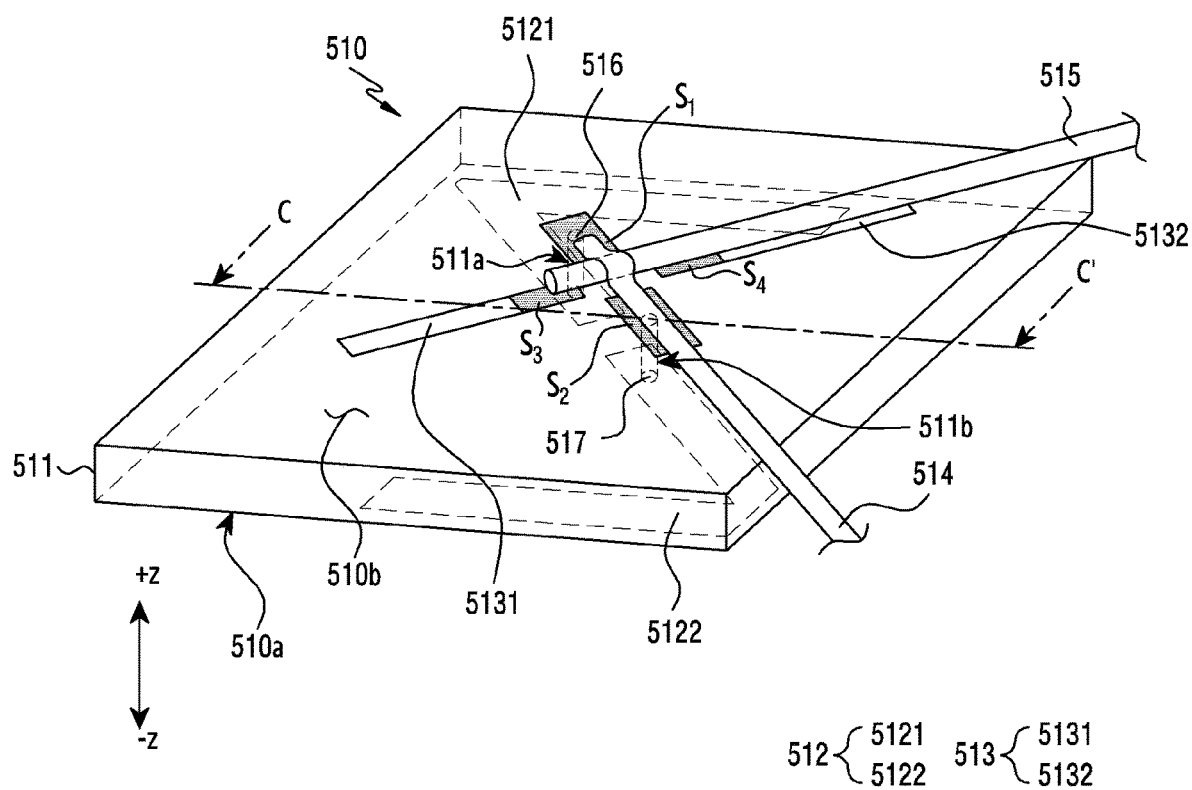
FIG. 12C is a perspective view of the first antenna module of FIG. 12A according to an embodiment of the disclosure.

FIG. 12C is a perspective view of the first antenna module of FIG. 12A according to an embodiment of the disclosure.

Figure 12D:
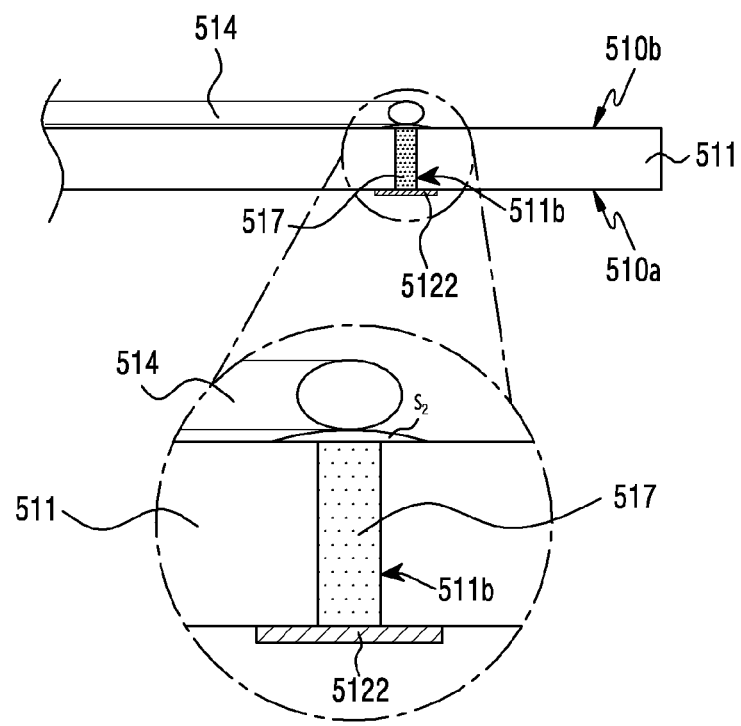
FIG. 12D is a cross-sectional view of the first antenna module of FIG. 12C taken along a C-C' direction according to an embodiment of the disclosure.

FIG. 12D is a cross-sectional view of the first antenna module of FIG. 12C taken along a C-C' direction according to an embodiment of the disclosure.

While only the structure of the first antenna module 510 is shown in FIGS. 12A, 12B, 12C, and/or 12D of the disclosure, the same structure as the first antenna module 510 may be applied to a second antenna module (e.g., the second antenna module 520 of FIGS. 10 and 11), a third antenna module (e.g., the third antenna module 530 of FIGS. 10 and 11), and/or a fourth antenna module (e.g., the fourth antenna module 540 of FIGS. 10 and 11).

Referring to FIGS. 12A, 12B, 12C, and 12D, the first antenna module 510 (e.g., the first antenna module 510 of FIGS. 10 and 11) of the electronic device (e.g., the electronic device 100 of FIG. 1) according to an embodiment may include a first dielectric substrate 511 (e.g., the first dielectric substrate 511 of FIGS. 10 and 11), a first conductive pattern 512 (e.g., the first conductive pattern 512 of FIGS. 10 and 11), and a second conductive pattern 513 (e.g., the second conductive pattern 513 of FIGS. 10 and 11).

According to yet another embodiment, the first dielectric substrate 511 may include a first surface 510a (e.g., the first surface 510a of FIGS. 10 and 11) and/or a second surface 510b (e.g., the second surface 510b of FIGS. 10 and 11). In one example, the first dielectric substrate 511 may include a first side surface 5111 extending along a first direction (e.g., a direction ① of FIG. 12A), a second side surface 5112 parallel to the first side surface 5111, and extending along the first direction, a third side surface 5113 extending along a third direction (e.g., a direction ③ of FIG. 12A) substantially perpendicular to the first direction, and interconnecting one end of the first side surface 5111 (e.g., one end of the direction ① of FIG. 12A) and one end of the second side surface 5112 (e.g., one end of the direction ① of FIG. 12A) and/or a fourth side surface 5114 parallel to the third side surface 5113, and interconnecting the other end of the first side surface 5111 (e.g., one end of a direction ② of FIG. 12A) and the other end of the second side surface 5112 (e.g., one end of the direction ② of FIG. 12A). While only the embodiment in which the first dielectric substrate 511 is formed in a rectangular shape is illustrated in the drawings, the shape of the first dielectric substrate 511 is not limited to the above-described embodiment. According to yet another embodiment (not shown), the first dielectric substrate 511 may be formed in a polygonal (e.g., triangular, pentagonal) shape, or may be formed in a circular and/or elliptical shape.

Referring to FIG. 12A, the first conductive pattern 512 according to yet another embodiment may be positioned on the first surface 510a of the first dielectric substrate 511. In one example, the first conductive pattern 512 may be electrically connected to a wireless communication circuit (e.g., the wireless communication circuit 600 of FIG. 10, FIG. 11), and thus operate as an antenna radiator for transmitting or receiving an RF signal of the first frequency band. In one example, the first conductive pattern 512 may include a 1-1 conductive pattern 5121 and/or a 1-2 conductive pattern 5122 spaced apart from the 1-1 conductive pattern 5121 by a designated distance. In one example, the 1-1 conductive pattern 5121 may include a first portion 5121a extending along a sixth direction (e.g., a direction ⑥ of FIG. 12A) and/or a second portion 5121b connected to one end of the first portion 5121a and extending along the third direction (e.g., the direction ③ of FIG. 12A). For example, the 1-1 conductive pattern 5121 may extend along the sixth direction from the center of gravity of the first dielectric substrate 511. In another example, the 1-2 conductive pattern 5122 may include a third portion 5122a extending along a fifth direction (e.g., a ⑤ direction of FIG. 12A) opposite to the first portion 5121a of the 1-1 conductive pattern 5121 and/or a fourth portion 5122b connected to one end of the third portion 5122a, and extending along a fourth direction (e.g., a direction ④ of FIG. 12A) opposite to the third direction. For example, the 1-2 conductive patterns 5122 may extend along the fifth direction from the center of gravity of the first dielectric substrate 511. In one example, with the structure where some region (e.g., the second portion 5121b) of the 1-1 conductive pattern 5121 is bent (or "bent"), the electronic device according to yet another embodiment may obtain a length of the 1-1 conductive pattern 5121 for transmitting or receiving the RF signal of the first frequency band without increasing a size of the first dielectric substrate 511. In another example, with the structure where some region (e.g., the fourth portion 5122b) of the 1-2 conductive pattern 5122 is bent (or "bent"), the electronic device according to yet another embodiment may obtain a length of the 1-2 conductive pattern 5122 for transmitting or receiving the RF signal of the first frequency band without increasing the size of the first dielectric substrate 511. For example, the 1-1 conductive pattern 5121 and/or the 1-2 conductive pattern 5122 may be formed in a ¼ wavelength (or "¼λ") length (e.g., about 3.125 cm) of the RF signal of the first frequency band, to operate as the antenna radiator for transmitting and/or receiving the RF signal of the first frequency band.

In one example, the 1-1 conductive pattern 5121 and/or the 1-2 conductive pattern 5122 each may be fed from the wireless communication circuit, and accordingly the first conductive pattern 512 may operate as a dipole antenna for transmitting or receiving an RF signal of the first frequency band. Since the dipole antenna may have a relatively high HPBW compared to other antennas (e.g., a patch antenna), a beam pattern radiated from the first conductive pattern 512 may be relatively highly isotropic.

Referring to FIG. 12B, the second conductive pattern 513 according to yet another embodiment may be positioned on the second surface 510b of the first dielectric substrate 511. In one example, the second conductive pattern 513 may include a 2-1 conductive pattern 5131 and/or a 2-2 conductive pattern 5132. In one example, the 2-1 conductive pattern 5131 may be formed by extending along an eighth direction (e.g., a direction ⑧ of FIG. 12B). For example, the 2-1 conductive pattern 5131 may extend along the eighth direction from the center of gravity of the first dielectric substrate 511. In another example, the 2-2 conductive pattern 5132 may be formed by extending along a seventh direction (e.g., a direction ⑦ of FIG. 12B) which is the opposite direction to the 2-1 conductive pattern 5131. For example, the 2-2 conductive pattern 5132 may extend along the seventh direction from the center of gravity of the first dielectric substrate 511. In one example, the 2-1 conductive pattern 5131 and/or the 2-2 conductive pattern 5131 may be formed in a structure having a shorter length than the 1-1 conductive pattern 5121 and/or the 1-2 conductive pattern 5122. Hence, the 2-1 conductive pattern 5131 and/or the 2-2 conductive pattern 5131 may operate as an antenna radiator for transmitting or receiving an RF signal of a relatively higher frequency band than the 1-1 conductive pattern 5121 and/or the 1-2 conductive pattern 5122. In one example, the 2-1 conductive pattern 5131 and/or the 2-2 conductive pattern 5132 each may be fed from the wireless communication circuit, and thus the second conductive pattern 513 may operate as a dipole antenna for transmitting or receiving an RF signal of the second frequency band. Since the dipole antenna may have a relatively higher HPBW than other antennas (e.g., a patch antenna), a beam pattern radiated from the second conductive pattern 513 may be relatively highly isotropic.

Referring to FIGS. 12C and 12D, the first antenna module 510 according to an embodiment may further include at least one through hole 511a and 511b, a first electrical connection member 514, a second electrical connection member 515, and/or at least one via 516 and 517.

According to another embodiment, the first electrical connection member 514 may be disposed on the second surface 510b of the first dielectric substrate 511. In one example, the first electrical connection member 514 may be at least one of a signal wire, a coaxial cable or an FPCB, but is not limited thereto. For example, the first electrical connection member 514 may include a conductor and/or a dielectric disposed to surround at least one region of the above-described conductor. In one example, at least one region of the first electrical connection member 514 may be fixed to the second surface 510b, by soldering (or "soldered") in at least one region (e.g., a region $S_1$, $S_2$ of FIGS. 12B and 12C) of the second surface 510b of the first dielectric substrate 511. In one example, at least one region of the first electrical connection member 514 may be soldered in a first region $S_1$ which is a region overlapping the 1-1 conductive pattern 5121 of the first surface 510a, when viewed from a direction perpendicular to the second surface 510b (e.g., the +z direction of FIG. 12C). In another example, at least one region of the first electrical connection member 514 may be soldered in a second region $S_2$ which is a region overlapping the 1-2 conductive pattern 5122 of the first surface 510a, when viewed from the direction perpendicular to the second surface 510b (e.g., the +z direction of FIG. 12C). In one example, since the first electrical connection member 514 is electrically connected to the at least one via 516, 517, the first electrical connection member 514 and/or the at least one via 516 and 517 may connect the first conductive pattern 512 disposed on the first surface 510a of the first dielectric substrate 511 and the wireless communication circuit.

According to yet another embodiment, the second electrical connection member 515 may be disposed on the second surface 510b of the first dielectric substrate 511 substantially identically or similarly to the first electrical connection member 514. In one example, the second electrical connection member 515 may be at least one of a signal wire, a coaxial cable or an FPCB, but is not limited thereto. For example, the second electrical connection member 515 may include a conductor and/or a dielectric disposed to surround at least one region of the above-described conductor. In one example, at least one region of the second electrical connection member 515 may be fixed to the second surface 510b, by soldering (or "soldered") in at least one region (e.g., a region $S_3$, $S_4$ of FIGS. 12B and 12C) of the second surface 510b of the first dielectric substrate 511. In one example, the second electrical connection member 515 may be soldered in a third region $S_3$ which is a region at least in part overlapping the 2-1 conductive pattern 5131. For example, the third region $S_3$ may be a region corresponding to one end of the 2-1 conductive pattern 5131 adjacent to the 2-2 conductive pattern 5132. In another example, the second electrical connection member 515 may be soldered in a fourth region $S_4$ at least in part overlapping the 2-2 conductive pattern 5132. For example, the fourth region $S_4$ may be a region corresponding to one end of the 2-2 conductive pattern 5132 adjacent to the 2-1 conductive pattern 5131. In one example, since at least one region of the second electrical connection member 515 is soldered in the third region $S_3$ corresponding to the 2-1 conductive pattern 5131 and/or the fourth region $S_4$ corresponding to the 2-2 conductive pattern 5132, the second electrical connection member 515 may electrically connect the second conductive pattern 513 and the wireless communication circuit.

In one example, the first electrical connection member 514 and the second electrical connection member 515 may be disposed to overlap in some region (e.g., a region C of FIG. 12B) of the second surface 510b. In one example, the first electrical connection member 514 is positioned above the second electrical connection member 515 (e.g., the +z direction of FIG. 12C) in some region (the region C) of the second surface 510b, and some region of the first electrical connection member 514 and some region of the second electrical connection member 515 may be disposed to overlap. For example, the first electrical connection member 514 may be formed in a bridge type in some region C of the second surface 510b, and thus positioned above the second electrical connection member 515 (e.g., the +z direction of FIG. 12C). In another example (not shown), the second electrical connection member 515 is positioned above the first electrical connection member 514 (e.g., the +z direction of FIG. 12C) in some region (the region C) of the second surface 510b, and some region of the first electrical connection member 514 and some region of the second electrical connection member 515 may be disposed to overlap. According to yet another embodiment, since the first electrical connection member 514 and the second electrical connection member 515 are soldered on the same surface (e.g., the second surface 510b of the first dielectric substrate 511), a space (or "mounting space") occupied by the first antenna module 510 in the electronic device (e.g., the electronic device 100 of FIG. 1) may be reduced compared to soldering the first electrical connection member 514 and the second electrical connection member 515 on different surfaces. For example, since the soldering region of the first antenna module 510 is positioned on the same surface, the mounting space of the first antenna module 510 may be reduced compared to soldering the first electrical connection member 514 to the first surface 510a of the first dielectric substrate 511 and soldering the second electrical connection member 515 to the second surface 510b of the first dielectric substrate 511. According to yet another embodiment, as the mounting space of the first antenna module 510 is reduced, the size of the electronic device may be reduced.

Referring to FIGS. 12C and 12D, the at least one through hole 511a and 511b according to yet another embodiment may penetrate the first surface 510a and the second surface 510b of the first dielectric substrate 511. For example, the at least one through hole may include a first through hole 511a and/or a second through hole 511b spaced apart from the first through hole 511a by a designated distance. In one example, the first through hole 511a may be disposed at a position overlapping at least one region of the 1-1 conductive pattern 5121, when viewed from a direction perpendicular to the first surface 510a and/or the second surface 510b of the first dielectric substrate 511 (e.g., the +z direction of FIG. 12C). As another example, the second through hole 511b may be disposed at a position overlapping at least one region of the 1-2 conductive pattern 5122, when viewed from the direction perpendicular to the first surface 510a and/or the second surface 510b of the first dielectric substrate 511 (e.g., the +z direction of FIG. 12C).

According to yet another embodiment, the at least one via 516 and 517 may be positioned in the at least one through hole 511a and 511b, and electrically connect a configuration disposed on the first surface 510a of the first dielectric substrate 511 and a configuration disposed on the second surface 510b of the first dielectric substrate 511. In one example, the at least one via 516 and 517 may be formed of a conductive material. For example, the at least one via may include a first via 516 disposed within the first through hole 511a and/or a second via 517 disposed within the second through hole 511b. In one example, as the first via 516 is positioned in the first through hole 511a disposed at the position overlapping at least one region of the 1-1 conductive pattern 5121, the 1-1 conductive pattern 5121 disposed on the first surface 510a of the first dielectric substrate 511 may be electrically connected with the first electrical connection member 514 disposed on the second surface 510b of the first dielectric substrate 511 through the first via 516. In another example, as the second via 517 is positioned in the second through hole 511b disposed at the position overlapping at least one region of the 1-2 conductive pattern 5122, the 1-2 conductive pattern 5122 disposed on the first surface 510a of the first dielectric substrate 511 may be electrically connected with the first electrical connection member 514 disposed on the second surface 510b of the first dielectric substrate 511 through the second via 517.

According to yet another embodiment, the first conductive pattern 512 may be electrically connected to a wireless communication circuit through the at least one via (e.g., the first via 516 and/or the second via 517) and the first electrical connection member 514 electrically connected to the at least one via. According to yet another embodiment, the second conductive pattern 513 may be electrically connected to the wireless communication circuit through the second electrical connection member 515 disposed on the same surface (e.g., the second surface 510*b*) as the second conductive pattern 513.

According to yet another embodiment, the wireless communication circuit may transmit or feed an RF signal of the first frequency band to the 1-1 conductive pattern 5121 and/or the 1-2 conductive pattern 5122 of the first conductive pattern 512 through the first electrical connection member 514, the first via 516 and/or the second via 517. Hence, the first conductive pattern 512 may operate as an antenna radiator (e.g., a dipole antenna) for transmitting or receiving an RF signal of the first frequency band. The first frequency band may be, for example, the frequency band of about 2.4 GHz through about 2.5 GHz, but is not limited thereto.

In another example, the wireless communication circuit may transmit or feed an RF signal of the second frequency band to the 2-1 conductive pattern 5131 and/or the 2-2 conductive pattern 5132 of the second conductive pattern 513 through the second electrical connection member 515. Hence, the second conductive pattern 513 may operate as an antenna radiator (e.g., a dipole antenna) for transmitting or receiving an RF signal of the second frequency band which is higher than the first frequency band. The second frequency band may be, for example, the 5 GHz LB frequency band (e.g., about 5.1 GHz through about 5.2 GHz) and/or the 5 GHz HB frequency band (e.g., about 5.6 GHz through about 5.8 GHz), but is not limited thereto.

According to yet another embodiment, the first conductive pattern 512 and the second conductive pattern 513 may be disposed substantially perpendicular to each other. According to yet another embodiment (not shown), since the first conductive pattern 512 operates as the antenna radiator for transmitting or receiving the RF signal of the first frequency band, and the second conductive pattern 513 operates as the antenna radiator for transmitting or receiving the RF signal of the second frequency band which is higher frequency than the first frequency band, interference between the first conductive pattern 512 and the second conductive pattern 513 may be insignificant. Thus, the first conductive pattern 512 and the second conductive pattern 513 may be disposed at a designated angle (e.g., 30°, 45°, or 60°), or may be disposed to overlap at least in part when viewed from the first surface 510*a* or the second surface 510*b* of the first dielectric substrate 511.

TABLE 3

| Frequency | Radiation efficiency | Average antenna gain of the Vertical direction | Average antenna gain of the horizontal direction | Total antenna gain |
|---|---|---|---|---|
| 2.40 GHz | 72.4% | −4.8 dBi | −4.1 dBi | −1.4 dBi |
| 2.42 GHz | 71.5% | −4.6 dBi | −4.3 dBi | −1.5 dBi |
| 2.44 GHz | 72.7% | −4.4 dBi | −4.3 dBi | −1.4 dBi |
| 2.46 GHz | 72.3% | −4.4 dBi | −4.5 dBi | −1.4 dBi |
| 2.48 GHz | 72.6% | −4.2 dBi | −4.6 dBi | −1.4 dBi |
| 2.50 GHz | 75.5% | −4.0 dBi | −4.5 dBi | −1.2 dBi |

TABLE 4

| Frequency | Radiation efficiency | Average antenna gain of the Vertical direction | Average antenna gain of the horizontal direction | Average antenna gain in all direction |
|---|---|---|---|---|
| 5.15 GHz | 62.5% | −4.1 dBi | −6.3 dBi | −2.0 dBi |
| 5.29 GHz | 53.8% | −5.0 dBi | −6.5 dBi | −2.7 dBi |
| 5.43 GHz | 56.7% | −5.0 dBi | −6.0 dBi | −2.5 dBi |
| 5.57 GHz | 53.4% | −5.2 dBi | −6.3 dBi | −2.7 dBi |
| 5.71 GHz | 61.3% | −4.2 dBi | −6.4 dBi | −2.1 dBi |
| 5.85 GHz | 56.1% | −4.4 dBi | −7.1 dBi | −2.5 dBi |

Table 3 shows the measurement results of the radiation efficiency and the average antenna gain in the first frequency band (e.g., about 2.4 GHz through about 2.5 GHz frequency band) of the first antenna module 310. Table 4 shows the measurement results of the radiation efficiency and the average antenna gain in the second frequency band (e.g., about 5 GHz LB frequency band and/or about 5 GHz HB frequency band) of the first antenna module 310.

In Table 3 and Table 4, the antenna gain of the horizontal direction may indicate the antenna gain of the direction ① and/or the direction ② of FIG. 12A, and the antenna gain of the vertical direction may indicate the antenna gain of the direction ③ and/or the direction ④ of FIG. 12A.

Referring to Table 3, it may be identified that the first antenna module 310 has the radiation efficiency over 70%, and the antenna gain over −1.5 dBi in the frequency band of about 2.4 GHz through about 2.5 GHz. It may be identified from the measurement results of Table 3 that the first conductive pattern 512 of the first antenna module 510 may operate as the antenna radiator for transmitting or receiving an RF signal of the frequency band of about 2.4 GHz through about 2.5 GHz.

Referring to Table 4, it may be identified that the first antenna module 310 has the average radiation efficiency over 57%, and the antenna gain over −2.7 dBi in the frequency band of about 5.15 GHz through about 5.85 GHz. It may be identified from the measurement results of Table 4 that the second conductive pattern 513 of the first antenna module 510 may operate as the antenna radiator for transmitting or receiving an RF signal of the frequency band of about 5.15 GHz through about 5.85 GHz.

According to yet another embodiment (not shown), a second antenna module (e.g., the second antenna module 520 of FIGS. 10 and 11), a third antenna module (e.g., the third antenna module 530 of FIGS. 10 and 11), and/or a fourth antenna module (e.g., the fourth antenna module 540 of FIGS. 10 and 11) may have a substantially identical or similar structure to the first antenna module 510. According to yet another embodiment (not shown), a fifth antenna module (e.g., the fifth antenna module 550 of FIGS. 10 and 11) and/or a sixth antenna module (e.g., the sixth antenna module 560 of FIGS. 10 and 11) may have a substantially identical or similar structure to the third antenna module 330 of FIGS. 7A through 7D.

Figure 13:
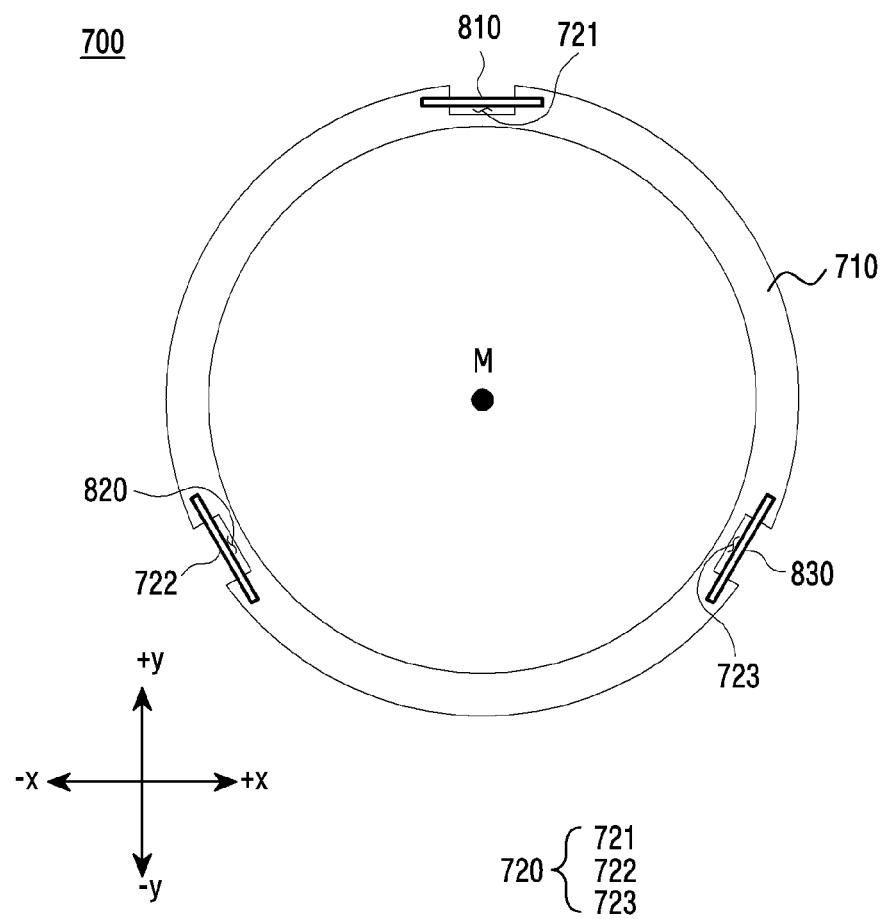
FIG. 13 is a front view of an antenna assembly of an electronic device according to an embodiment of the disclosure.

FIG. 13 is a front view of an antenna assembly of an electronic device according to an embodiment of the disclosure.

Referring to FIG. 13, the antenna assembly 700 of the electronic device (e.g., the electronic device 100 of FIGS. 1 and 2) according to an embodiment may include a fixing bracket 710 (e.g., the fixing bracket 210 of FIG. 2) and at least one antenna module 810, 820, and/or 830 (e.g., the at least one antenna module 300 of FIG. 2).

According to an embodiment, the fixing bracket 710 may include at least one fixing groove 720 for fixing the at least one antenna module 810, 820 and/or 830. In one example, the at least one fixing groove 720 may include a first fixing groove 721, a second fixing groove 722, and/or a third fixing groove 723. The first fixing groove 721, the second fixing groove 722, and/or the third fixing groove 723 may be radially disposed based on a virtual center (M of FIG. 13) of the fixing bracket 710. In one example, the first fixing grooves 721, the second fixing grooves 722, and/or the third fixing grooves 723 may be disposed at equal intervals based on the virtual center M. For example, the first fixing groove 721, the second fixing groove 722, and/or the third fixing groove 723 may be disposed at intervals of 120° based on the virtual center M of the fixing bracket 710. However, the arrangement structure of the first fixing groove 721, the second fixing groove 722, and/or the third fixing groove 723 is not limited to the above-described embodiment, and according to another embodiment, the first fixing groove 721, the second fixing grooves 722, and/or the third fixing grooves 723 may be disposed at irregular intervals. According to an embodiment, the at least one antenna module 810, 820 and/or 830 may be disposed in the at least one fixing groove 720 of the fixing bracket 710, and operate as an antenna radiator for transmitting or receiving RF signals of various frequency bands. In one example, the at least one antenna module 810, 820, and/or 830 may include a first antenna module 810 disposed in the first fixing groove 721, a second antenna module 820 disposed in the second fixing groove 722, and/or a third antenna module 830 disposed in the third fixing groove 723. In one example, the first antenna module 810, the second antenna module 820, and/or the third antenna module 830 may be radially disposed based on the virtual center M of the fixing bracket 710 through the arrangement structure of the at least one fixing groove 720 (e.g., the first fixing groove 721, the second fixing groove 722, and/or the third fixing groove 723). In one example, the first antenna module 810, the second antenna module 820, and/or the third antenna module 830 may be disposed at intervals of 120° based on the virtual center M of the fixing bracket 710. However, the arrangement structure of the first antenna module 810, the second antenna module 820, and/or the third antenna module 830 is not limited to the above-described embodiment, and according to another embodiment, the first antenna module 810, the second antenna module 820, and/or the third antenna module 830 may be disposed at irregular intervals.

According to an embodiment, the at least one antenna module 810, 820, and/or 830 may include a conductive pattern disposed on one surface and a conductive pattern disposed on the other surface facing away from the one surface. For example, the first antenna module 810 may include a first conductive pattern (e.g., a first conductive pattern 812 of FIG. 14) disposed on one surface of the first antenna module 810 and/or a second conductive pattern (e.g., a second conductive pattern 813 of FIG. 14) disposed on the other surface facing away from the one surface of the first antenna module 810.

In one example, the conductive patterns disposed on the one surface and/or the other surface of the at least one antenna module 810, 820 and/or 830 may be electrically connected to a wireless communication circuit (e.g., a wireless communication circuit 900 of FIG. 15), to operate as an antenna radiator. For example, the wireless communication circuit may transmit or feed an RF signal of a designated frequency band to the conductive patterns disposed on the one surface and/or the other surface of the at least one antenna module 810, 820, and/or 830. As another example, the wireless communication circuit may receive an RF signal of a designated frequency band from the conductive patterns disposed on the one surface and/or the other surface of the at least one antenna module 810, 820 and/or 830. For example, the first conductive pattern and/or the second conductive pattern of the first antenna module 810 may be electrically connected to the wireless communication circuit, to operate as an antenna radiator for transmitting or receiving the RF signal of the designated frequency band. Descriptions on the configuration of the at least one antenna module 810, 820, and/or 830 and the electrical connections between the wireless communication circuit and the at least one antenna module 810, 820, and/or 830 shall be described.

Figure 14:
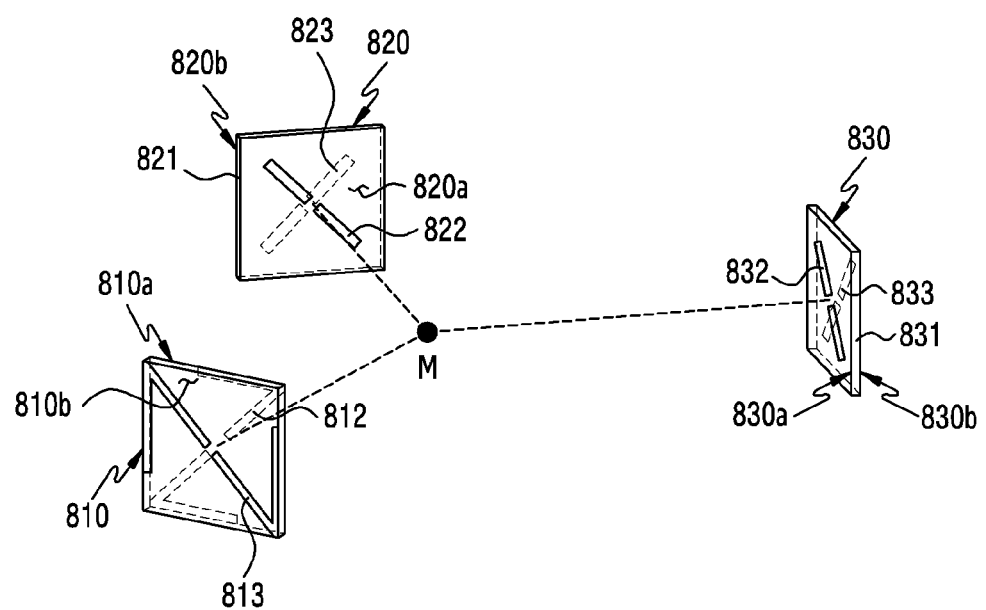
FIG. 14 is a diagram illustrating an antenna arrangement structure inside an electronic device according to an embodiment of the disclosure.
Figure 15:
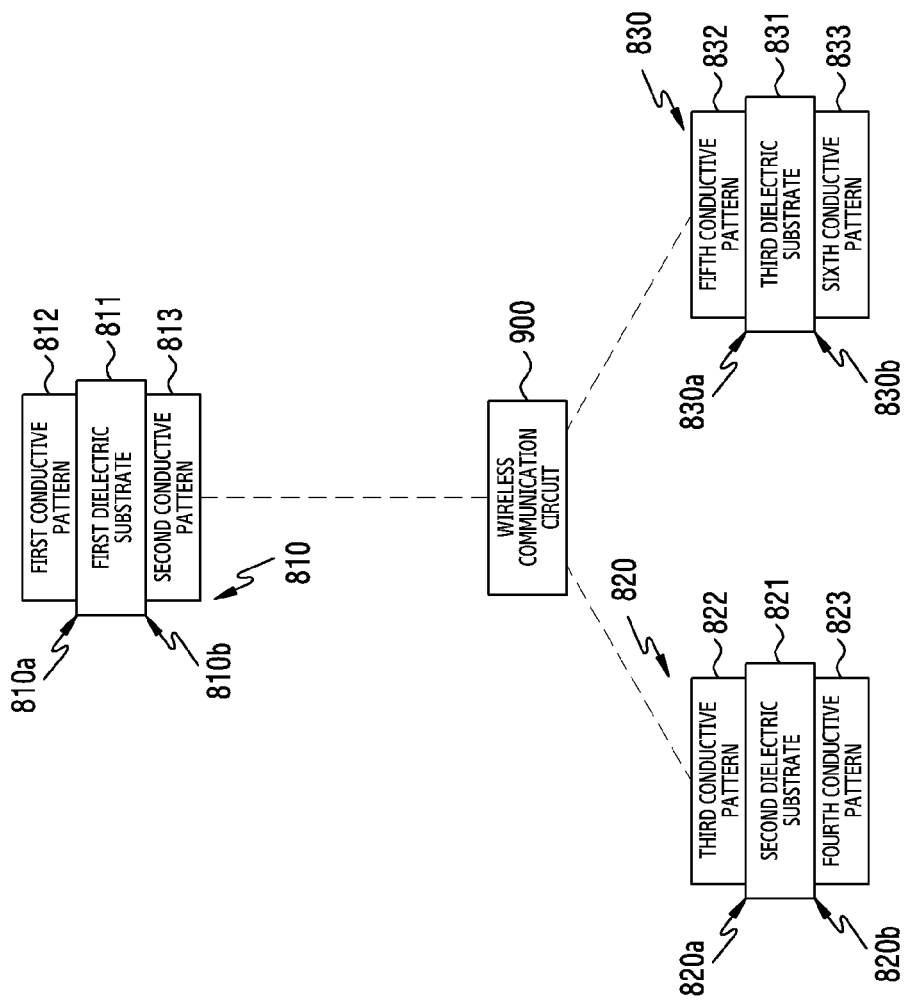
FIG. 15 is a diagram illustrating electrical connections between an antenna and a wireless communication circuit of an electronic device according to an embodiment of the disclosure.

FIG. 14 is a diagram illustrating an arrangement structure of an antenna (e.g., at least one antenna module 810, 820, and/or 830) inside an electronic device 100 according to an embodiment of the disclosure. FIG. 15 is a diagram illustrating electrical connections between an antenna (e.g., at least one antenna module 810, 820, and/or 830) and a wireless communication circuit 900 of an electronic device 100 according to an embodiment of the disclosure. FIG. 14 is the diagram illustrating that the fixing bracket 710 is removed from the antenna assembly 700 of FIG. 13.

Referring to FIGS. 14 and 15, the electronic device 100 (e.g., the electronic device 100 of FIG. 1) according to an embodiment may include at least one antenna module 810, 820 and/or 830 (e.g., the at least one antenna module 810, 820 and/or 830 of FIG. 13) and the wireless communication circuit 900.

According to another embodiment, the at least one antenna module 810, 820 and/or 830 may include a first antenna module 810 (e.g., the first antenna module 810 of FIG. 13), a second antenna module 820 (e.g., the second antenna module 820 of FIG. 13), and/or a third antenna module 830 (e.g., the third antenna module 830 of FIG. 13). In one example, the first antenna module 810, the second antenna module 820, and/or the third antenna module 830 may be radially disposed based on a virtual center M (e.g., the virtual center M of FIG. 13). In one example, the first antenna module 810, the second antenna module 820, and/or the third antenna module 830 may be disposed at equal intervals based on the virtual center M. For example, an angle between the first antenna module 810 and the second antenna module 820, an angle between the second antenna module 820 and the third antenna module 830, and/or an angle between the third antenna module 830 and the first antenna module 810 may be 120° based on the virtual center M. In another example, the first antenna module 810, the second antenna module 820, and/or the third antenna module 830 may be disposed at irregular intervals.

According to yet another embodiment, the first antenna module 810 may include a first dielectric substrate 811, a first conductive pattern 812 and/or a second conductive pattern 813. In one example, the first antenna module 810 may have a substantially identical or similar structure to the first antenna module 310 of FIGS. 6A through 6D, and its redundant description will be omitted hereafter.

In one example, the first dielectric substrate 811 may be a substrate formed of a material having a designated dielectric constant (e.g., a glass epoxy material (e.g., an FR4 material and/or a CEM-1 material) and/or a PP material), and the first dielectric substrate 811 may include a first surface 810*a* and a second surface 810*b* facing away from the first surface 810*a*.

In one example, the first conductive pattern 812 may be positioned on the first surface 810*a* of the first dielectric substrate 811, and operate as an antenna radiator for transmitting or receiving an RF signal of the first frequency band. For example, the first conductive pattern 812 may be electrically connected to the wireless communication circuit 900, and an RF signal of the first frequency band may be transmitted or received between the first conductive pattern 812 and the wireless communication circuit 900. For example, the first frequency band may be the frequency band of about 2.4 GHz through about 2.5 GHz. In one example, the first conductive pattern 812 and the wireless communication circuit 900 may be electrically connected to the wireless communication circuit 900 through an electrical connection member (not shown) (e.g., the first electrical connection member 314 of FIG. 6A) disposed on the second surface 510b of the first dielectric substrate 511 and/or at least one via (e.g., the first via 316, the second via 317 of FIG. 6C) penetrating the first surface 510a and the second surface 510b of the first dielectric substrate 511.

In one example, the second conductive pattern 813 may be positioned on the second surface 810b of the first dielectric substrate 811, and operate as an antenna radiator for transmitting or receiving an RF signal of the first frequency band substantially identically or similarly to the first conductive pattern 812. For example, the second conductive pattern 813 may be electrically connected to the wireless communication circuit 900, and an RF signal of the first frequency band may be transmitted or received between the second conductive pattern 813 and the wireless communication circuit 900. In one example, the second conductive pattern 813 may be disposed to be substantially perpendicular to the first conductive pattern 812, to obtain isolation from the first conductive pattern 812. In one example, as the first conductive pattern 812 is disposed on the first surface 810a of the first dielectric substrate 811, and the second conductive pattern 813 is disposed on the second surface 810b of the first dielectric substrate 811, the first antenna module 810 may implement substantially the same effect as two antennas disposed for transmitting or receiving the RF signal of the first frequency band in the electronic device 100. In one example, the first conductive pattern 812 and the second conductive pattern 813 may have substantially the same length. For example, the first conductive pattern 812 and the second conductive pattern 813 may be formed in a ½ wavelength (or "½λ") length (e.g., 6.25 cm) of the RF signal of the first frequency band.

According to yet another embodiment, the second antenna module 820 may include a second dielectric substrate 821, a third conductive pattern 822 and/or a fourth conductive pattern 823. In one example, the second antenna module 820 may have a structure substantially identical or similar to the third antenna module 330 of FIGS. 7A through 7D, and its redundant description shall be omitted hereafter.

In one example, the second dielectric substrate 821 may be a substrate formed of a material having a designated dielectric constant (e.g., a glass epoxy material (e.g., an FR4 material and/or a CEM-1 material) and/or a PP material), and the second dielectric substrate 821 may include a third surface 820a and a fourth surface 820b facing away from the third surface 820a.

In one example, the third conductive pattern 822 may be positioned on the third surface 820a of the second dielectric substrate 821, and operate as an antenna radiator for transmitting or receiving an RF signal of the second frequency band. In one example, the third conductive pattern 822 may be formed in a shape having a relatively shorter length than the first conductive pattern 812 and/or the second conductive pattern 813. In one example, the third conductive pattern 822 may be electrically connected to the wireless communication circuit 900, and the RF signal of the second frequency band higher than the first frequency band may be transmitted or received between the third conductive pattern 822 and the wireless communication circuit 900. For example, the third conductive pattern 822 may be electrically connected to the wireless communication circuit 900 through an electrical connection member (not shown) disposed on the third surface 820a of the second dielectric substrate 821. The second frequency band may be, for example, the 5 GHz LB frequency band (e.g., about 5.1 GHz through about 5.2 GHz) and/or the 5 GHz HB frequency band (e.g., about 5.6 GHz through about 5.8 GHz), but is not limited thereto.

In one example, the fourth conductive pattern 823 may be positioned on the fourth surface 820b of the second dielectric substrate 821, and operate as an antenna radiator for transmitting or receiving an RF signal of the second frequency band substantially identically or similarly to the third conductive pattern 822. In one example, the fourth conductive pattern 823 may be formed in a shape having a relatively shorter length than the first conductive pattern 812 and/or the second conductive pattern 813. For example, the fourth conductive pattern 823 may be electrically connected to the wireless communication circuit 900, and the RF signal of the second frequency band which is higher than the first frequency band may be transmitted or received between the fourth conductive pattern 823 and the wireless communication circuit 900. For example, the fourth conductive pattern 823 may be electrically connected to the wireless communication circuit 900 through an electrical connection member (not shown) disposed on the third surface 820a of the second dielectric substrate 821 and/or at least one via (not shown) penetrating the third surface 820a and the fourth surface 820b of the second dielectric substrate 821.

In one example, as the third conductive pattern 822 is disposed on the third surface 820a of the second dielectric substrate 821, and the fourth conductive pattern 823 is disposed on the fourth surface 820b of the second dielectric substrate 821, the second antenna module 820 may implement substantially the same effect as two antennas disposed for transmitting or receiving the RF signal of the second frequency band in the electronic device 100. In one example, the third conductive pattern 822 and the fourth conductive pattern 823 may have substantially the same length. For example, the third conductive pattern 822 and the fourth conductive pattern 823 may be formed in a length (e.g., 3 cm) of ½ wavelength (or "½λ") of the RF signal of the second frequency band.

According to yet another embodiment, the third antenna module 830 may include a third dielectric substrate 831, a fifth conductive pattern 832 and/or a sixth conductive pattern 833.

In one example, the third dielectric substrate 831 may be a substrate formed of a material having a designated dielectric constant (e.g., a glass epoxy material (e.g., an FR4 material and/or a CEM-1 material) and/or a PP material), and the third dielectric substrate 831 may include a fifth surface 830a and a sixth surface 830b facing away from the fifth surface 830a. In one example, the third antenna module 830 may have a structure substantially identical or similar to the third antenna module 330 of FIGS. 7A through 7D, and its redundant description shall be omitted hereafter.

In one example, the fifth conductive pattern 832 may be positioned on the fifth surface 830a of the third dielectric substrate 831, and operate as an antenna radiator for transmitting or receiving an RF signal of the second frequency band. In one example, the fifth conductive pattern 832 may be formed in a shape having a relatively shorter length than the first conductive pattern 812 and/or the second conductive pattern 813. In one example, the fifth conductive pattern 832 may be electrically connected to the wireless communication circuit 900, and an RF signal of the second frequency higher than the first frequency band may be transmitted or received between the fifth conductive pattern 832 and the wireless communication circuit 900. In one example, the fifth conductive pattern 832 may be electrically connected to the wireless communication circuit 900 through an electrical connection member (not shown) disposed on the sixth surface 830b of the third dielectric substrate 831 and/or at least one via electrically connected to the electrical connection member.

In one example, the sixth conductive pattern 833 may be positioned on the sixth surface 830b of the third dielectric substrate 831, and operate as an antenna radiator for transmitting or receiving an RF signal of the second frequency band substantially identically or similarly to the fifth conductive pattern 832. In one example, the sixth conductive pattern 833 may be formed in a shape having a relatively shorter length than the first conductive pattern 812 and/or the second conductive pattern 813. In one example, the sixth conductive pattern 833 may be electrically connected to the wireless communication circuit 900, and an RF signal of the second frequency which is higher than the first frequency band may be transmitted or received between the sixth conductive pattern 833 and the wireless communication circuit 900. For example, the sixth conductive pattern 833 may be electrically connected to the wireless communication circuit 900 through an electrical connection member (not shown) disposed on the sixth surface 830b of the third dielectric substrate 831.

In one example, as the fifth conductive pattern 832 is disposed on the fifth surface 830a of the third dielectric substrate 831, and the sixth conductive pattern 833 is disposed on the sixth surface 830b of the third dielectric substrate 831, the third antenna module 830 may implement substantially the same effect as two antennas disposed for transmitting or receiving the RF signal of the second frequency band in the electronic device 100. In one example, the fifth conductive pattern 832 and the sixth conductive pattern 833 may have substantially the same length. For example, the fifth conductive pattern 832 and the sixth conductive pattern 833 may be formed in a length (e.g., 3 cm) of ½ wavelength (or "½λ") of the RF signal of the second frequency band. In another example, the third conductive pattern 822, the fourth conductive pattern 823, the fifth conductive pattern 832, and/or the sixth conductive pattern 833 may have substantially the same length.

According to yet another embodiment, the wireless communication circuit 900 may be disposed on a printed circuit board (e.g., the at least one printed circuit board 120 of FIG. 1), and electrically connected to the at least one antenna module 800. In one example, the wireless communication circuit 900 may be electrically connected to the at least one antenna module 800 through an electrical connection member (not shown). The electrical connection member may include, for example, a signal wire, a coaxial cable, an FPCB and/or a conductive via, but is not limited thereto. In one example, the wireless communication circuit 900 may transmit an RF signal of a designated frequency band to the at least one antenna module 800, or receive an RF signal of a designated frequency band from the at least one antenna module 800.

According to yet another embodiment, the electronic device 100 may implement a 2×2 multiple input multiple output antenna of the frequency band of about 2.4 GHz through about 2.5 GHz by means of the above-described first antenna module 810. In another example, the electronic device 100 may implement a 4×4 multiple input multiple output antenna of the frequency band of about 5 GHz through the second antenna module 820 and/or the third antenna module 830 described above.

An electronic device (e.g., the electronic device 100 of FIG. 1) according to yet another embodiment of the disclosure may include a housing (e.g., the housing of FIG. 1), a first antenna (e.g., the first antenna module 310 of FIGS. 4 and 5) disposed in the housing, a second antenna (e.g., the second antenna module 320 of FIGS. 4 and 5) disposed in the housing, and spaced apart from the first antenna, a printed circuit board (e.g., the at least one printed circuit board 120 of FIG. 1) disposed in the housing, and a wireless communication circuit (e.g., the wireless communication circuit 400 of FIG. 5) disposed on the printed circuit board, and transmitting or receiving an RF signal of a designated frequency band through the first antenna and the second antenna, the first antenna may include a first dielectric substrate (e.g., the first dielectric substrate 311 of FIGS. 4 and 5) including a first surface (e.g., the first surface 310a of FIGS. 4 and 5) and a second surface (e.g., the second surface 310b of FIGS. 4 and 5) facing away from the first surface, a first conductive pattern (e.g., the first conductive pattern 312 of FIGS. 4 and 5) disposed on the first surface, and operating as an antenna radiator for transmitting or receiving an RF signal of a first frequency band and a second conductive pattern (e.g., the second conductive pattern 313 of FIGS. 4 and 5) disposed on the second surface, and operating as an antenna radiator for transmitting or receiving an RF signal of the first frequency band, the second antenna may include a second dielectric substrate (e.g., the second dielectric substrate 321 of FIGS. 4 and 5) including a third surface (e.g., the third surface 320a of FIGS. 4 and 5) and a fourth surface (e.g., the fourth surface 320b of FIGS. 4 and 5) facing away from the third surface, a third conductive pattern (e.g., the third conductive pattern 322 of FIGS. 4 and 5) disposed on the third surface, and operating as an antenna radiator for transmitting or receiving an RF signal of the first frequency band and a fourth conductive pattern (e.g., the fourth conductive pattern 323 of FIGS. 4 and 5) disposed on the fourth surface, and operating as an antenna radiator for transmitting or receiving an RF signal of the first frequency band, when viewed from the first surface of the first antenna, the first conductive pattern and the second conductive pattern may be perpendicular to each other, when viewed from the fourth surface of the second antenna, the third conductive pattern and the fourth conductive pattern may be perpendicular to each other, and the second surface of the first antenna and the third surface of the second antenna may be disposed to face each other.

In one example, the first dielectric substrate may include a first through hole (e.g., the at least one through hole 311a, 311b of FIG. 6C) penetrating at least one region of the first dielectric substrate and a first via (e.g., the at least one via 316, 317 of FIG. 6C) positioned in the first through hole, and electrically connected to a first conductive pattern disposed on the first surface of the first dielectric substrate.

In one example, a first electrical connection member (e.g., the first electrical connection member 314 of FIG. 6C) disposed on the second surface of the first dielectric substrate, and electrically connected to the first via and the wireless communication circuit may be further included, and the wireless communication circuit may feed an RF signal of the first frequency band to the first conductive pattern through the first via and the first electrical connection member.

In one example, a second electrical connection member (e.g., the second electrical connection member 315 of FIG. 6C) disposed on the second surface of the first dielectric substrate, and electrically connecting the second conductive pattern and the wireless communication circuit may be further included, and the wireless communication circuit may feed an RF signal of the first frequency band to the second conductive pattern through the second electrical connection member.

In one example, it may include a second through hole (e.g., the at least one through hole 311a, 311b of FIG. 6C) penetrating at least one region of the second dielectric substrate and a second via (e.g., the at least one via 316, 317 of FIG. 6C) positioned in the second through hole, and electrically connected to the fourth conductive pattern disposed on the fourth surface of the second dielectric substrate.

In one example, a third electrical connection member (e.g., the second electrical connection member 315 of FIG. 6C) disposed on the third surface of the second dielectric substrate, and electrically connecting the third conductive pattern and the wireless communication circuit may be further included, and the wireless communication circuit may feed an RF signal of the first frequency band to the third conductive pattern through the third electrical connection member.

In one example, a fourth electrical connection member (e.g., the first electrical connection member 314 of FIG. 6C) disposed on the third surface of the second dielectric substrate, and electrically connecting the second via and the wireless communication circuit may be further included, and the wireless communication circuit may feed an RF signal of the first frequency band to the fourth conductive pattern through the second via and the fourth electrical connection member.

In one example, a third antenna (e.g., the third antenna module 330 of FIGS. 4 and 5) disposed in the housing, and electrically connected to the wireless communication circuit and a fourth antenna (e.g., the fourth antenna module 340 of FIGS. 4 and 5) disposed in the housing, and electrically connected to the wireless communication circuit may be further included, the third antenna may include a third dielectric substrate (e.g., the third dielectric substrate 331 of FIGS. 4 and 5) including a fifth surface (e.g., the fifth surface 330a of FIGS. 4 and 5) and a sixth surface (e.g., the sixth surface 330b of FIGS. 4 and 5) facing away from the fifth surface, a fifth conductive pattern (e.g., the fifth conductive pattern 332 of FIGS. 4 and 5) disposed on the fifth surface, and operating as an antenna radiator which transmits or receives an RF signal of a second frequency band, and a sixth conductive pattern (e.g., the sixth conductive pattern 333 of FIGS. 4 and 5) disposed on the sixth surface, and operating as an antenna radiator which transmits or receives an RF signal of the second frequency band, and the fourth antenna may include a fourth dielectric substrate (e.g., the fourth dielectric substrate 341 of FIGS. 4 and 5) including a seventh surface (e.g., the seventh surface 340a of FIGS. 4 and FIG. 5) facing the sixth surface of the third dielectric substrate and an eighth surface (e.g., the eighth surface 340b of FIGS. 4 and 5) facing away from the seventh surface, a seventh conductive pattern (e.g., the seventh conductive pattern 342 of FIGS. 4 and 5) disposed on the seventh surface, and operating as an antenna radiator of the second frequency band, and an eighth conductive pattern (e.g., the eighth conductive pattern 343 of FIGS. 4 and 5) disposed on the eighth surface, and operating as an antenna radiator of the second frequency band.

In one example, when viewed from the fifth surface of the third antenna, the fifth conductive pattern and the sixth conductive pattern may be perpendicular to each other, and when viewed from the eighth surface of the fourth antenna, the seventh conductive pattern and the sixth conductive pattern may be perpendicular to each other.

In one example, the first antenna, the second antenna, the third antenna and the fourth antenna may be radially disposed based on a virtual center of the housing.

In one example, a fifth antenna (e.g., the fifth antenna module 350 of FIGS. 4 and 5) disposed in the housing, and electrically connected to the wireless communication circuit and a sixth antenna (e.g., the sixth antenna module 360 of FIGS. 4 and 5) disposed in the housing, and electrically connected to the wireless communication circuit may be further included, the fifth antenna may include a fifth dielectric substrate (e.g., the fifth dielectric substrate 351 of FIGS. 4 and 5) including a ninth surface (e.g., the ninth surface 350a of FIGS. 4 and 5) and a tenth surface (e.g., the tenth surface 350b of FIGS. 4 and 5) facing away from the ninth surface, a ninth conductive pattern (e.g., the ninth conductive pattern 352 of FIGS. 4 and 5) disposed on the ninth surface, and operating as an antenna radiator which transmits or receives an RF signal of a third frequency band, and a tenth conductive pattern (e.g., the tenth conductive pattern 353 of FIGS. 4 and 5) disposed on the tenth surface, and operating as an antenna radiator which transmits or receives an RF signal of the third frequency band, and the sixth antenna may include a sixth dielectric substrate (e.g., the sixth dielectric substrate 361 of FIGS. 4 and 5) including an eleventh surface (e.g., the eleventh surface 360a of FIGS. 4 and 5) facing the tenth surface of the fifth dielectric substrate and a twelfth surface (e.g., the twelfth surface 360b of FIGS. 4 and 5) facing away from the eleventh surface, an eleventh conductive pattern (e.g., the eleventh conductive pattern 362 of FIGS. 4 and 5) disposed on the eleventh surface, and operating as an antenna radiator which transmits or receives an RF signal of the third frequency band, and a twelfth conductive pattern (e.g., the twelfth conductive pattern 363 of FIGS. 4 and 5) disposed on the twelfth surface, and operating as an antenna radiator which transmits or receives an RF signal of the third frequency band.

In one example, when viewed from the ninth surface of the fifth antenna, the ninth conductive pattern and the tenth conductive pattern may be perpendicular to each other, and when viewed from the twelfth surface of the sixth antenna, the eleventh conductive pattern and the twelfth conductive pattern may be perpendicular to each other.

In one example, the first antenna, the second antenna, the third antenna, the fourth antenna, the fifth antenna and the sixth antenna may be radially disposed based on a virtual center of the housing.

In one example, a dielectric (e.g., the dielectric 230 of FIGS. 9A, 9B, and/or 9C) disposed in a hollow space between the first antenna, the second antenna, the third antenna, the fourth antenna, the fifth antenna and the sixth antenna, and formed of a material having a designated dielectric constant may be further included.

In one example, the first antenna, the second antenna, the third antenna, the fourth antenna, the fifth antenna and the sixth antenna may operate as a MIMO antenna.

An electronic device (e.g., the electronic device 100 of FIG. 1) according to yet another embodiment of the disclosure may include a housing (e.g., the housing 110 of FIG. 1), a first antenna (e.g., the first antenna module 510 of FIGS. 10 and 11) disposed in the housing, a second antenna (e.g., the second antenna module 520 of FIGS. 10 and 11) disposed in the housing, and spaced apart from the first antenna, a printed circuit board (e.g., the at least one printed circuit board 120 of FIG. 1) disposed in the housing and a wireless communication circuit (e.g., the wireless communication circuit 600 of FIG. 11) disposed on the printed circuit board, and transmitting or receiving an RF signal of a designated frequency band through the first antenna and the second antenna, the first antenna may include a first dielectric substrate (e.g., the first dielectric substrate 511 of FIGS. 10 and 11), a first conductive pattern (e.g., the first conductive pattern 512 of FIGS. 10 and 11) disposed on one surface (e.g., the first surface 510a of FIGS. 10 and 11) of the first dielectric substrate, and operating as an antenna radiator for transmitting or receiving an RF signal of a first frequency band and a second conductive pattern (e.g., the second conductive pattern 513 of FIGS. 10 and 11) disposed on the other surface (e.g., the second surface 510b of FIGS. 10 and 11) facing away from the one surface of the first dielectric substrate, and operating as an antenna radiator for transmitting or receiving an RF signal of second first frequency band, the second antenna may include a second dielectric substrate (e.g., the second dielectric substrate 521 of FIGS. 10 and 11), a third conductive pattern (e.g., the fourth conductive pattern 523 of FIGS. 10 and 11) disposed on one surface (e.g., the fourth surface 520b of FIGS. 10 and 11) of the second dielectric substrate, and operating as an antenna radiator for transmitting or receiving an RF signal of the first frequency band and a fourth conductive pattern (e.g., the third conductive pattern 522 of FIGS. 10 and 11) disposed on the other surface (e.g., the third surface 520a of FIGS. 10 and 11) facing away from the one surface of the second dielectric substrate, and operating as an antenna radiator for transmitting or receiving an RF signal of the second frequency band, and at least one surface of the first dielectric substrate may be disposed to face at least one surface of the second dielectric substrate.

In one example, the first dielectric substrate may include a first through hole (e.g., the at least one through hole 511a, 511b of FIG. 12C) penetrating at least one region of the first dielectric substrate and a first via (e.g., the at least one via 516, 517 of FIG. 12C) positioned in the first through hole, and electrically connected to the first conductive pattern, and the second dielectric substrate may include a second through hole (e.g., the at least one through hole 511a, 511b of FIG. 12C) penetrating at least one region of the second dielectric substrate and a second via (e.g., the at least one via 516, 517 of FIG. 12C) positioned in the second through hole, and electrically connected to the fourth conductive pattern.

In one example, a first electrical connection member (e.g., the first electrical connection member 514 of FIG. 12C) disposed on the same surface as the second conductive pattern of the first dielectric substrate, and electrically connecting the first via and the wireless communication circuit and a second electrical connection member (e.g., the second electrical connection member 515 of FIG. 12C) disposed on the same surface as the first electrical connection member, and electrically connecting the second conductive pattern and the wireless communication circuit may be further included, and the wireless communication circuit may feed an RF signal of the first frequency band to the first conductive pattern through the first via and the first electrical connection member, and feed an RF signal of the second frequency band to the second conductive pattern through the second electrical connection member.

In one example, a third electrical connection member (e.g., the second electrical connection member 515 of FIG. 12C) disposed on the same surface as the third conductive pattern of the second dielectric substrate, and electrically connecting the third conductive pattern and the wireless communication circuit and a fourth electrical connection member (e.g., the first electrical connection member 514 of FIG. 12C) disposed on the same surface as the third electrical connection member, and electrically connecting the second via and the wireless communication circuit may be further included, and the wireless communication circuit may feed an RF signal of the first frequency band to the third conductive pattern through the third electrical connection member, and feed an RF signal of the second frequency band to the fourth conductive pattern through the second via and the fourth electrical connection member.

An electronic device (e.g., the electronic device 100 of FIG. 1) according to yet another embodiment of the disclosure may include a housing (e.g., the housing 110 of FIG. 1), a first antenna (e.g., the first antenna module 810 of FIGS. 14 and 15) disposed in the housing, a second antenna (e.g., the second antenna module 880 of FIGS. 14 and 15) disposed in the housing, and spaced apart from the first antenna, a third antenna (e.g., the third antenna module 830 of FIGS. 14 and 15) disposed in the housing, and spaced apart from the first antenna and the second antenna, a printed circuit board (e.g., the at least one printed circuit board 120 of FIG. 1) disposed in the housing and a wireless communication circuit (e.g., the wireless communication circuit 900 of FIG. 15) disposed on the printed circuit board, and transmitting or receiving an RF signal of a designated frequency band through the first antenna, the second antenna and the third antenna, the first antenna may include a first dielectric substrate (e.g., the first dielectric substrate 811 of FIGS. 14 and 15) including a first surface (e.g., the first surface 810a of FIGS. 14 and 15) and a second surface (e.g., the second surface 810b of FIGS. 14 and 15) facing away from the first surface, a first conductive pattern (e.g., the first conductive pattern 812 of FIGS. 14 and 15) disposed on the first surface, and operating as an antenna radiator for transmitting or receiving an RF signal of a first frequency band and a second conductive pattern (e.g., the first conductive pattern 812 of FIGS. 14 and 15) disposed on the second surface, and operating as an antenna radiator for transmitting or receiving an RF signal of second first frequency band.

The second antenna may include a second dielectric substrate (e.g., the second dielectric substrate 821 of FIGS. 14 and 15) including a third surface (e.g., the third surface 820a of FIGS. 14 and 15) and a fourth surface (e.g., the fourth surface 820b of FIGS. 14 and 15) facing away from the third surface, a third conductive pattern (e.g., the third conductive pattern 822 of FIGS. 14 and 15) disposed on the third surface, and operating as an antenna radiator for transmitting or receiving an RF signal of a second frequency band and a fourth conductive pattern (e.g., the fourth conductive pattern 823 of FIGS. 14 and 15) disposed on the fourth surface, and operating as an antenna radiator for transmitting or receiving an RF signal of the second frequency band, the third antenna may include a third dielectric substrate (e.g., the third dielectric substrate 831 of FIGS. 14 and FIG. 15) including a fifth surface (e.g., the fifth surface 830a of FIGS. 14 and 15) and a sixth surface (e.g., the sixth surface 830b of FIGS. 14 and 15) facing away from the fifth surface, a fifth conductive pattern (e.g., the fifth conductive pattern 832 of FIGS. 14 and 15) disposed on the fifth surface, and operating as an antenna radiator for transmitting or receiving an RF signal of the second frequency band and a sixth conductive pattern (e.g., the sixth conductive pattern 833 of FIGS. 14 and 15) disposed on the sixth surface, and operating as an antenna radiator for transmitting or receiving an RF signal of the second frequency band, and the first antenna, the second antenna and the third antenna may be radially disposed based on a virtual center (e.g., M of FIG. 14) of the housing.

In the specific embodiments of the disclosure, the elements included in the disclosure are expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a first antenna disposed in the housing;
   a second antenna disposed in the housing, and spaced apart from the first antenna;
   a printed circuit board disposed in the housing; and
   a wireless communication circuit disposed on the printed circuit board, the wireless communication circuit configured to transmit or receive a radio frequency (RF) signal of a designated frequency band through the first antenna and the second antenna,
   wherein the first antenna comprises:
      a first dielectric substrate comprising a first surface and a second surface facing away from the first surface,
      a first conductive pattern disposed on the first surface, the first conductive pattern operating as an antenna radiator for transmitting or receiving an RF signal of a first frequency band, and
      a second conductive pattern disposed on the second surface, the second conductive pattern operating as an antenna radiator for transmitting or receiving an RF signal of the first frequency band,
   wherein the second antenna comprises:
      a second dielectric substrate comprising a third surface and a fourth surface facing away from the third surface,
      a third conductive pattern disposed on the third surface, the third conductive pattern operating as an antenna radiator for transmitting or receiving an RF signal of the first frequency band, and
      a fourth conductive pattern disposed on the fourth surface, the fourth conductive pattern operating as an antenna radiator for transmitting or receiving an RF signal of the first frequency band,
   wherein, when viewed from the first surface of the first antenna, the first conductive pattern and the second conductive pattern are perpendicular to each other,
   wherein, when viewed from the fourth surface of the second antenna, the third conductive pattern and the fourth conductive pattern are perpendicular to each other, and
   wherein the second surface of the first antenna and the third surface of the second antenna are disposed to face each other.

2. The electronic device of claim 1, wherein the first dielectric substrate comprises:
   a first through hole penetrating at least one region of the first dielectric substrate; and
   a first via positioned in the first through hole, and electrically connected to the first conductive pattern disposed on the first surface of the first dielectric substrate.

3. The electronic device of claim 2, further comprising:
   a first electrical connection member disposed on the second surface of the first dielectric substrate,
   wherein the first electrical connection member is electrically connected to the first via and the wireless communication circuit, and
   wherein the wireless communication circuit is configured to feed an RF signal of the first frequency band to the first conductive pattern through the first via and the first electrical connection member.

4. The electronic device of claim 3, further comprising:
   a second electrical connection member disposed on the second surface of the first dielectric substrate,
   wherein the second electrical connection is electrically connected to the second conductive pattern and the wireless communication circuit, and
   wherein the wireless communication circuit is configured to feed an RF signal of the first frequency band to the second conductive pattern through the second electrical connection member.

5. The electronic device of claim 1,
   wherein the second dielectric substrate comprises:
      a second through hole penetrating at least one region of the second dielectric substrate; and
      a second via positioned in the second through hole, and
   wherein the second via is electrically connected to the fourth conductive pattern disposed on the fourth surface of the second dielectric substrate.

6. The electronic device of claim 5, further comprising:
   a third electrical connection member disposed on the third surface of the second dielectric substrate,
   wherein the third electrical connection member is electrically connected to the third conductive pattern and the wireless communication circuit, and
   wherein the wireless communication circuit is configured to feed an RF signal of the first frequency band to the third conductive pattern through the third electrical connection member.

7. The electronic device of claim 6, further comprising:
   a fourth electrical connection member disposed on the third surface of the second dielectric substrate,
   wherein the fourth electrical connection member is electrically connected to the second via and the wireless communication circuit, and
   wherein the wireless communication circuit is configured to feed an RF signal of the first frequency band to the fourth conductive pattern through the second via and the fourth electrical connection member.

8. The electronic device of claim 1, further comprising:
   a third antenna disposed in the housing, the third antenna electrically connected to the wireless communication circuit; and
   a fourth antenna disposed in the housing, the fourth antenna electrically connected to the wireless communication circuit, wherein the third antenna comprises:
  a third dielectric substrate comprising a fifth surface and a sixth surface facing away from the fifth surface,
  a fifth conductive pattern disposed on the fifth surface, the fifth conductive pattern operating as an antenna radiator transmitting or receiving an RF signal of a second frequency band, and
  a sixth conductive pattern disposed on the sixth surface, the sixth conductive pattern operating as an antenna radiator transmitting or receiving an RF signal of the second frequency band, and
wherein the fourth antenna comprises:
  a fourth dielectric substrate comprising a seventh surface facing the sixth surface of the third dielectric substrate and an eighth surface facing away from the seventh surface,
  a seventh conductive pattern disposed on the seventh surface, the seventh conductive pattern operating as an antenna radiator of the second frequency band, and
  an eighth conductive pattern disposed on the eighth surface, the eighth conductive pattern operating as an antenna radiator of the second frequency band.

9. The electronic device of claim 8,
wherein, when viewed from the fifth surface of the third antenna, the fifth conductive pattern and the sixth conductive pattern are perpendicular to each other, and
wherein when viewed from the eighth surface of the fourth antenna, the seventh conductive pattern and the sixth conductive pattern are perpendicular to each other.

10. The electronic device of claim 8, wherein the first antenna, the second antenna, the third antenna and the fourth antenna are radially disposed based on a virtual center of the housing.

11. The electronic device of claim 8, further comprising:
a fifth antenna disposed in the housing, the fifth antenna electrically connected to the wireless communication circuit; and
a sixth antenna disposed in the housing, the sixth antenna electrically connected to the wireless communication circuit,
wherein the fifth antenna comprises:
  a fifth dielectric substrate comprising a ninth surface and a tenth surface facing away from the ninth surface,
  a ninth conductive pattern disposed on the ninth surface, the ninth conductive pattern operating as an antenna radiator transmitting or receiving an RF signal of a third frequency band, and
  a tenth conductive pattern disposed on the tenth surface, the tenth conductive pattern operating as an antenna radiator transmitting or receiving an RF signal of the third frequency band, and
wherein the sixth antenna comprises:
  a sixth dielectric substrate comprising an eleventh surface facing the tenth surface of the fifth dielectric substrate and a twelfth surface facing away from the eleventh surface,
  an eleventh conductive pattern disposed on the eleventh surface, the eleventh conductive pattern operating as an antenna radiator transmitting or receiving an RF signal of the third frequency band, and
  a twelfth conductive pattern disposed on the twelfth surface, the twelfth conductive pattern operating as an antenna radiator transmitting or receiving an RF signal of the third frequency band.

12. The electronic device of claim 11,
wherein, when viewed from the ninth surface of the fifth antenna, the ninth conductive pattern and the tenth conductive pattern are perpendicular to each other, and
wherein when viewed from the twelfth surface of the sixth antenna, the eleventh conductive pattern and the twelfth conductive pattern are perpendicular to each other.

13. The electronic device of claim 11, wherein the first antenna, the second antenna, the third antenna, the fourth antenna, the fifth antenna and the sixth antenna are radially disposed based on a virtual center of the housing.

14. The electronic device of claim 13, wherein the first antenna, the second antenna, the third antenna, the fourth antenna, the fifth antenna and the sixth antenna operate as multiple input multiple output (MIMO) antenna.

15. The electronic device of claim 11, further comprising:
a dielectric disposed in a hollow space between the first antenna, the second antenna, the third antenna, the fourth antenna, the fifth antenna and the sixth antenna,
wherein the dielectric is formed of a material having a designated dielectric constant.

16. An electronic device comprising:
a housing;
a first antenna disposed in the housing;
a second antenna disposed in the housing, and spaced apart from the first antenna;
a printed circuit board disposed in the housing; and
a wireless communication circuit disposed on the printed circuit board, the wireless communication circuit configured to transmit or receive a radio frequency (RF) signal of a designated frequency band through the first antenna and the second antenna,
wherein the first antenna comprises:
  a first dielectric substrate comprising a first surface and a second surface opposite to the first surface,
  a first conductive pattern disposed on the first surface and transmitting or receiving an RF signal of a first frequency band, and
  a second conductive pattern disposed on the second surface and transmitting or receiving an RF signal of the first frequency band,
wherein the second antenna comprises:
  a second dielectric substrate comprising a third surface and a fourth surface opposite to the third surface,
  a third conductive pattern disposed on the third surface and transmitting or receiving an RF signal of the first frequency band, and
  a fourth conductive pattern disposed on the fourth surface and transmitting or receiving an RF signal of the first frequency band, and
wherein the second surface of the first antenna and the third surface of the second antenna are disposed to face each other.

17. The electronic device of claim 16, wherein the first dielectric substrate comprises:
a first through hole penetrating at least one region of the first dielectric substrate; and
a first via positioned in the first through hole, and electrically connected to the first conductive pattern disposed on the first surface of the first dielectric substrate.

18. The electronic device of claim 17, further comprising:
a first electrical connection member disposed on the second surface of the first dielectric substrate, wherein the first electrical connection member is electrically connected to the first via and the wireless communication circuit, and wherein the wireless communication circuit is configured to feed an RF signal of the first frequency band to the first conductive pattern through the first via and the first electrical connection member.

19. The electronic device of claim 16, wherein the second dielectric substrate comprises:

a second through hole penetrating at least one region of the second dielectric substrate; and a second via positioned in the second through hole, and wherein the second via is electrically connected to the fourth conductive pattern disposed on the fourth surface of the second dielectric substrate.

20. The electronic device of claim 19, further comprising:

a third electrical connection member disposed on the third surface of the second dielectric substrate, wherein the third electrical connection member is electrically connected to the third conductive pattern and the wireless communication circuit, and wherein the wireless communication circuit is configured to feed an RF signal of the first frequency band to the third conductive pattern through the third electrical connection member.

* * * * *